US012674562B2

(12) United States Patent
Gunashekaran et al.

(10) Patent No.: US 12,674,562 B2
(45) Date of Patent: Jul. 7, 2026

(54) DIRECT DRIVE OPTIC TILT MECHANISM FOR RECESSED LUMINAIRE

(71) Applicant: SIGNIFY HOLDING B.V., Eindhoven (NL)

(72) Inventors: Praveen Kumar Gunashekaran, Peachtree City, GA (US); Dhanesh Balakrishna, Bangalore (IN); Laxman Ingale, Solapur (IN); Joeman Felix, Bangalore (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 109 days.

(21) Appl. No.: 18/668,196

(22) Filed: May 19, 2024

(65) Prior Publication Data

US 2024/0392953 A1 Nov. 28, 2024

Related U.S. Application Data

(60) Provisional application No. 63/468,398, filed on May 23, 2023.

(30) Foreign Application Priority Data

Jun. 6, 2023 (EP) .................................... 23177652

(51) Int. Cl.

| | |
|---|---|
| ***F21V 14/02*** | (2006.01) |
| ***F21S 8/02*** | (2006.01) |
| ***F21V 21/04*** | (2006.01) |
| ***F21V 21/30*** | (2006.01) |

(52) U.S. Cl.

CPC ................ *F21V 14/02* (2013.01); *F21S 8/02* (2013.01); *F21V 21/04* (2013.01); *F21V 21/30* (2013.01)

(58) Field of Classification Search

CPC .......... F21V 21/30; F21V 21/04; F21V 23/00; F21V 23/008; F21V 23/003; F21V 14/08; F21V 14/06; F21V 14/04; F21S 8/02

See application file for complete search history.

(56) References Cited

U.S. PATENT DOCUMENTS

| | | | |
|---|---|---|---|
| 2003/0007354 | A1 | 1/2003 | Schubert et al. |
| 2014/0268836 | A1 | 9/2014 | Thompson |
| 2015/0308662 | A1 | 10/2015 | Vice et al. |
| 2019/0063724 | A1 | 2/2019 | Vice, Jr. et al. |

(Continued)

OTHER PUBLICATIONS

Innovation Q+ NPL Search (Year: 2025).*

*Primary Examiner* — Anabel Ton

(57) ABSTRACT

A direct drive optic tilt mechanism for a recessed luminaire can include a frame comprising a frame body, a first frame extension, and a second frame extension, wherein the frame body is configured to receive a housing of the recessed luminaire. The direct drive optic tilt mechanism can also include a bracket movably coupled to the frame, wherein the bracket comprises a bracket base, a first bracket extension, and a second bracket extension, wherein the bracket base has a bracket base opening that traverses therethrough and that is configured to allow light from a light source of the recessed luminaire to pass therethrough. The direct drive optic tilt mechanism can further include a drive assembly coupled to the frame and the bracket, wherein the drive assembly comprises a tilt arm, an anchor, a drive mechanism, and a shaft coupled to a proximal end of the tilt arm.

16 Claims, 22 Drawing Sheets

(56) References Cited

U.S. PATENT DOCUMENTS

| | | | | |
|---|---|---|---|---|
| 2021/0010663 | A1* | 1/2021 | Nikooyan | F21V 23/007 |
| 2022/0221137 | A1* | 7/2022 | Fiegener | F21V 21/30 |
| 2023/0045469 | A1 | 2/2023 | Mathews et al. | |

* cited by examiner

DIRECT DRIVE OPTIC TILT MECHANISM FOR RECESSED LUMINAIRE

RELATED APPLICATIONS

This application claims priority to U.S. Provisional Patent Application No. 63/468,398, filed May 23, 2023, and claims the benefit of European Patent Application No. 23177652.7, filed on Jun. 6, 2023. The entire contents of the foregoing applications are incorporated herein by reference.

TECHNICAL FIELD

The present disclosure relates generally to recessed luminaires, and more particularly to systems, methods, and devices for direct drive optic tilt mechanisms for recessed luminaires.

BACKGROUND

Recessed luminaires are mostly hidden from view once installed, with most of a recessed luminaire being positioned above a ceiling or other part of a structure. However, the bottom or distal end (often the trim) of a recessed luminaire is visible. Recessed luminaires can vary in size, from an inch or two in diameter to as much as six inches or more in diameter. A user may want to make certain adjustments (e.g., tilt, rotation, depth) to the recessed luminaire once it is installed. However, particularly for small recessed luminaires, these adjustments can be difficult to make without removing the recessed luminaire, making the adjustments, and then reinstalling the recessed luminaire, which results in a time consuming process that can be destructive and labor-intensive (e.g., ripping down and repairing the ceiling).

SUMMARY

In general, in one aspect, the disclosure relates to a direct drive optic tilt mechanism for a recessed luminaire. The direct drive optic tilt mechanism can include a frame comprising a frame body, a first frame extension, and a second frame extension, where the frame body is configured to receive a housing of the recessed luminaire, and where the first frame extension and the second frame extension are located at opposite ends of the frame body. The direct drive optic tilt mechanism can also include a bracket movably coupled to the frame, where the bracket includes a bracket base, a first bracket extension, and a second bracket extension, where the bracket base has a bracket base opening that traverses therethrough, where the bracket base opening is configured to allow light from a light source of the recessed luminaire to pass therethrough, where the first bracket extension comprises a first curved slot that is configured to be movably coupled to a first aperture in the first frame extension of the frame and a second curved slot that is configured to be movably coupled to a second aperture in the first frame extension of the frame, where the second bracket extension comprises a first curved slot that is configured to be movably coupled to a first aperture in the second frame extension of the frame and a second curved slot that is configured to be movably coupled to a second aperture in the second frame extension of the frame, and where the first bracket extension and the second bracket extension are located at opposite ends of the bracket base. The direct drive optic tilt mechanism can further include a drive assembly coupled to the frame and the bracket, where the drive assembly comprises a tilt arm, an anchor, a drive mechanism, and a shaft coupled to a proximal end of the tilt arm. Movement of the drive assembly can change an angle between the bracket and the frame.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, the same reference numerals used in different figures may designate like or corresponding but not necessarily identical elements.

DETAILED DESCRIPTION

Figure 1:
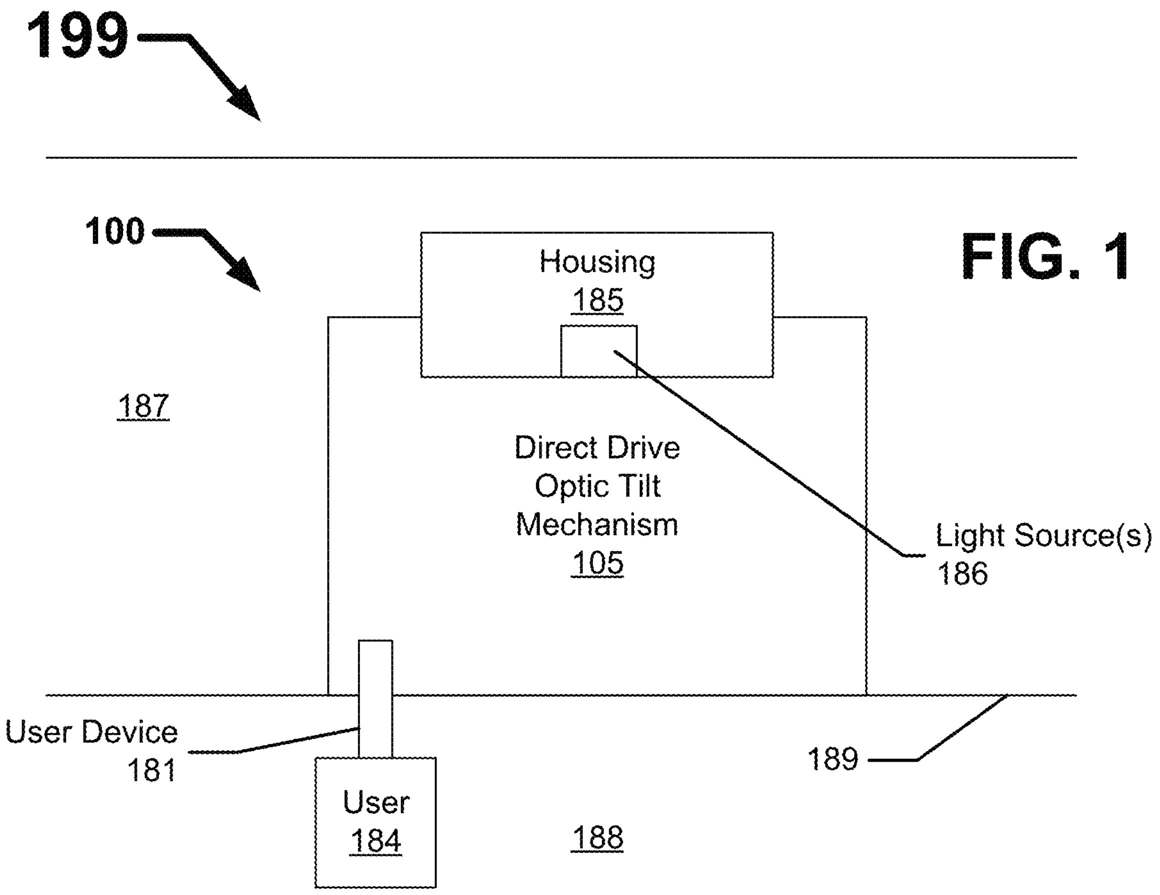
FIG. 1 shows a block diagram for a recessed luminaire system according to certain example embodiments.

In general, example embodiments provide systems, methods, and devices for direct drive optic tilt mechanisms for recessed luminaires. Example embodiments can provide a number of benefits. Such benefits can include, but are not limited to, fewer parts to keep in inventory, modularity, user control, and simple configurability. Example embodiments can be used with new recessed luminaires or retrofit with existing recessed luminaires. Example embodiments described herein can be used with recessed luminaires having any of a number of sizes (e.g., 1 inch, 3 inches, 4 inches, 5 inches, 6 inches), any of a number of housing shapes (e.g., a cylinder, a rectangular cuboid), any of a number of configurations (e.g., with a can, without a can), and any shape (e.g., circular flanged, square flanged, conical flangeless, conical square flanged) of trim. As used herein, a luminaire is a general term that can include a light fixture, a lighting device, an illumination fixture, and similar devices.

Recessed luminaires with example direct drive optic tilt mechanisms can be located in one or more of any of a number of environments. Examples of such environments can include, but are not limited to, indoors, outdoors, a parking garage, a kitchen or cooking space, a hallway, an entertainment room, an office space, a manufacturing plant, a warehouse, a laboratory, clean room, a server room, and a storage facility, any of which can be climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Recessed luminaires with example direct drive optic tilt mechanisms can be integrated into any of a number of different structures. Such structures can include, but are not limited to, drywall, wood studs, concrete, and ceiling tile.

Recessed luminaires with example direct drive optic tilt mechanisms (including portions thereof) can be made of one or more of a number of suitable materials to allow the recessed luminaire to meet certain standards and/or regulations while also maintaining durability in light of the one or more conditions under which the recessed luminaires and/or other associated components of the recessed luminaire can be exposed. Examples of such materials can include, but are not limited to, aluminum, stainless steel, fiberglass, glass, plastic, polymer, ceramic, and rubber.

Example direct drive optic tilt mechanisms, or portions or components thereof, described herein can be made from a single piece (as from a mold, injection mold, die cast, or extrusion process). In addition, or in the alternative, example direct drive optic tilt mechanisms (including portions or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a “coupling feature” can couple, secure, fasten, abut against, and/or perform other functions aside from merely coupling.

A coupling feature (including a complementary coupling feature) as described herein can allow one or more components and/or portions of an example direct drive optic tilt mechanism to become coupled, directly or indirectly, to one or more other components (e.g., a trim, a housing) of a recessed luminaire, to another component of the direct drive optic tilt mechanism, and/or to a structure (e.g., a stud, drywall, a beam). A coupling feature can include, but is not limited to, a clamp, a portion of a hinge, an aperture, a recessed area, a protrusion, a hole, a slot, a tab, a detent, and mating threads. One portion of an example direct drive optic tilt mechanism can be coupled to a component (e.g., a trim, a housing) of a recessed luminaire, to another component of the direct drive optic tilt mechanism, and/or to a structure by the direct use of one or more coupling features.

In addition, or in the alternative, a portion of an example direct drive optic tilt mechanism can be coupled to a component (e.g., a trim, a housing, some other component) of a recessed luminaire, to another component of the direct drive optic tilt mechanism, and/or to a structure using one or more independent devices that interact with one or more coupling features disposed on a component of the direct drive optic tilt mechanism. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of direct drive optic tilt mechanisms for recessed luminaires, one or more of the components shown may be omitted, repeated, and/or substituted. Accordingly, example embodiments of direct drive optic tilt mechanisms for recessed luminaires should not be considered limited to the specific arrangements of components shown in any of the figures. For example, features shown in one or more figures or described with respect to one embodiment can be applied to another embodiment associated with a different figure or description.

In certain example embodiments, recessed luminaires having example direct drive optic tilt mechanisms are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the recessed luminaire to meet) such standards when applicable.

If a component of a figure is described but not expressly shown or labeled in that figure, the label used for a corresponding component in another figure can be inferred to that component. Conversely, if a component in a figure is labeled but not described with respect to that figure, the description for such component can be substantially the same as the description for a corresponding component in another figure. The numbering scheme for the various components in the figures herein is such that each component is a three-digit number or a four-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of direct drive optic tilt mechanisms for recessed luminaires will be described more fully hereinafter with reference to the accompanying drawings, in which example embodiments of direct drive optic tilt mechanisms for recessed luminaires are shown. Direct drive optic tilt mechanisms for recessed luminaires may, however, be embodied in many different forms and should not be construed as limited to the example embodiments set forth herein. Rather, these example embodiments are provided so that this disclosure will be thorough and complete, and will fully convey the scope of direct drive optic tilt mechanisms for recessed luminaires to those of ordinary skill in the art. Like, but not necessarily the same, elements (also sometimes called components) in the various figures are denoted by like reference numerals for consistency.

Terms such as “first”, “second”, “above”, “below”, “inner”, “outer”, “distal”, “proximal”, “end”, “top”, “bottom”, “upper”, “lower”, “side”, “left”, “right”, “front”, “rear”, and “within”, when present, are used merely to distinguish one component (or part of a component or state of a component) from another. Such terms are not meant to denote a preference or a particular orientation. Such terms are not meant to limit embodiments of direct drive optic tilt mechanisms for recessed luminaires. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
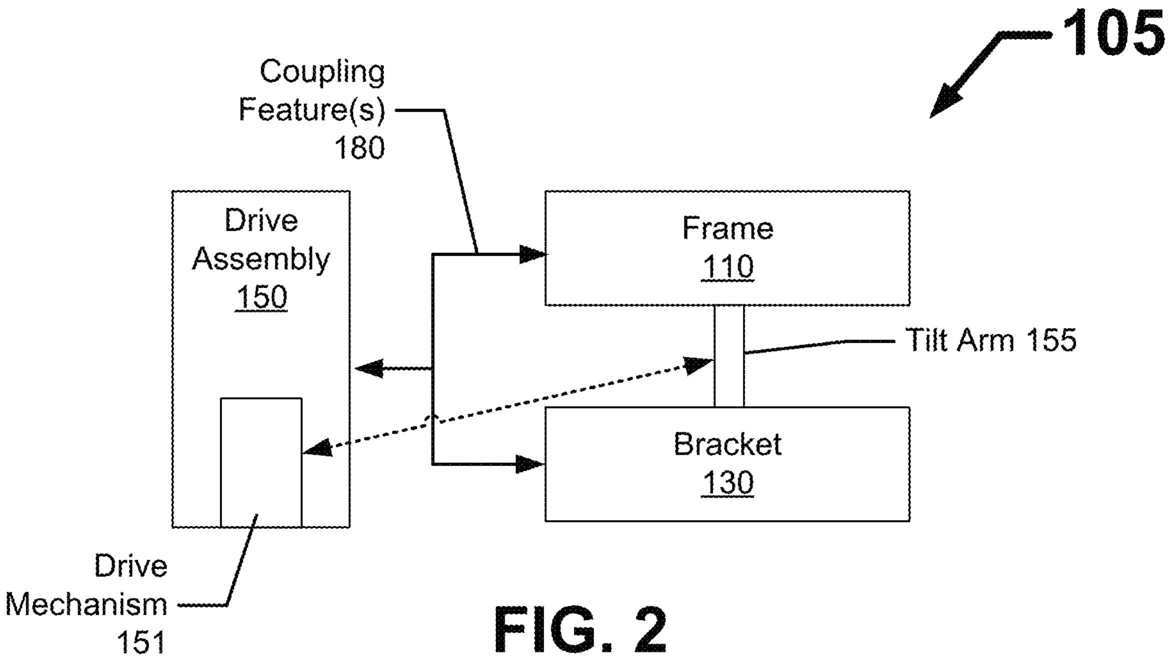
FIG. 2 shows a block diagram of the direct drive optic tilt mechanism of FIG. 1 according to certain example embodiments.

FIG. 1 shows a block diagram of a recessed luminaire system 199 according to certain example embodiments. FIG. 2 shows a block diagram of the direct drive optic tilt mechanism of FIG. 1 according to certain example embodiments. The recessed luminaire system 199 of FIG. 1 includes the recessed luminaire 100 and a user device 181. The user device 181 is configured to interact with the example direct drive optic tilt mechanism 105 of the recessed luminaire 100 to adjust the tilt of the recessed luminaire 100 (or portions thereof, such as a light source 186). Examples of a user device 181 can include, but are not limited to, a hand of the user 184, a manual screwdriver, a power screwdriver, a drill, and a lance. The user device 181 can be directly or indirectly controlled by a user 184. A user 184 may be any person that interacts with recessed luminaires. Examples of a user 184 can include, but are not limited to, an engineer, an electrician, an instrumentation and controls technician, a mechanic, an operator, a property manager, a homeowner, a tenant, an employee, a consultant, a contractor, and a manufacturer’s representative.

The recessed luminaire 100 is shown in FIG. 1 in a typical installation, where the recessed luminaire 100 is disposed in an aperture in a structure 189 (e.g., drywall in a ceiling, a ceiling tile). As a result, most of the recessed luminaire 100, including all of the direct drive optic tilt mechanism 105, is positioned in a volume of space 187 (e.g., a plenum space) above the structure 189, while the remainder (e.g., part of the trim) of the recessed luminaire 100 is in a different volume of space 188 below the structure 189. The volume of space 188 is where light emitted from the recessed luminaire 100 is directed, for example to provide general illumination to the volume of space 188.

The recessed luminaire 100 includes a number of components. Such components can include, but are not limited to, a trim, a heat sink, a sensor device, a controller, one or more light sources 186, a reflector, a driver (or other form of power source), a controller, a power transfer device (e.g., a transformer, a rectifier), an energy storage device (e.g., a battery), electrical wiring, circuit boards, the example direct drive optic tilt mechanism 105, a rotational control system, a depth control system, a lens or other optical device, an enclosure, and a housing 185. In certain example embodiments, the housing 185 has the one or more light sources 186 of the recessed luminaire 100 disposed therein.

The housing 185 of the recessed luminaire 100 can be configured to house multiple components of the recessed luminaire 100. Examples of such components can include, but are not limited to, one or more light sources 186, a controller, a driver, a heat sink, a lens or other type of optical device, and a reflector. The housing 185 can include one or more coupling features (e.g., apertures, slots, tabs) that allow the housing 185 to be directly or indirectly coupled to the frame 110. Similarly, the frame 110 can include one or more coupling features that complement the coupling features of the housing 185 to allow the frame 110 to be directly or indirectly coupled to the housing 185. The housing can have any of a number of shapes (e.g., cylindrical, conical, cuboid).

A light source 186 can be any type of light source assembly having one or more of any number of components (e.g., a bulb, a circuit board, an electrical wire, a resistor, a capacitor). A light source 186 can use any of a number of lighting technologies, including but not limited to a light-emitting diode (LED), an incandescent light source, a halogen light source, and an organic LED (OLED). A light source 186 can have or include one or more coupling features (e.g., an Edison socket, some other type of electrical connector) that allows the light source 186 to electrically couple to another component of the recessed luminaire 100 within the housing.

The example direct drive optic tilt mechanism 105 includes one or more of a number of components. Such components can be unique to the direct drive optic tilt mechanism 105. In addition, or in the alternative, such components can be part of an existing recessed luminaire. In such cases, the component can be modified in some way for the direct drive optic tilt mechanism 105. The example direct drive optic tilt mechanism 105 of FIG. 2 includes a drive assembly 150, a frame 110, a bracket 130, and one or more coupling features 180. The frame 110 is configured to tilt relative to the bracket 130 using the drive assembly 150.

The frame 110 of the direct drive optic tilt mechanism 105 is configured to have the housing 185 of the recessed luminaire 100 coupled thereto. In this way, when the frame 110 moves, the housing 185 also moves. More details about the frame 110 are discussed below with respect to FIGS. 5A through 17B. The bracket 130 of the direct drive optic tilt mechanism 105 serves as the foundation for providing the tilt capabilities. Specifically, the bracket 130 is configured to be stationary with respect to the plane that defines its base (e.g., a horizontal plane) when installed. The bracket 130 can be installed near the opening in the structure 189 (e.g., adjacent to the trim). More details about the bracket 130 are discussed below with respect to FIGS. 5A through 17B.

The drive assembly 150 of the direct drive optic tilt mechanism 105 is configured to facilitate movement between the frame 110 and the bracket 130. Specifically, the drive assembly 150 is configured to tilt the frame 110 relative to the bracket 130. The drive assembly 150 is operated by a user 184 using a user device 181. The drive assembly 150 (or at least the portion of the drive assembly 150 that triggers the operation of the drive assembly 150) can be accessible to the user 184 when the recessed luminaire 100 is installed without having to remove the recessed luminaire 100 or portions thereof (e.g., the trim). More details about the drive assembly 150 are discussed below with respect to FIGS. 5A through 17B.

The drive assembly 150 of the direct drive optic tilt mechanism 105 can include one or more of a number of features and/or components. For example, in this case, the direct drive optic tilt mechanism 105 can include a drive mechanism 151 and a tilt arm 155. The drive mechanism 151 of the drive assembly 150 can be configured to engage with a user device 181 to operate the direct drive optic tilt mechanism 105. When the drive mechanism 151 is engaged and simultaneously manipulated (e.g., rotated, twisted, pushed, pulled) by a user device 181, the drive mechanism 151 causes the tilt arm 155 to tilt the frame 110 relative to the bracket 130. More details about the drive mechanism 151 and the tilt arm 155 are discussed below with respect to FIGS. 5A through 17B.

The one or more coupling features 180 of the direct drive optic tilt mechanism 105 are configured to directly or indirectly couple the drive assembly 150 (or portions thereof) and the frame 110 to each other, the drive assembly 150 (or portions thereof) and the bracket 130 to each other, and/or the frame 110 and the bracket 130 to each other. A coupling feature 180 can be independent coupling features, integrated with a portion of the drive assembly 150, integrated with a portion of the frame 110, or integrated with a portion of the bracket 130. In any case, a coupling feature 180 is configured to complement at least one other coupling feature within the direct drive optic tilt mechanism 105.

Figure 3:
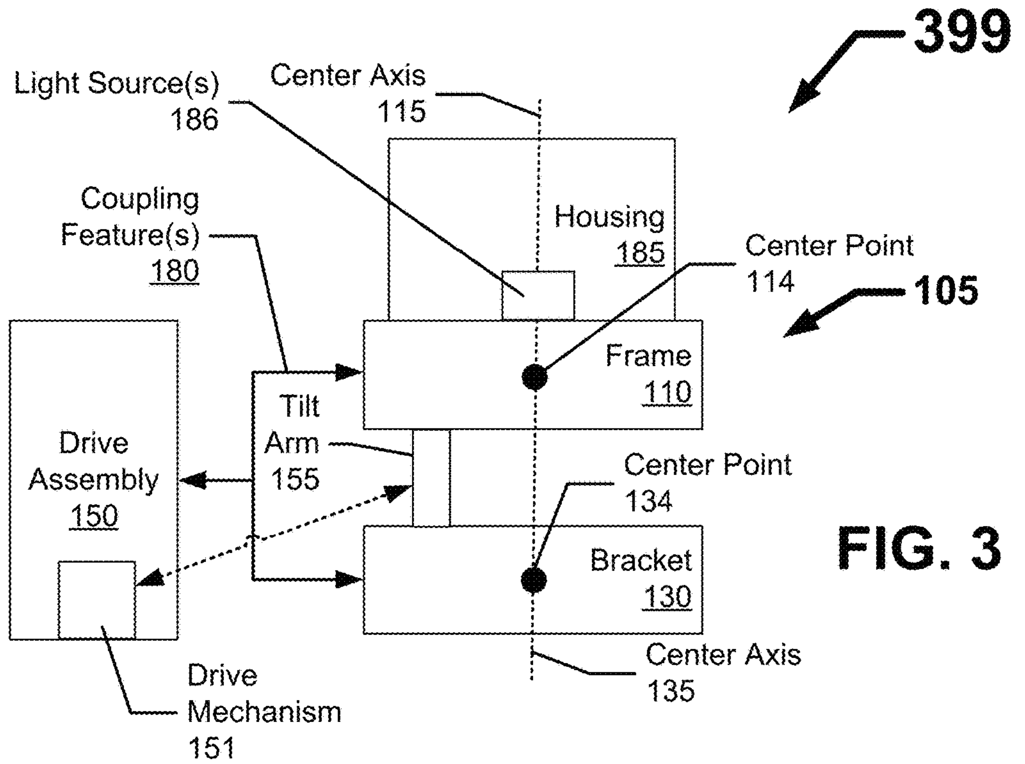
FIG. 3 shows a block diagram of a system that includes the direct drive optic tilt mechanism of FIG. 2 in an untilted position according to certain example embodiments.
Figure 4:
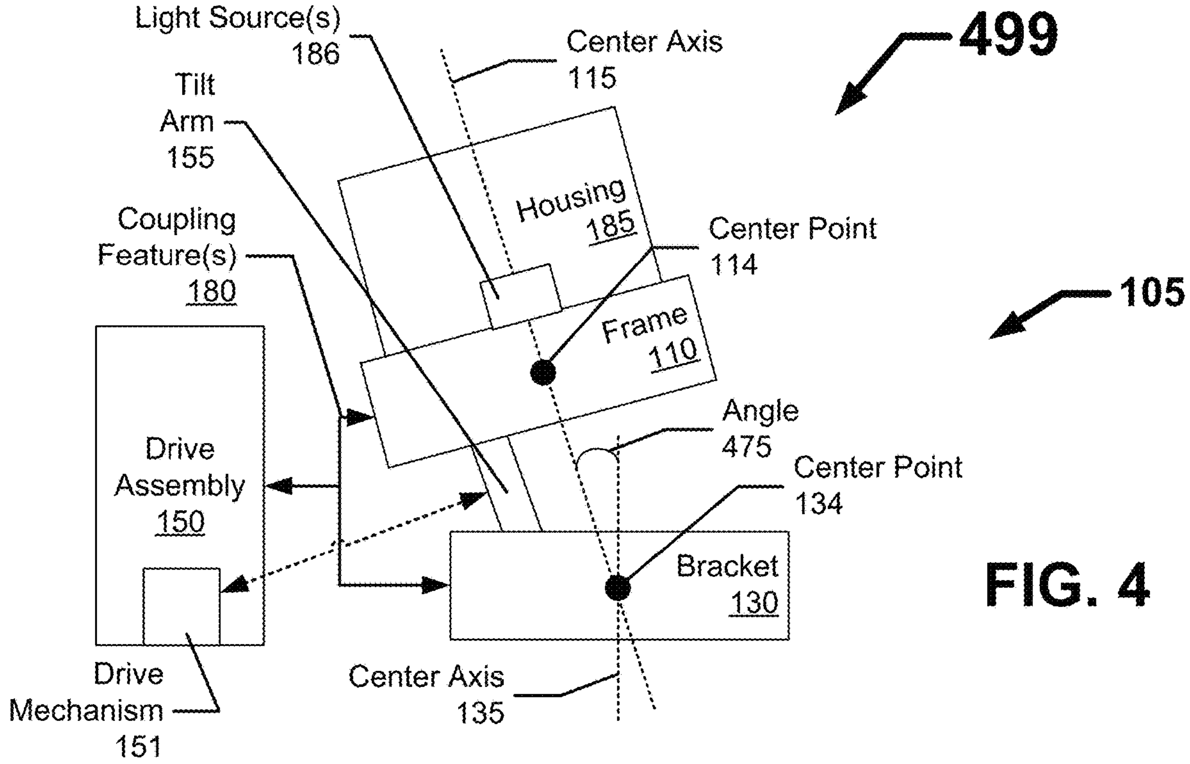
FIG. 4 shows a block diagram of a system that includes the direct drive optic tilt mechanism of FIG. 2 in a tilted position according to certain example embodiments.

FIG. 3 shows a block diagram of a system 399 that includes the direct drive optic tilt mechanism 105 of FIG. 2 in an untilted position according to certain example embodiments. FIG. 4 shows a block diagram of a system 499 that includes the direct drive optic tilt mechanism 105 of FIG. 2 in a tilted position according to certain example embodiments. Referring to FIGS. 1 through 4, the system 399 of FIG. 3 shows the housing 185 of FIG. 1 coupled to the frame 110 of the direct drive optic tilt mechanism 105. In this case, the housing 185 is coupled to the frame 110 in such a way that the center point 114 (also sometimes called the frame body center point 114 herein) of the frame 110 is substantially coincident with the center point of the housing 185. As a result, the center axis 115 of the frame 110, which passes through the center point 114 of the frame 110, is coincident with the center axis of the housing 185.

The bracket 130 also has its own center point 134 (also sometimes called a bracket base center point 134 herein), which defines where the center axis 135 of the bracket 130 is located. In the untilted position shown in FIG. 3, the center axis 115 of the frame 110 (and so also the center axis of the housing 185) is coincident with the center axis 135 of the bracket 130. As a result, there is no angle (i.e., the angle is) 0° between the center axis 135 of the bracket 130 and the center axis 115 of the frame 110. Put another way, the body (defined below) of the frame 110 is substantially parallel to the base (defined below) of the bracket 130. In certain example embodiments, the untilted position shown in FIG. 3 can be a natural or default position of the direct drive optic tilt mechanism 105.

When a user device (e.g., user device 181) engages and simultaneously manipulates (e.g., rotates, pushes, pulls, twists) the drive mechanism 151 of the drive assembly 150, the tilt arm 155 causes the frame 110 (and so also the housing 185) to tilt relative to the bracket 130, as shown in the system 499 of FIG. 4. When this occurs, the center axis 115 of the frame 110 is no longer coincident with the center axis 135 of the bracket 130. As a result, an angle 475 is formed between the center axis 115 of the frame 110 and the center axis 135 of the bracket 130.

In certain example embodiments, the drive assembly 150 is configured in such a way that the center axis 115 of the frame 110 travels through both the center point 114 of the frame 110 and the center point 134 of the bracket 130. In this way, the drive assembly 150 is configured in such a way that the light emitted by the one or more light sources 186 within the housing 185 is directed toward the center point 134 of the bracket 130, regardless of the angle 475 between the frame 110 and the bracket 130. Put another way, the center point 134 of the bracket 130 is intersected by the center axis 115 of the frame 110 along the center point 114 of the frame 110 through an entire range of motion (e.g., −30° to +30°, 0° to)+45° of the frame 110 relative to the bracket 130.

Figure 5A:
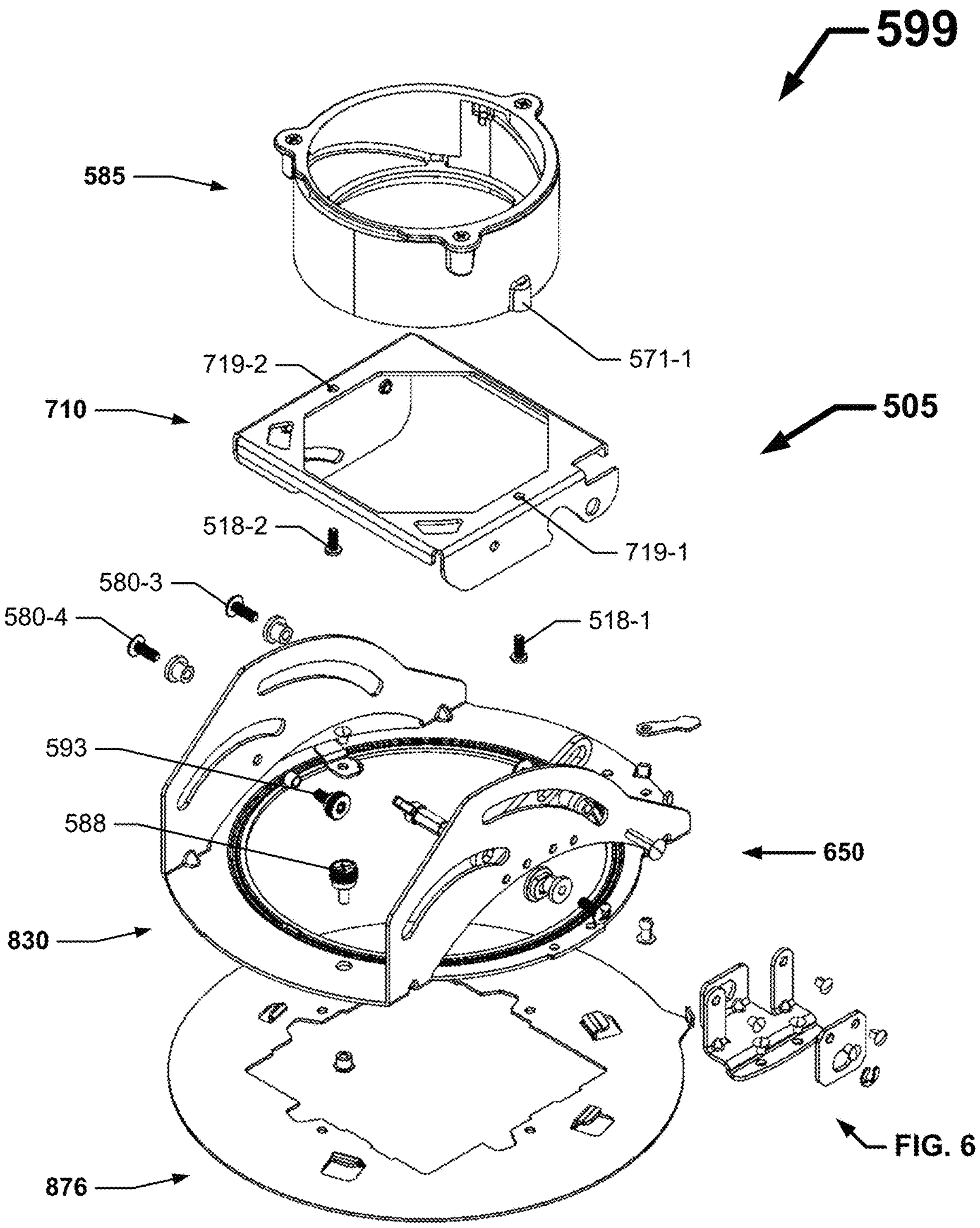
FIGS. 5A and 5B show a recessed luminaire system that includes a direct drive optic tilt mechanism according to certain example embodiments.
Figure 5B:
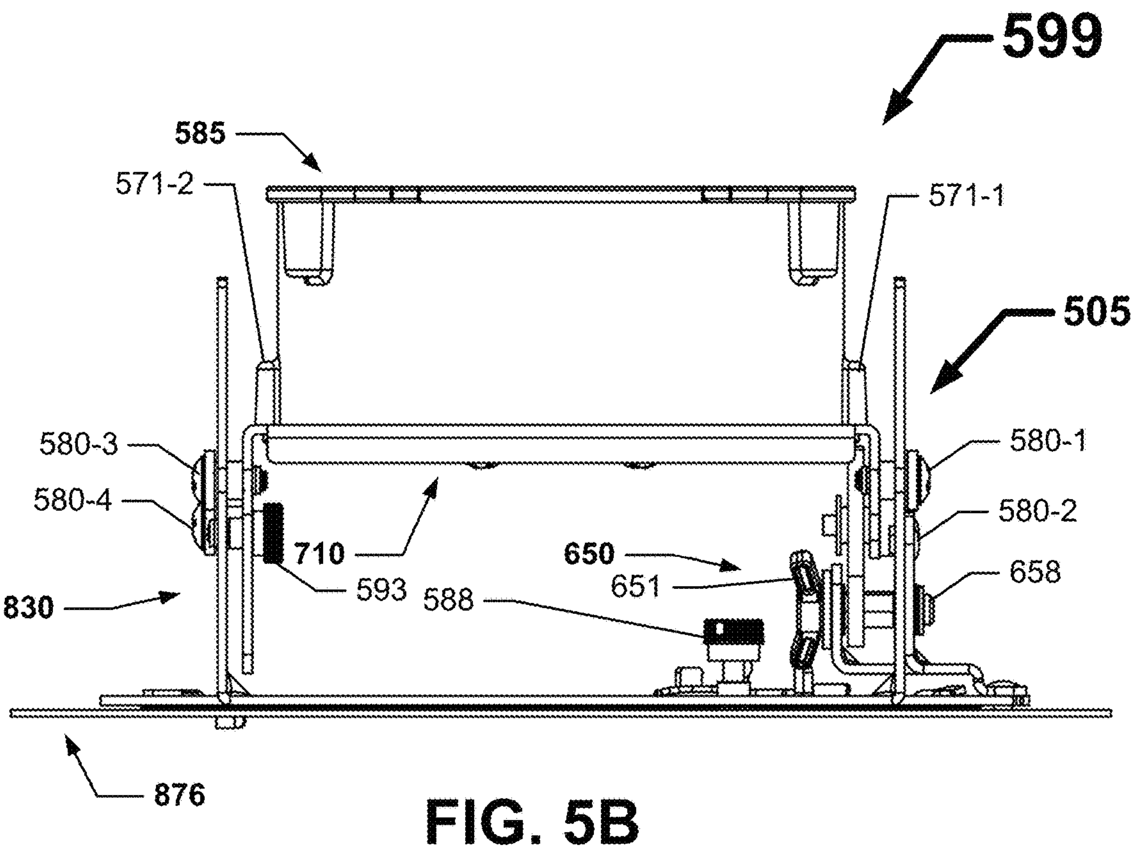
Figure 6:
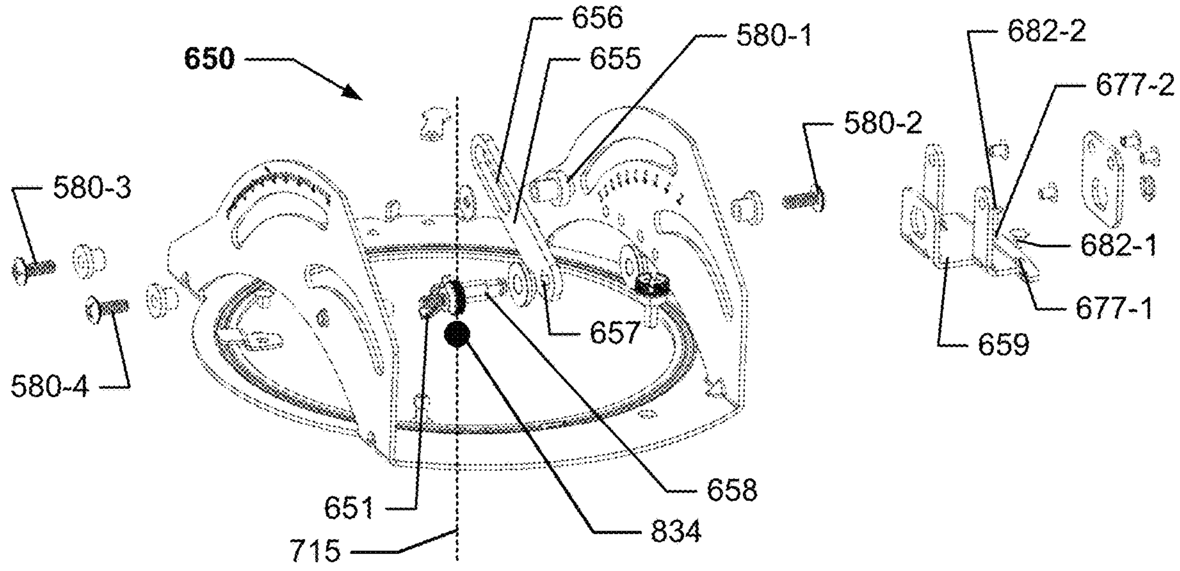
FIG. 6 shows an exploded view of a subsystem of FIGS. 5A and 5B that includes the bracket and the direct drive optic tilt mechanism according to certain example embodiments.
Figure 7A:
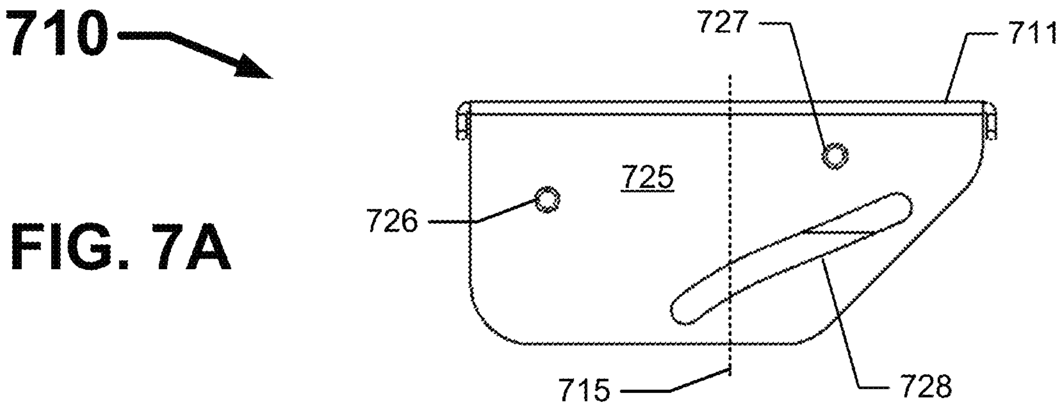
FIGS. 7A through 7C show the frame of the recessed luminaire system of FIGS. 5A and 5B according to certain example embodiments.
Figure 7B:
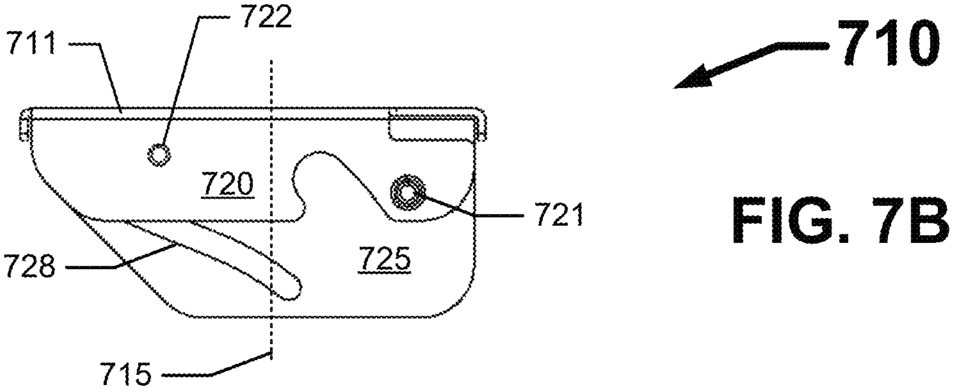
Figure 7C:
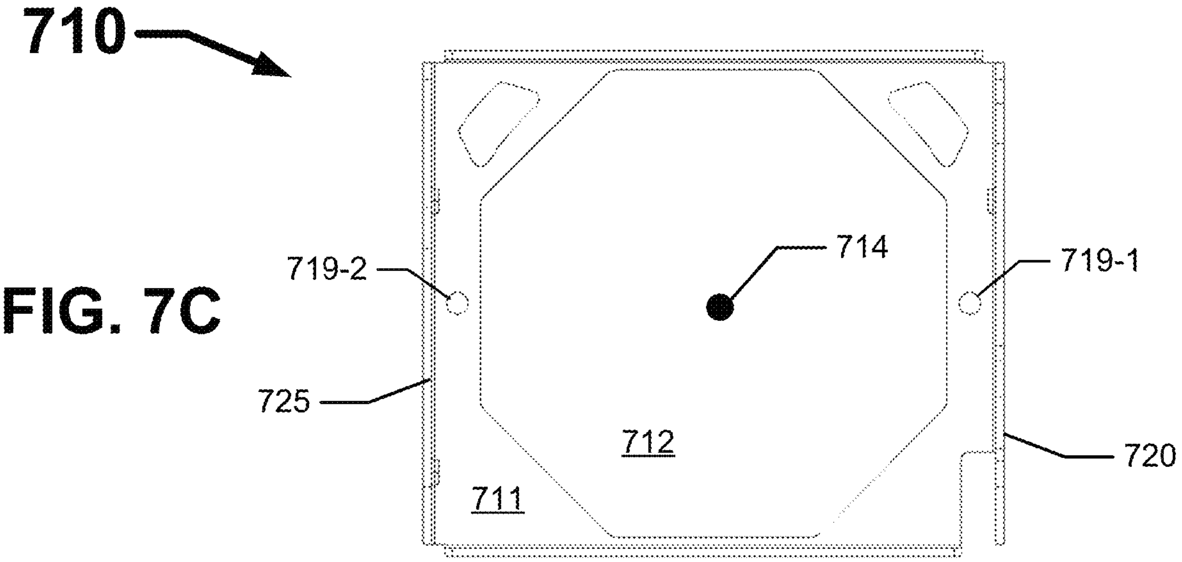
Figure 8A:
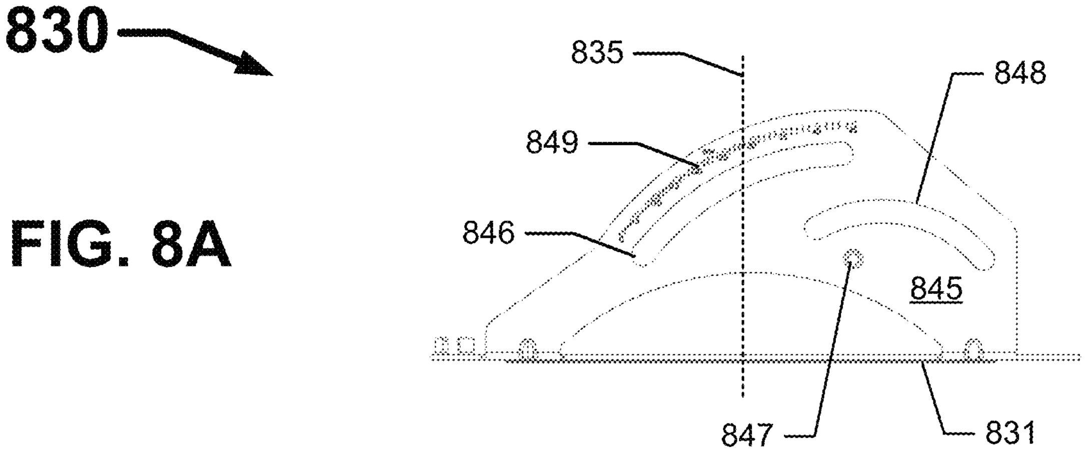
FIGS. 8A through 8C show the bracket of the recessed luminaire system of FIGS. 5A and 5B according to certain example embodiments.
Figure 8B:
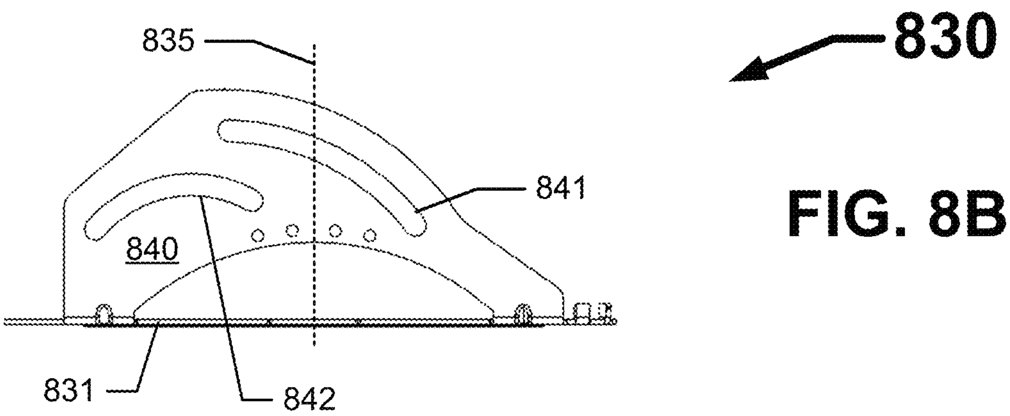
Figure 8C:
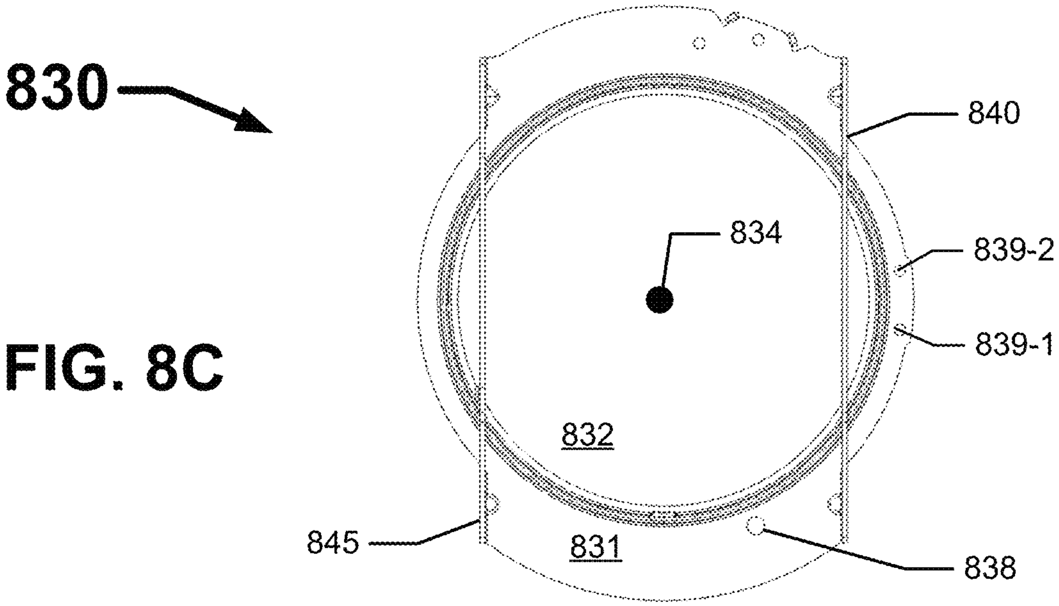

FIGS. 5A and 5B show a recessed luminaire system 599 that includes a direct drive optic tilt mechanism 505 according to certain example embodiments. FIG. 6 shows an exploded view of a subsystem of FIGS. 5A and 5B that includes the bracket 830 and the direct drive optic tilt mechanism 505 according to certain example embodiments. FIGS. 7A through 7C show the frame 710 of the recessed luminaire system 599 of FIGS. 5A and 5B according to certain example embodiments. FIGS. 8A through 8C show the bracket 830 of the recessed luminaire system 599 of FIGS. 5A and 5B according to certain example embodiments.

Specifically, FIG. 5A shows an exploded view of the recessed luminaire system 599. FIG. 5B shows a front view of the recessed luminaire system 599. FIG. 7A shows a side view of the frame 710. FIG. 7B shows an opposite side view of the frame 710. FIG. 7C shows a bottom view of the frame 710. FIG. 8A shows a side view of the bracket 830. FIG. 8B shows an opposite side view of the bracket 830. FIG. 8C shows a bottom view of the bracket 830.

Referring to FIGS. 1 through 8C, the various components of the recessed luminaire system 599 of FIGS. 5A through 8C can be substantially the same as the corresponding components of the recessed luminaire systems discussed above with respect to FIGS. 1 through 4, except as discussed below. The housing 585 in this case is generally cylindrical in shape. The housing 585 has two coupling features 571 in the form of threaded apertures within protrusions that extend from the outer perimeter of the housing 585 toward the bottom of the housing 585. Coupling feature 571-1 and coupling feature 571-2 are positioned substantially opposite each other along the outer perimeter of the housing 585.

The frame 710 of the direct drive optic tilt mechanism 505 of the recessed luminaire system 599 in this case includes a frame body 711, a first frame extension 720, and a second frame extension 725. The frame body 711 in this example is substantially planar and has a large opening 712 (also sometimes called a frame body opening 712 herein) that traverses the frame body 711. In some cases, the opening 712 has a center point 714 (also sometimes called the frame body center point 714 herein) that is substantially coincident with the center of the frame body 711. A center axis 715 passes through the center point 714 of the opening 712 in the frame body 711 substantially perpendicular to the frame body 711. The opening 712 can have any characteristics (e.g., shape, size) that allow the various components (e.g., light sources 186, lens) within the housing 585 to function during operation of the recessed luminaire system 599.

In certain example embodiments, the frame body 711 also includes one or more coupling features 719 that are configured to directly or indirectly couple to the housing 585. In this case, there are two coupling features 719 (coupling feature 719-1 and coupling feature 719-2) in the form of apertures that traverse the thickness of the frame body 711 adjacent to opposite sides of the opening 712. A coupling feature 719 (e.g., coupling feature 719-1, coupling feature 719-2) is configured to indirectly couple to a coupling feature 571 (e.g., coupling feature 571-1, coupling feature 571-2) of the housing 585 using an independent coupling feature 518 (e.g., coupling feature 518-1, coupling feature 518-2) in the form of a screw. When a coupling feature 518 is disposed in a coupling feature 719 of the frame body 711 and a coupling feature 571 of the housing 585, the frame 710 and the housing 585 become fixedly coupled to each other. In some cases, the frame 710 and the housing 585 can be decoupled from each other by removing the independent coupling features 518 from the coupling features 571 of the housing 585.

While the multiple coupling features 719 in this case are equidistant to each other with respect to the opening 712, in alternative embodiments the multiple coupling features 719 can be arranged with some other spacing with respect to each other and the opening 712. In addition, or in the alternative, when there are multiple coupling features 719 of the frame body 711, one or more characteristics (e.g., shape, size, type of coupling feature) of one coupling feature 719 can differ from one or more corresponding characteristics of one or more of the other coupling features 719. Further, the characteristics of a coupling feature 719 can vary from what is shown in FIGS. 5A through 7C in order to complement a coupling feature 571 of the housing 585 and/or an independent coupling feature 518.

The frame extension 720 of the frame 710 extends downward from one end or side of the frame body 711. The frame extension 720 can extend substantially perpendicularly from the frame body 711, as in this case. Alternatively, the frame extension 720 can extend at an acute or obtuse angle relative to the frame body 711. The frame extension 720 can include one or more coupling features. For example, in this case, the frame extension 720 includes aperture 721 and aperture 722, both of which traverse the thickness of the frame extension 720 and both of which are forms of coupling features. In alternative embodiments, the aperture 721 and/or the aperture 722 can be coupling features having other configurations (e.g., a protrusion, a slot, a tab, a retractable pin) that complement the curved slot 841 (or other form of coupling feature) and/or the curved slot 842 of the bracket 830.

The aperture 721 of the frame extension 720 is configured to directly or indirectly couple to the curved slot 841 (discussed below) of the bracket 830. In certain example embodiments, the aperture 721 of the frame extension 720 is slidably coupled to the curved slot 841 of the bracket 830. In this case, the aperture 721 of the frame extension 720 is indirectly coupled to the curved slot 841 of the bracket 830 using independent coupling feature 580-1 in the form of, for example, a pin, a rivet, a bolt/nut combination, and/or a screw.

The aperture 722 of the frame extension 720 is configured to directly or indirectly couple to the curved slot 842 (discussed below) of the bracket 830. In certain example embodiments, the aperture 722 of the frame extension 720 is slidably coupled to the curved slot 842 of the bracket 830. In this case, the aperture 722 of the frame extension 720 is indirectly coupled to the curved slot 842 of the bracket 830 using independent coupling feature 580-2 in the form of, for example, a pin, a rivet, a bolt/nut combination, and/or a screw.

The frame extension 725 of the frame 710 extends downward from one end or side of the frame body 711. In certain example embodiments, the frame extension 725 extends downward from an opposite end or side of the frame body 711 relative to the frame extension 720. The frame extension 725 can extend substantially perpendicularly from the frame body 711, as in this case. In some cases, the frame extension 725 can extend at an acute or obtuse angle relative to the frame body 711. The frame extension 725 can include one or more coupling features. For example, in this case, the frame extension 725 includes aperture 726 and aperture 727, both of which traverse the thickness of the frame extension 725 and both of which are forms of coupling features. In alternative embodiments, the aperture 726 and/or the aperture 727 can be coupling features having other configurations (e.g., a protrusion, a slot, a tab, a retractable pin) that complement the curved slot 846 (or other form of coupling feature) and/or the curved slot 848 of the bracket 830.

The aperture 726 of the frame extension 725 is configured to directly or indirectly couple to the curved slot 846 (discussed below) of the bracket 830. In certain example embodiments, the aperture 726 of the frame extension 725 is slidably coupled to the curved slot 846 of the bracket 830. In this case, the aperture 726 of the frame extension 725 is indirectly coupled to the curved slot 846 of the bracket 830 using independent coupling feature 580-3 in the form of, for example, a pin, a rivet, a bolt/nut combination, and/or a screw.

The aperture 727 of the frame extension 725 is configured to directly or indirectly couple to the curved slot 848 (discussed below) of the bracket 830. In certain example embodiments, the aperture 727 of the frame extension 725 is slidably coupled to the curved slot 848 of the bracket 830. In this case, the aperture 727 of the frame extension 725 is indirectly coupled to the curved slot 848 of the bracket 830 using independent coupling feature 580-4 in the form of, for example, a pin, a rivet, a bolt/nut combination, and/or a screw. In some cases, the frame extension 725 can have a different shape and/or size relative to the frame extension 720. In this example, the frame extension 725 is longer than the frame extension 720.

The frame extension 725 can also include a curved stop slot 728 (a type of coupling feature) that is configured to help fix the tilt angle (e.g., angle 475) between the frame 710 and the bracket 830. The curved stop slot 728 can be configured to directly or indirectly couple to the stop aperture 847 (discussed below) of the bracket extension 845 of the bracket 830. In this case, the curved stop slot 728 is configured to be indirectly coupled to the stop aperture 847 of the bracket extension 845 using of a stop feature 593, which is configured to be disposed in some or all of the curved stop slot 728. In this way, the stop feature 593 can fix a position of the frame 710 relative to the bracket 830 when the stop feature 593 presses into the frame extension 725 and when the stop feature 593 is sufficiently engaged with the stop aperture 847 in the bracket extension 845 of the bracket 830.

The bracket 830 of the direct drive optic tilt mechanism 505 of the recessed luminaire system 599 in this case includes a bracket base 831, a first bracket extension 840, and a second bracket extension 845. The bracket base 831 in this example is substantially planar and has a large opening 832 (also sometimes called a bracket base opening 832 herein) that traverses the thickness of the bracket base 831. In some cases, the opening 832 has a center point 834 (also sometimes called the bracket base center point 834 herein) that is substantially coincident with the center of the bracket base 831.

A center axis 835 passes through the center point 834 of the opening 832 in the bracket base 831 substantially perpendicular to the bracket base 831. In certain example embodiments, the center axis 715 of the frame 710 also passes through the center point 834 of the opening 832 in the bracket base 831 to form the angle (e.g., angle 475) between the frame 710 and the bracket 830 through some or all of the range of motion of the frame 710 relative to the bracket 830. The opening 832 can have any characteristics (e.g., shape, size) that allow the light emitted by the one or more light sources (e.g., light sources 186) and/or other components (e.g., a reflector, a trim) to be disposed therein during operation of the recessed luminaire system 599.

In certain example embodiments, the bracket base 831 also includes one or more coupling features 838 that are configured to control some other orientation (e.g., rotation), aside from tilt, of the bracket 830 and/or other components of the recessed luminaire system 599. In this case, there is one coupling feature 838 in the form of an aperture that traverses the thickness of the bracket base 831 adjacent to the bracket extension 840. The coupling feature 838 is configured to indirectly couple to a bracket swivel base 876 using an independent coupling feature 588 in the form of a screw. When the coupling feature 588 is disposed in the coupling feature 838 in the bracket base 831 and contacts the bracket swivel base 876, the rotational orientation of the bracket 830, the frame 710, and the housing 585 can be fixed relative to the bracket swivel base 876. When the coupling feature 588 does not contact the bracket swivel base 876, the rotational orientation of the bracket 830, the frame 710, and the housing 585 can be changed relative to the bracket swivel base 876.

If the bracket base 831 has multiple coupling features 838, then those coupling features 838 can be arranged in any of a number of ways with respect to each other. In addition, or in the alternative, when there are multiple coupling features 838 of the bracket base 831, one or more characteristics (e.g., shape, size, type of coupling feature) of one coupling feature 838 can differ from one or more corresponding characteristics of one or more of the other coupling features 838. Further, the characteristics of the coupling feature 838 can vary from what is shown in FIGS. 5A through 6 and 8C in order to complement the coupling feature 588 and/or a complementary coupling feature of the bracket swivel base 876.

In certain example embodiments, the bracket base 831 also includes one or more coupling features 839 that are configured to directly or indirectly couple to the anchor 659 of the drive assembly 650. In this case, there are two coupling features 839 (coupling feature 839-1 and coupling feature 839-2) in the form of apertures that traverse the thickness of the bracket base 831 adjacent to the bracket extension 840. In this case, the coupling features 839 are configured to indirectly couple to the anchor 659 using independent coupling features 682 in the form of screws, bolts, rivets, pins, and the like. When the coupling feature 682-1 is disposed in the coupling feature 839-1 in the bracket base 831 and a complementary coupling feature 677-1 (e.g., an aperture) in the anchor 659, and when coupling feature 682-2 is disposed in the coupling feature 839-2 in the bracket base 831 and another complementary coupling feature 677-2 (e.g., another aperture) in the anchor 659, the anchor 659 is fixedly coupled to the bracket base 831 of the bracket 830.

If the bracket base 831 has multiple coupling features 839, then those coupling features 839 can be arranged in any of a number of ways with respect to each other. In addition, or in the alternative, when there are multiple coupling features 839 of the bracket base 831, one or more characteristics (e.g., shape, size, type of coupling feature) of one coupling feature 839 can differ from one or more corresponding characteristics of one or more of the other coupling features 839. Further, the characteristics of the coupling features 839 can vary from what is shown in FIGS. 5A through 6 and 8C in order to complement the coupling feature 682 and/or a complementary coupling feature 677 of the anchor 659.

In some cases, rather than being a separate component, a coupling feature 682 can be integrated with a coupling feature 839 of the bracket 830 and/or a complementary coupling feature 677 of the anchor 659. For example, instead of coupling feature 682-1 being part of the direct drive optic tilt mechanism 505, the complementary coupling feature 677 (e.g., an aperture) of the anchor 659 can instead take the form of a downward protrusion. In such a case, the coupling feature 839-1 of the bracket base 831 of the bracket 830 would remain unchanged, and the complementary coupling feature 677 of the anchor 659 can be directly coupled to the coupling feature 839-1 of the bracket 830. A number of other alternatives could be implemented using replacements and/or alternatives to one or more of the coupling features 682 of the direct drive optic tilt mechanism 505 to allow the anchor 659 to be fixedly coupled to the bracket 830.

The bracket extension 840 of the bracket 830 extends upward from one end or side of the bracket base 831. The bracket extension 840 can extend substantially perpendicularly from the bracket body 831, as in this case. Alternatively, the bracket extension 840 can extend at an acute or obtuse angle relative to the bracket base 831. The bracket extension 840 can include one or more coupling features. For example, in this case, the bracket extension 840 includes a curved slot 841 and a curved slot 842, both of which traverse the thickness of the bracket extension 840 and both of which are forms of coupling features. In alternative embodiments, the curved slot 841 and/or the curved slot 842 can be coupling features having other configurations (e.g., a protrusion, a slot, a tab, a retractable pin) that complement the aperture 721 (or other form of coupling feature) and/or the aperture 722 of the frame 710.

In yet other alternative embodiments, the bracket extension 840 (as well as other bracket extensions discussed herein) can have more than 2 (e.g., 3, 5) curved slots. Also, the number of curved slots in one extension of a bracket can be the same as, or different than, the number of curved slots in the other extension of the bracket. Further, the characteristics (e.g., length, arc radius, width) of one curved slot of a bracket can be the same as, or different than, the corresponding characteristics of one or more of the other curved slots of the bracket, regardless of whether another curved slot is on the same extension or the other extension of the bracket.

The curved slot 841 of the bracket extension 840 of the bracket 830 is configured to directly or indirectly couple to the aperture 721 of the frame 710. In certain example embodiments, the curved slot 841 of the bracket 830 is slidably coupled to the aperture 721 of the frame extension 720. In this case, the curved slot 841 of the bracket 830 is indirectly coupled to the aperture 721 of the frame extension 720 using independent coupling feature 580-1 in the form of, for example, a pin, a rivet, a bolt/nut combination, and a/or screw.

The curved slot 842 of the bracket extension 840 of the bracket 830 is configured to directly or indirectly couple to the aperture 722 of the frame extension 720. In certain example embodiments, the curved slot 842 of the bracket 830 is slidably coupled to the aperture 722 of the frame extension 720. In this case, the curved slot 842 of the bracket 830 is indirectly coupled to the aperture 722 of the frame extension 720 using independent coupling feature 580-2 in the form of, for example, a pin, a rivet, a bolt/nut combination, and/or a screw.

In certain example embodiments, the curved slot 842 and the curved slot 841 of the bracket extension 840 of the bracket 830 may be oriented in a particular way with respect to each other. The orientation of the curved slot 841 and the curved slot 842 relative to each other can be based, for example, on a desired outcome of the movement of the frame 710 relative to the bracket 830. For example, the desired outcome of the movement of the frame 710 relative to the bracket 830 may be for the center axis 715 of the frame 710 to intersect the center point 834 of the bracket 830. In such a case, as in this example, the curved slot 841 is longer and has a larger radius relative to the curved slot 842. Also, the curved slot 841 and the curved slot 842 are offset relative to each other so that the center of the radius for the two curved slots have different locations.

The bracket extension 845 of the bracket 830 extends upward from one end or side of the bracket base 831. The bracket extension 845 can extend substantially perpendicularly from the bracket body 831, as in this case, making the bracket extension 845 parallel to the bracket extension 840. Alternatively, the bracket extension 845 can extend at an acute or obtuse angle relative to the bracket base 831. The bracket extension 845 can include one or more coupling features. For example, in this case, the bracket extension 845 includes a curved slot 846 and a curved slot 848, both of which traverse the thickness of the bracket extension 845 and both of which are forms of coupling features. In alternative embodiments, the curved slot 846 and/or the curved slot 848 can be coupling features having other configurations (e.g., a protrusion, a slot, a tab, a retractable pin) that complement the aperture 726 (or other form of coupling feature) and/or the aperture 727 of the frame 710.

The curved slot 846 of the bracket extension 845 of the bracket 830 is configured to directly or indirectly couple to the aperture 726 of the frame 710. In certain example embodiments, the curved slot 846 of the bracket 830 is slidably coupled to the aperture 726 of the frame extension 725. In this case, the curved slot 846 of the bracket 830 is indirectly coupled to the aperture 726 of the frame extension 725 using independent coupling feature 580-3 in the form of, for example, a pin, a rivet, a bolt/nut combination, and a/or screw.

The curved slot 848 of the bracket extension 845 of the bracket 830 is configured to directly or indirectly couple to the aperture 727 of the frame extension 725. In certain example embodiments, the curved slot 848 of the bracket 830 is slidably coupled to the aperture 727 of the frame extension 725. In this case, the curved slot 848 of the bracket 830 is indirectly coupled to the aperture 727 of the frame extension 725 using independent coupling feature 580-4 in the form of, for example, a pin, a rivet, a bolt/nut combination, and/or a screw.

In certain example embodiments, the curved slot 848 and the curved slot 846 of the bracket extension 845 of the bracket 830 may be oriented in a particular way with respect to each other. The orientation of the curved slot 846 and the curved slot 848 relative to each other can be based, for example, on a desired outcome of the movement of the frame 710 relative to the bracket 830. For example, the desired outcome of the movement of the frame 710 relative to the bracket 830 may be for the center axis 715 of the frame 710 to intersect the center point 834 of the bracket 830. In such a case, as in this example, the curved slot 846 is longer and has a larger radius relative to the curved slot 848. Also, the curved slot 846 and the curved slot 848 are offset relative to each other so that the center of the radius for the two curved slots have different locations.

In certain example embodiments, the bracket extension 845 of the bracket 830 also includes one or more stop apertures 847 that are configured to fix the angle (e.g., angle 475) of tilt between the bracket 830 and the combination of the frame 710 and the housing 585 of the recessed luminaire system 599. Specifically, a stop aperture 847 (a form of a coupling feature) of the bracket extension 845 of the bracket 830 can have mating threads disposed along its inner surface and can be configured to directly or indirectly couple to a stop feature 593, which in this case is in the form of a screw with a head large enough allow a user (e.g., user 184) to rotate by hand (a form of a user device 181) or a short screwdriver (another form of a user device 181).

As discussed above, one or more coupling features 580 can be part of the direct drive optic tilt mechanism 505 to allow the direct drive optic tilt mechanism 505 to operate. There can be one coupling feature 580 or multiple coupling features 580 in the direct drive optic tilt mechanism 505. In this case, there are four coupling features 580 in the direct drive optic tilt mechanism 505. Each coupling feature 580 in this example is in the form of a bolt, a screw, a pin, a rivet, or some similar component that has an elongated shaft. In alternative embodiments, a coupling feature 580 can have any of a number of characteristics that complement the other components (e.g., the frame 710, the bracket 830, the drive assembly 650) of the direct drive optic tilt mechanism 505 to which the coupling feature 580 directly or indirectly couples. The characteristics (e.g., length, thickness, type of coupling feature) of one coupling feature 580 can be the same as, or different than, the corresponding characteristics of one or more of the other coupling features 580 in the direct drive optic tilt mechanism 505.

Coupling feature 580-1 in this example is disposed in the aperture 721 in the frame extension 720 of the frame 710, the curved slot 841 in the bracket extension 840 of the bracket 830, and a tilt arm aperture 656 (discussed below) in the tilt arm 655 (discussed below) of the drive assembly 650 (discussed below). Coupling feature 580-2 in this example is disposed in the aperture 722 in the frame extension 720 of the frame 710 and the curved slot 842 in the bracket extension 840 of the bracket 830. Coupling feature 580-3 in this example is disposed in the aperture 726 in the frame extension 725 of the frame 710 and the curved slot 846 in the bracket extension 845 of the bracket 830. Coupling feature 580-4 in this example is disposed in the aperture 727 in the frame extension 725 of the frame 710 and the curved slot 848 in the bracket extension 845 of the bracket 830.

In some cases, rather than being a separate component, a coupling feature 580 can be integrated with a coupling feature of the frame 710 and/or a coupling feature of the bracket 830. For example, instead of coupling feature 580-4 being part of the direct drive optic tilt mechanism 505, the aperture 727 in the frame extension 725 of the frame 710 can be replaced with a coupling feature in the form of a retractable pin that has a default position in an elongated state. In such a case, the corresponding curved slot 848 in the bracket extension 845 of the bracket 830 would remain unchanged. A number of other alternatives could be implemented using replacements and/or alternatives to one or more of the coupling features 580 of the direct drive optic tilt mechanism 505 to allow the frame 710 to rotate relative to the bracket 830.

When the independent stop feature 593 is engaged with (in this case, inserted into) the stop aperture 847 of the bracket extension 845, the stop feature 593 is disposed within the curved stop slot 728 in the frame extension 725 of the frame 710, which is positioned adjacent to the inner surface of the bracket extension 845. The resulting friction between the stop feature 593 and the frame extension 725 prevents the frame 710 from further moving relative to the bracket 830, thereby fixing the angle (e.g., angle 475). In addition, or in the alternative, one or more coupling features 847 can be disposed in the bracket extension 840 of the bracket 830. In some cases, stop feature 593 can be a coupling feature having any of a number of other configurations.

In some cases, one of the bracket extensions (e.g., bracket extension 840, bracket extension 845) can have disposed thereon a legend 849. The legend 849 can indicate, for example, the amount of tilt (i.e., the angle 475) between the frame 710 and the bracket 830. The legend 849 can be positioned in such a way that is it visible to a user (e.g., user 184) from a volume of space (e.g., volume of space 188) below a structure (e.g., structure 189) when the recessed luminaire system 599 is installed with respect to the structure. The legend 849 can indicate some or all of the range of angles 475. For example, the legend 849 can start at 0° and end at 45°. The legend 849 can be an optional feature. In some cases, multiple legends 849 can be disposed on one or both of the bracket extensions of the bracket 830.

The drive assembly 650 of the recessed luminaire system 599 can be configured to cause movement in the tilt angle 475 between the frame 710 and the bracket 830. The drive assembly 650 can be coupled to the frame 710 and the bracket 830. The drive assembly 650 can include one or more of a number of features and/or components. For example, in this case, the drive assembly 650 includes a tilt arm 655, an anchor 659, a shaft 658 (e.g., in the form of a screw, a bolt, a rivet, a pin), and a drive mechanism 651 coupled to the proximal end of the tilt arm 655 using the shaft 658 and the anchor 659.

The tilt arm 655 of the drive assembly 650 is configured to force the frame 710 to rotate relative to the bracket 830 based on based on engagement of the drive mechanism 651. The tilt arm 655 of the drive assembly 650 can have any of a number of configurations. For example, in this case, the tilt arm 655 is a substantially planar segment with a coupling feature 657 (in this case, in the form of an aperture) at its proximal end and a coupling feature 656 (in this case, in the form of a slot) at its distal end. The shaft 658 is coupled to the drive mechanism 651 and is also engaged with (in this case, disposed within) the coupling feature 657 at the proximal end of the tilt arm 655.

The drive mechanism 651 of the drive assembly 650 is configured to move (e.g., rotate) based on a force applied to it by a user (e.g., user 184) through a user device (181). The drive mechanism 651 can be configured to be accessible through the opening 832 in the bracket base 831 of the bracket 830. In this way, when the recessed luminaire that includes the recessed luminaire system 599 is installed with respect to a structure (e.g., structure 189), the user can access the drive mechanism 651 without uninstalling the recessed luminaire from the structure. For example, the drive mechanism 651 can be positioned between the bracket base 831 of the bracket 830 and the frame body 711 of the frame 710.

In order to rotate the frame 710 relative to the bracket 830, the drive mechanism 651 is coupled to the coupling feature 657 at the proximal end of the tilt arm 655. In certain example embodiments, the drive mechanism 651, when engaged (e.g., by a user device 181 of a user 184), moves (e.g., rotates), which in turn causes the tilt arm 655 to move (e.g., rotate about the coupling feature 657 at the proximal end). As the tilt arm 655 moves at the proximal end, the distal end of the tilt arm 655 also moves, which in turn causes the frame 710 to move via the coupling feature 580-1 slidably coupled to the coupling feature 656 of the tilt arm 655 and rotatably coupled to the aperture 721 of the frame extension 720 of the frame 710. To help keep the frame 710 in proper alignment, the opposite side of the frame 710 also rotates at the same rate via the coupling feature 580-3 slidably coupled to the curved slot 846 of the bracket extension 845 of the bracket 830 and rotatably coupled to the aperture 726 of the frame extension 725 of the frame 710.

In order to ensure that the center axis 715 of the frame 710 intersects the center point 834 of the opening 832 of the bracket base 831 of the bracket 830 throughout the entire range of motion (all of the angles 475) between the frame 710 and the bracket 830, the coupling feature 580-2 disposed in the curved slot 842 in the bracket extension 840 of the bracket 830 and the aperture 722 in the frame extension 720 of the frame 710 simultaneously work in concert with the coupling of the coupling feature 580-4 disposed in the curved slot 848 in the bracket extension 845 of the bracket 830 and the aperture 727 in the frame extension 725 of the frame 710.

The proximal end of the drive mechanism 651 of the drive assembly 650 is configured to be engaged by a user device (e.g., user device 181) of a user (e.g., user 184). The proximal end of the drive mechanism 651 can have any of a number of configurations. In certain example embodiments, the proximal end of the drive mechanism 651 is configured to be rotated. For example, in this case, the proximal end of the drive mechanism 651 includes a wing nut that can be turned by the hand (a form of a user device

181) of a user (e.g., user 184). As the wing nut is turned, the shaft 658 rotates, which in turn causes the tilt arm 655 to rotate.

In certain example embodiments, the shaft 658 of the drive assembly 650 is configured to transfer or translate the force that is applied to the drive mechanism 651 by a user device to the proximal end of the tilt arm 655. The shaft 658 can be suitably rigid and non-bendable to handle the torque and other forces that can be exerted upon it. The shaft 658 can also be configured to include one or more of a number of features (e.g., a flared distal end, mating threads at the distal end with a nut threadably attached) to couple the distal end of the shaft 658 to the coupling feature 657 at the proximal end of the tilt arm 655. In some cases, the shaft 658 and the drive mechanism 651 can be integrated as a single piece or component.

The anchor 659 of the drive assembly 650 is configured to provide a stable (e.g., fixed) mounting of the drive assembly 650 to the bracket 830. In certain example embodiments, the anchor 659 includes one or more coupling features 677 that are configured to directly or indirectly couple the anchor 659 to the bracket base 831 of the bracket 830. In this case, there are two coupling features 677 (coupling feature 677-1 and coupling feature 677-2), each in the form of an aperture that traverses the thickness of the anchor 659. In this case, the coupling features 677 are configured to indirectly couple to the coupling features 639 in the bracket base 831 of the bracket 830 using the independent coupling features 682 (discussed above). When the coupling feature 682-1 is disposed in the coupling feature 677-1 in the anchor 659 and a complementary coupling feature 839-1 in the bracket base 831, and when the coupling feature 682-2 is disposed in the coupling feature 677-2 in the anchor 659 and a complementary coupling feature 839-2 in the bracket base 831, the anchor 659 is fixedly coupled to the bracket base 831 of the bracket 830.

If the anchor 659 has multiple coupling features 677, then those coupling features 677 can be arranged in any of a number of ways with respect to each other. In addition, or in the alternative, when there are multiple coupling features 677 of the anchor 659, one or more characteristics (e.g., shape, size, type of coupling feature) of one coupling feature 677 can differ from one or more corresponding characteristics of one or more of the other coupling features 677. Further, the characteristics of the coupling features 677 can vary from what is shown in FIGS. 5A through 6 and 7C in order to complement the coupling feature 682 and/or a complementary coupling feature 839 of the bracket 830.

Figure 9A:
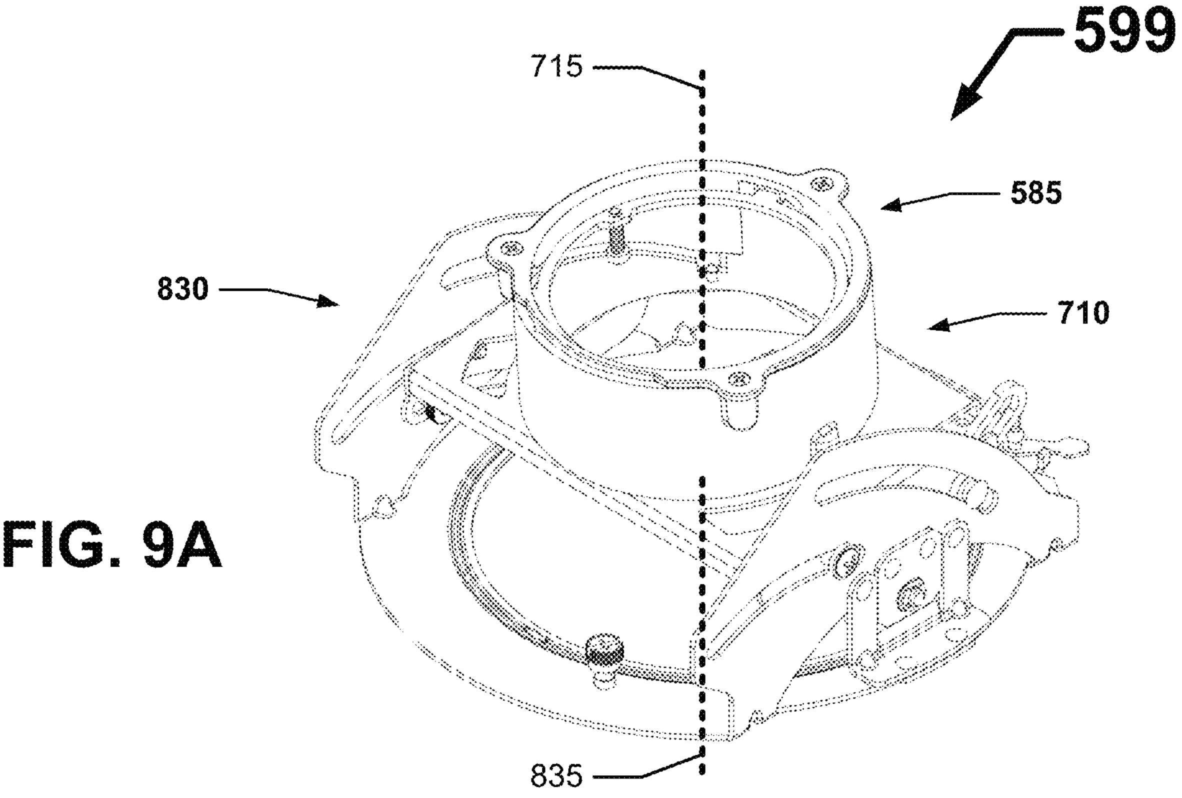
FIGS. 9A and 9B show perspective views of a recessed luminaire that includes the recessed luminaire system of FIGS. 5A and 5B according to certain example embodiments.
Figure 9B:
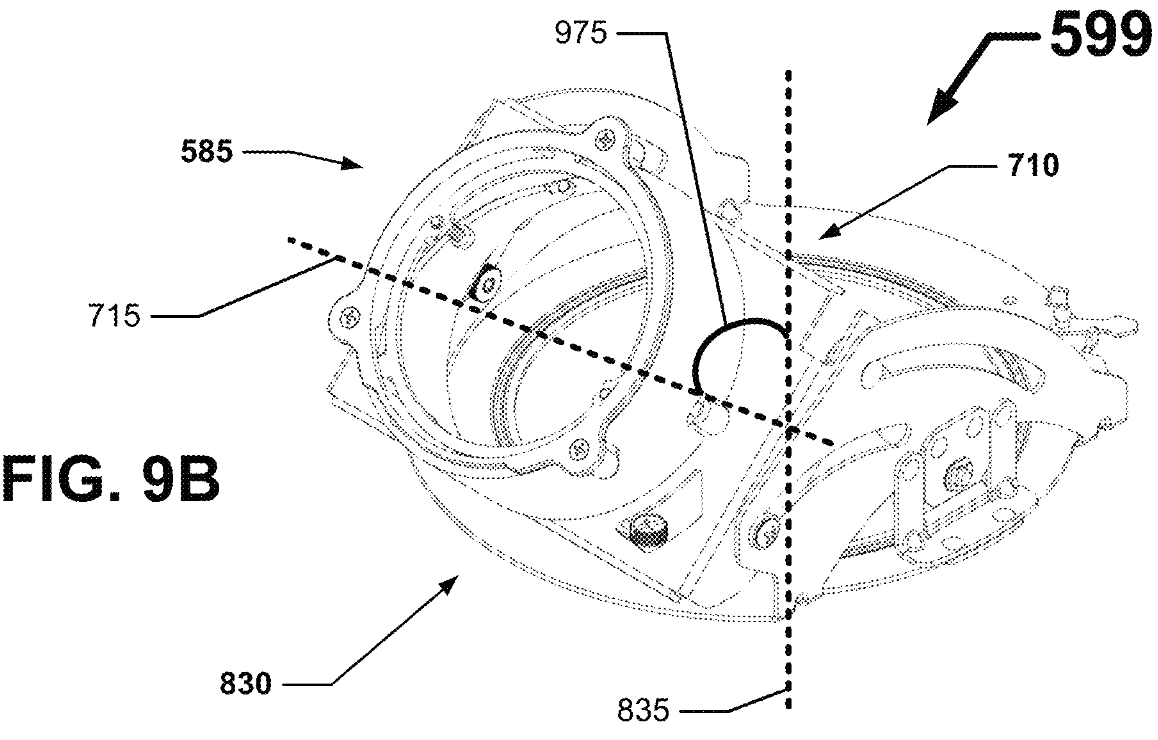

FIGS. 9A and 9B show perspective views of the recessed luminaire system 599 of FIGS. 5A and 5B according to certain example embodiments. Referring to FIGS. 1 through 9B, in the recessed luminaire system 599 of FIG. 9A, the center axis 715 that passes through the center point of the opening in the frame body of the frame 710 substantially perpendicular to the frame body is coincident with the center axis 835 that passes through the center point of the opening in the bracket base of the bracket 830 substantially perpendicular to the bracket base. As a result, there is no angle between the center axis 715 and the center axis 835, which means that there is no tilt. By contrast, in the recessed luminaire system 599 of FIG. 9B, the center axis 715 and the center axis 835 form an angle 975, which represents the amount of tilt the combination of the frame 710 and housing 585 has made relative to the bracket 830 of the recessed luminaire system 599.

The angle 975 is achieved by using the drive assembly of the example direct drive optic tilt mechanism to rotate (tilt) the frame 710 relative to the bracket 830. In certain example embodiments, the center axis 715 of the frame 710 intersects the center point of the opening in the bracket base of the bracket 830 throughout the entire potential range of motion of the frame 710 relative to the bracket 830, including the position of the frame 710 captured in FIG. 9B when forming the angle 975 (e.g., approximately) 45°.

Figure 10A:
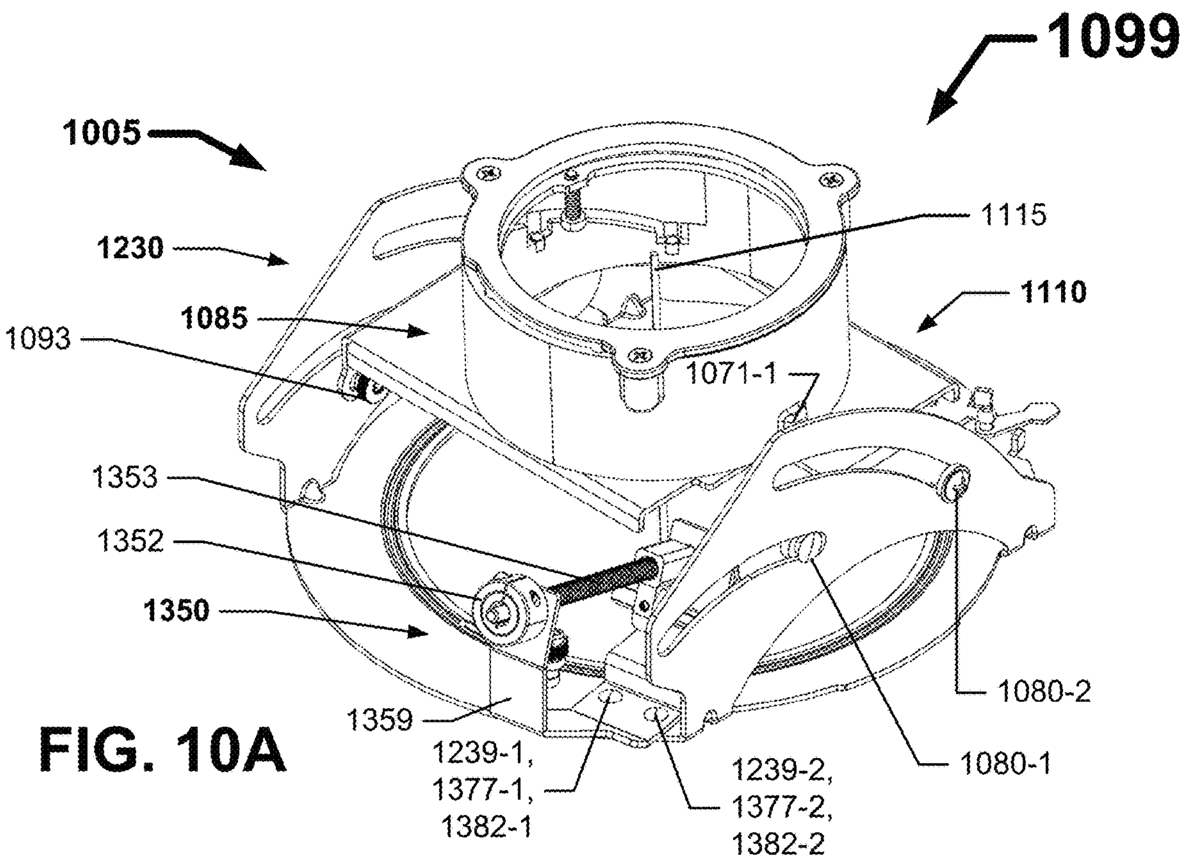
FIGS. 10A through 10F show another recessed luminaire system according to certain example embodiments.
Figure 10B:
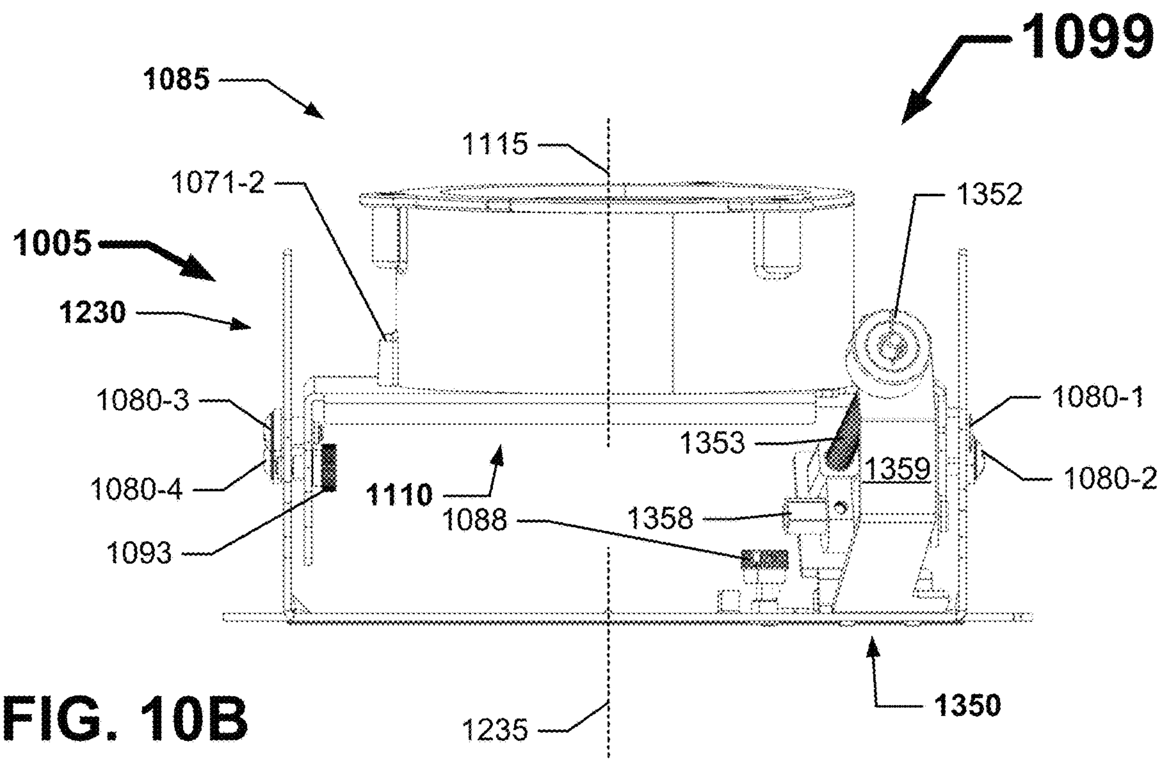
Figure 10C:
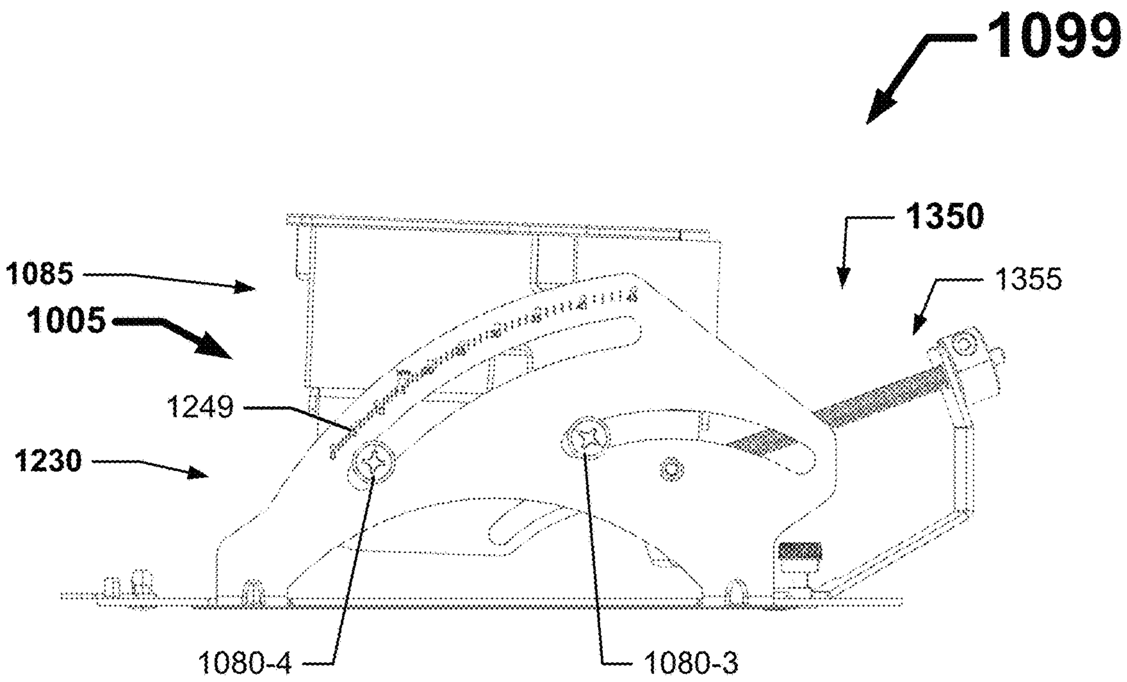
Figure 10D:
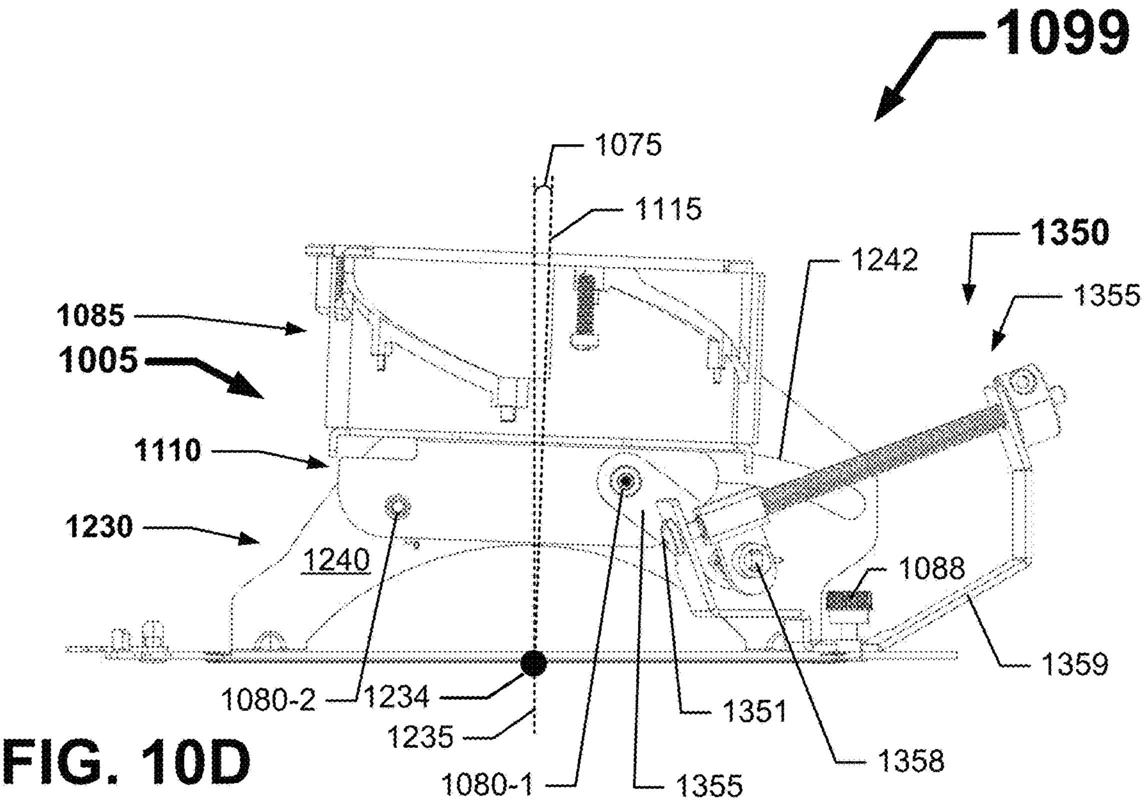
Figure 10E:
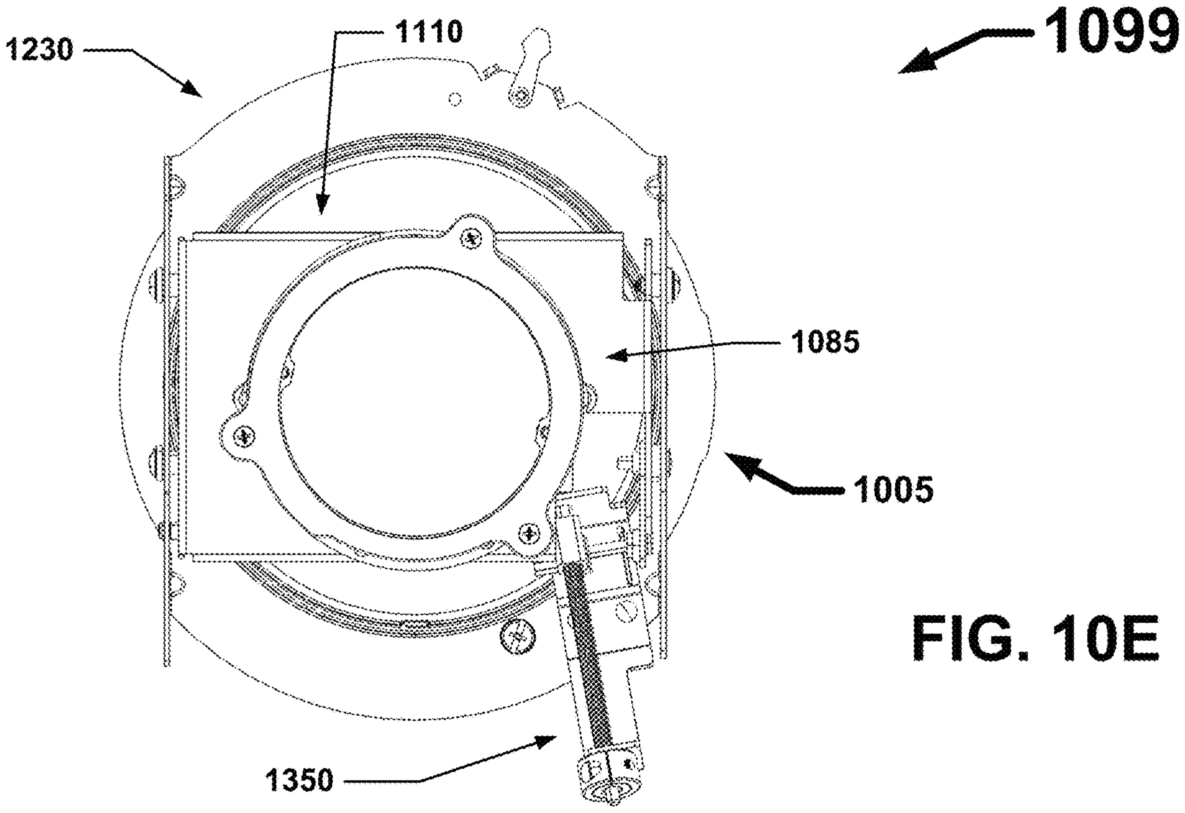
Figure 10F:
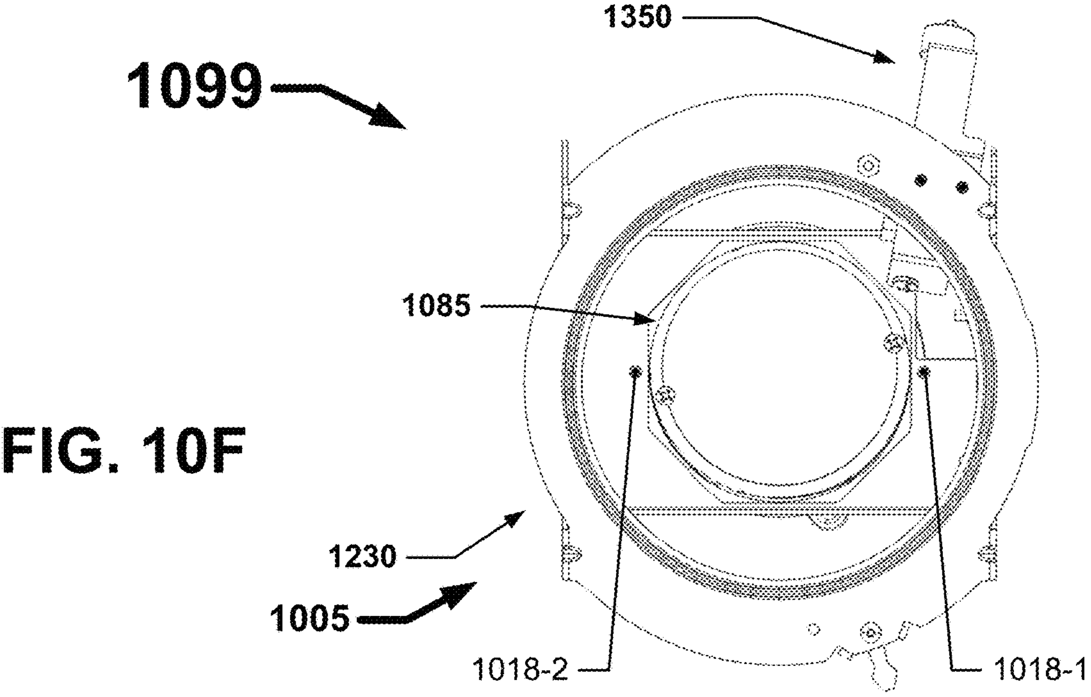

FIGS. 10A through 10F show another recessed luminaire system 1099 according to certain example embodiments. Specifically, FIG. 10A shows a top-side perspective view of the recessed luminaire system 1099. FIG. 10B shows a front view of the recessed luminaire system 1099. FIG. 10C shows a side view of the recessed luminaire system 1099. FIG. 10D shows a sectional side view of the recessed luminaire system 1099. FIG. 10E shows a top view of the recessed luminaire system 1099. FIG. 10F shows a bottom view of the recessed luminaire system 1099.

Figure 11:
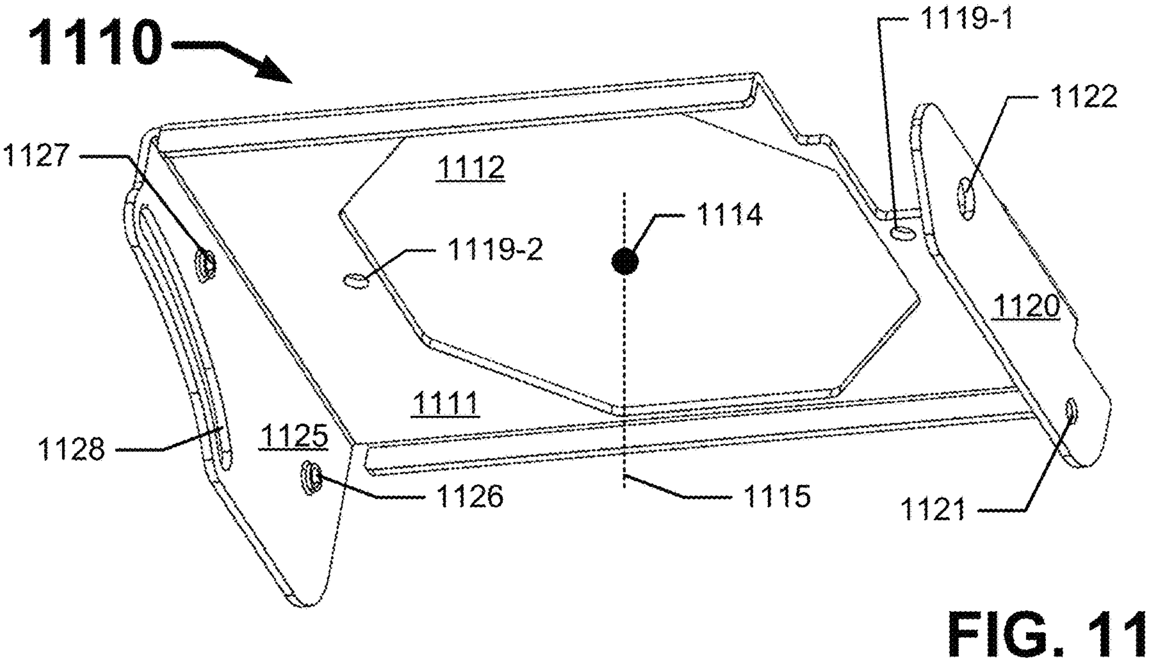
FIG. 11 shows the frame of the recessed luminaire system of FIGS. 10A through 10F according to certain example embodiments.
Figure 12:
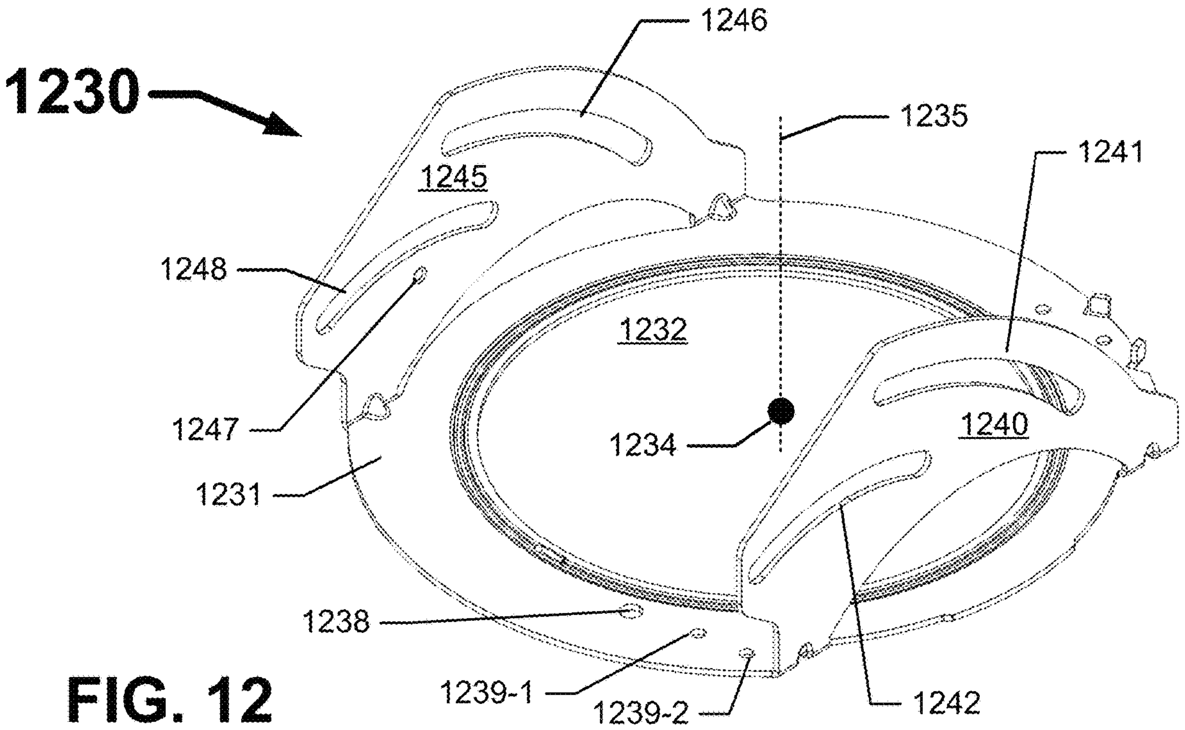
FIG. 12 shows the bracket of the recessed luminaire system of FIGS. 10A through 10F according to certain example embodiments.
Figure 13A:
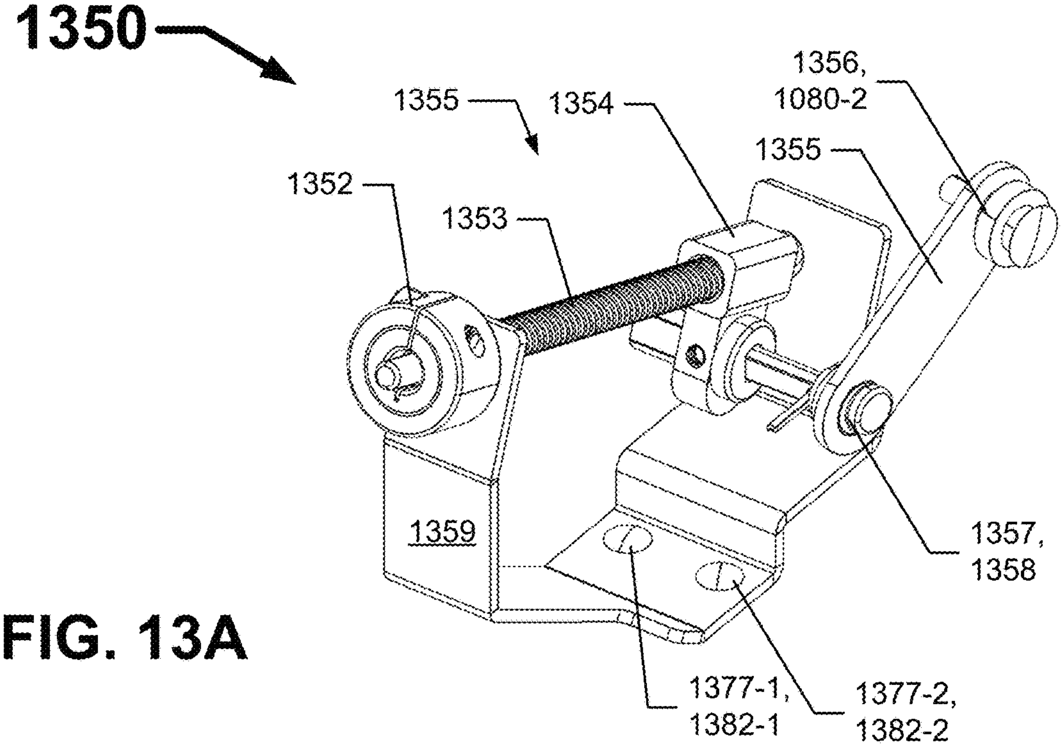
FIGS. 13A and 13B show the direct drive optic tilt mechanism of the recessed luminaire system of FIGS. 10A through 10F according to certain example embodiments.
Figure 13B:
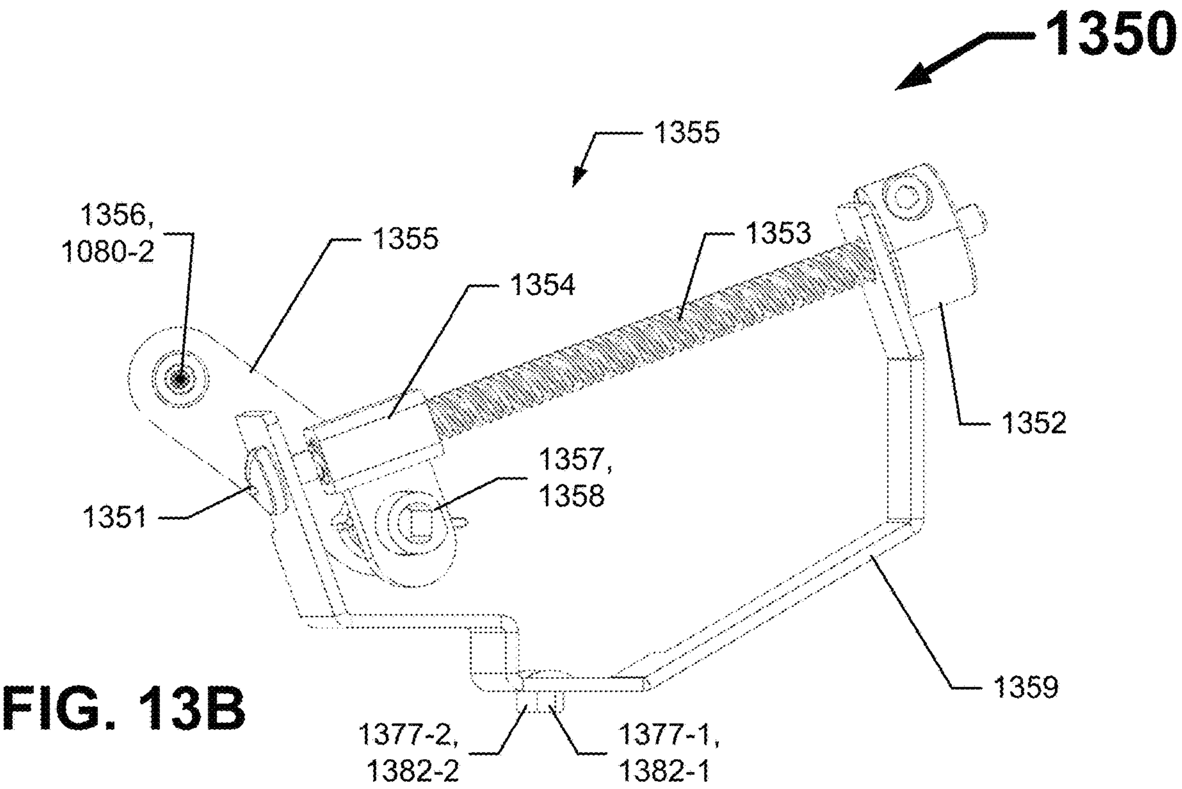

FIG. 11 shows the frame 1110 of the recessed luminaire system 1099 of FIGS. 10A through 10F according to certain example embodiments. FIG. 12 shows the bracket 1130 of the recessed luminaire system 1099 of FIGS. 10A through 10F according to certain example embodiments. FIGS. 13A and 13B show a front-top-side perspective view and a side view, respectively, of the drive assembly 1350 of the recessed luminaire system 1099 of FIGS. 10A through 10F according to certain example embodiments.

Referring to FIGS. 1 through 13B, the recessed luminaire system 1099 of FIGS. 10A through 13B includes a housing 1085, a frame 1110, a bracket 1230, and a drive assembly 1350. The housing 1085, the frame 1110, the bracket 1230, and the drive assembly 1350 of the recessed luminaire assembly 1099 (including components and/or portions thereof) can be substantially the same as the housings, the frames, the brackets, and the drive assemblies (including corresponding components and/or portions thereof) discussed above with respect to FIGS. 1 through 9B, except as described below. For example, the housing 1085 in this case is generally cylindrical in shape. The housing 1085 has two coupling features 1071 in the form of threaded apertures within protrusions that extend from the outer perimeter of the housing 1085 toward the bottom of the housing 1085. Coupling feature 1071-1 and coupling feature 1071-2 are positioned substantially opposite each other along the outer perimeter of the housing 1085.

The frame 1110 of the direct drive optic tilt mechanism 1005 of the recessed luminaire system 1099 in this case includes a frame body 1111, a first frame extension 1120, and a second frame extension 1125. The frame body 1111 in this example is substantially planar and has a large opening 1112 that traverses the frame body 1111. The opening 1112 has a center point 1114 that is substantially coincident with the center of the frame body 1111. A center axis 1115 passes through the center point 1114 of the opening 1112 in the frame body 1111 substantially perpendicular to the frame body 1111. The opening 1112 can have any characteristics (e.g., shape, size) that allow the various components (e.g., light sources 186, lens) within the housing 1085 to function during operation of the recessed luminaire system 1099.

In certain example embodiments, the frame body 1111 also includes one or more coupling features 1119 that are configured to directly or indirectly couple to the housing 1085. In this case, there are two coupling features 1119 (coupling feature 1119-1 and coupling feature 1119-2) in the form of apertures that traverse the thickness of the frame body 1111 adjacent to opposite sides of the opening 1112. In this example, a coupling feature 1119 (e.g., coupling feature 1119-1, coupling feature 1119-2) is configured to indirectly couple to a coupling feature 1071 (e.g., coupling feature 1071-1, coupling feature 1071-2) of the housing 1085 using an independent coupling feature 1018 (e.g., coupling feature 1018-1, coupling feature 1018-2) in the form of a screw. When a coupling feature 1018 is disposed in a coupling feature 1119 of the frame body 1111 and a coupling feature 1071 of the housing 1085, the frame 1110 and the housing 1085 become fixedly coupled to each other. In some cases, the frame 1110 and the housing 1085 can be decoupled from each other by removing the independent coupling features 1018 from the coupling features 1071 of the housing 1085.

The frame extension 1120 of the frame 1110 extends downward from one end or side of the frame body 1111. The frame extension 1120 extends substantially perpendicularly from the frame body 1111 in this case. The frame extension 1120 in this example includes aperture 1121 and aperture 1122, both of which traverse the thickness of the frame extension 1120 and both of which are forms of coupling features. In this case, the aperture 1121 of the frame extension 1120 is indirectly and movably coupled to the curved slot 1241 of the bracket 1230 using independent coupling feature 1080-2 in the form of, for example, a pin, a rivet, a bolt/nut combination, and/or a screw. Also, in this case, the aperture 1122 of the frame extension 1120 is indirectly and movably coupled to the curved slot 1242 of the bracket 1230 and the tilt arm aperture 1356 in the tilt arm 1355 of the drive assembly 1350 using independent coupling feature 1080-1 in the form of, for example, a pin, a rivet, a bolt/nut combination, and/or a screw.

The frame extension 1125 of the frame 1110 extends downward from an opposite end or side of the frame body 1111 relative to the frame extension 1120. The frame extension 1125 extends substantially perpendicularly from the frame body 1111 in this case. The frame extension 1125 in this case includes aperture 1126 and aperture 1127, both of which traverse the thickness of the frame extension 1125 and both of which are forms of coupling features. The aperture 1126 of the frame extension 1125 is indirectly and movably coupled to the curved slot 1246 of the bracket 1230 using independent coupling feature 1080-4 in the form of, for example, a pin, a rivet, a bolt/nut combination, and/or a screw. The aperture 1127 of the frame extension 1125 is indirectly and movably coupled to the curved slot 1248 of the bracket 1230 using independent coupling feature 1080-3 in the form of, for example, a pin, a rivet, a bolt/nut combination, and/or a screw. In this example, the frame extension 1125 is longer than the frame extension 1120.

The frame extension 1125 in this case also includes a curved stop slot 1128 (a type of coupling feature) that is configured to help fix the tilt angle 1075 between the frame 1110 and the bracket 1230. In this case, the curved stop slot 1128 is configured to be indirectly coupled to the stop aperture 1247 of the bracket extension 1245 using of a stop feature 1093, which is configured to be disposed in some or all of the curved stop slot 1128. In this way, the stop feature 1093 can fix a position of the frame 1110 relative to the bracket 1230 when the stop feature 1093 presses into the frame extension 1125 and when the stop feature 1093 is sufficiently engaged with the stop aperture 1247 in the bracket extension 1245 of the bracket 1230.

The bracket 1230 of the direct drive optic tilt mechanism 1005 of the recessed luminaire system 1099 in this case includes a bracket base 1231, a first bracket extension 1240, and a second bracket extension 1245. The bracket base 1231 in this example is substantially planar and has a large opening 1232 (also sometimes called a bracket base opening 1232 herein) that traverses the thickness of the bracket base 1231. The opening 1232 has a center point 1234 (also sometimes called the bracket base center point 1234 herein) that is substantially coincident with the center of the bracket base 1231.

A center axis 1235 passes through the center point 1234 of the opening 1232 in the bracket base 1231 substantially perpendicular to the bracket base 1231. In certain example embodiments, the center axis 1115 of the frame 1110 also passes through the center point 1234 of the opening 1232 in the bracket base 1231 to form the angle 1075 between the frame 1110 and the bracket 1230 through some or all of the range of motion of the frame 1110 relative to the bracket 1230. The opening 1232 can have any characteristics (e.g., shape, size) that allow the light emitted by the one or more light sources (e.g., light sources 186) and/or other components (e.g., a reflector, a trim) to be disposed therein during operation of the recessed luminaire system 1099.

In certain example embodiments, the bracket base 1231 also includes one or more coupling features 1238 that are configured to control some other orientation (e.g., rotation), aside from tilt, of the bracket 1230 and/or other components of the recessed luminaire system 1099. In this case, there is one coupling feature 1238 in the form of an aperture that traverses the thickness of the bracket base 1231 adjacent to the bracket extension 1240. The coupling feature 1238 is configured to indirectly couple to another component (e.g., a bracket swivel base 876) of the recessed luminaire using an independent coupling feature 1088 in the form of a screw. When the coupling feature 1088 is disposed in the coupling feature 1238 in the bracket base 1231 and contacts the bracket swivel base, the rotational orientation of the bracket 1230, the frame 1110, and the housing 1085 can be fixed relative to that component (e.g., the bracket swivel base 876). When the coupling feature 1088 does not contact the other component, the rotational orientation of the bracket 1230, the frame 1110, and the housing 1085 can be changed relative to the other component.

In certain example embodiments, the bracket base 1231 also includes one or more coupling features 1239 that are configured to directly or indirectly couple to the anchor 1359 of the drive assembly 1350. In this case, there are two coupling features 1239 (coupling feature 1239-1 and coupling feature 1239-2) in the form of apertures that traverse the thickness of the bracket base 1231 adjacent to the bracket extension 1240. In this case, the coupling features 1239 are configured to indirectly couple to the anchor 1359 using independent coupling features 1382 in the form of screws, bolts, rivets, pins, and the like. When the coupling feature 1382-1 is disposed in the coupling feature 1239-1 in the bracket base 1231 and a complementary coupling feature 1377-1 (e.g., an aperture) in the anchor 1359, and when coupling feature 1382-2 is disposed in the coupling feature 1239-2 in the bracket base 1231 and another complementary coupling feature 1377-2 (e.g., another aperture) in the anchor 1359, the anchor 1359 is fixedly coupled to the bracket base 1231 of the bracket 1230.

In some cases, rather than being a separate component, a coupling feature 1382 can be integrated with a coupling feature 1239 of the bracket 1230 and/or a complementary coupling feature 1377 of the anchor 1359. For example, instead of coupling feature 1382-1 being part of the direct drive optic tilt mechanism 1005, the complementary coupling feature 1377 (e.g., an aperture) of the anchor 1359 can instead take the form of a downward protrusion. In such a case, the coupling feature 1239-1 of the bracket base 1231 of the bracket 1230 would remain unchanged, and the complementary coupling feature 1377 of the anchor 1359 can be directly coupled to the coupling feature 1239-1 of the bracket 1230. A number of other alternatives could be implemented using replacements and/or alternatives to one or more of the coupling features 1382 of the direct drive optic tilt mechanism 1005 to allow the anchor 1359 to be fixedly coupled to the bracket 1230.

The bracket extension 1240 of the bracket 1230 extends upward from one end or side of the bracket base 1231. The bracket extension 1240 in this case extends substantially perpendicularly from the bracket body 1231. In this case, the bracket extension 1240 includes a curved slot 1241 and a curved slot 1242, both of which traverse the thickness of the bracket extension 1240 and both of which are forms of coupling features. The curved slot 1241 of the bracket extension 1240 of the bracket 1230 is indirectly and slidably coupled to the aperture 1121 of the frame extension 1120 using independent coupling feature 1080-2 in the form of, for example, a pin, a rivet, a bolt/nut combination, and/or a screw. The curved slot 1242 of the bracket extension 1240 of the bracket 1230 is indirectly and slidably coupled to the aperture 1122 of the frame extension 1120 and the tilt arm aperture 1356 in the tilt arm 1355 of the drive assembly 1350 using independent coupling feature 1080-1 in the form of, for example, a pin, a rivet, a bolt/nut combination, and/or a screw.

The bracket extension 1245 of the bracket 1230 extends upward from the opposite end or side of the bracket base 1231 relative to the bracket extension 1240. The bracket extension 1245 in this case extends substantially perpendicularly from the bracket body 1231. In this case, the bracket extension 1240 includes a curved slot 1246 and a curved slot 1248, both of which traverse the thickness of the bracket extension 1245 and both of which are forms of coupling features. The curved slot 1246 of the bracket extension 1245 of the bracket 1230 is indirectly and slidably coupled to the aperture 1127 of the frame extension 1125 using independent coupling feature 1080-4 in the form of, for example, a pin, a rivet, a bolt/nut combination, and/or a screw. The curved slot 1248 of the bracket extension 1245 of the bracket 1230 is indirectly and slidably coupled to the aperture 1127 of the frame extension 1125 using independent coupling feature 1080-3 in the form of, for example, a pin, a rivet, a bolt/nut combination, and/or a screw.

The bracket extension 1245 of the bracket 1230 in this case includes a stop aperture 1247 that is configured to fix the angle 1075 of tilt between the bracket 1230 and the combination of the frame 1110 and the housing 1085 of the recessed luminaire system 1099. Specifically, the stop aperture 1247 (a form of a coupling feature) of the bracket extension 1245 of the bracket 1230 can have mating threads disposed along its inner surface and can be configured to directly couple to a stop feature 1093, which in this case is in the form of a screw with a head large enough allow a user (e.g., user 184) to rotate by hand (a form of a user device 181) or a short screwdriver (another form of a user device 181).

When the independent stop feature 1093 is engaged with (in this case, inserted into) the stop aperture 1247 of the bracket extension 1245, the stop feature 1093 is disposed within the curved stop slot 1128 in the frame extension 1125 of the frame 1110, which is positioned adjacent to the inner surface of the bracket extension 1245. The resulting friction between the stop feature 1093 and the frame extension 1125 prevents the frame 1110 from further moving relative to the bracket 1230, thereby fixing the angle 1075. In this case, the outer surface of the bracket extension 1245 of the bracket 1230 has a legend 1249 disposed thereon above the curved slot 1246.

In this case, there are four coupling features 1080 in the direct drive optic tilt mechanism 1005. Each coupling feature 1080 in this example is in the form of a bolt, a screw, a pin, a rivet, or some similar component that has an elongated shaft. The characteristics (e.g., length, thickness, type of coupling feature) of one coupling feature 1080 can be the same as, or different than, the corresponding characteristics of one or more of the other coupling features 1080 in the direct drive optic tilt mechanism 1005.

Coupling feature 1080-1 in this example is disposed in the aperture 1122 in the frame extension 1120 of the frame 1110, the curved slot 1242 in the bracket extension 1240 of the bracket 1230, and a tilt arm aperture 1356 in the tilt arm 1355 of the drive assembly 1350. Coupling feature 1080-2 in this example is disposed in the aperture 1121 in the frame extension 1120 of the frame 1110 and the curved slot 1241 in the bracket extension 1240 of the bracket 1230. Coupling feature 1080-3 in this example is disposed in the aperture 1127 in the frame extension 1125 of the frame 1110 and the curved slot 1248 in the bracket extension 1245 of the bracket 1230. Coupling feature 1080-4 in this example is disposed in the aperture 1126 in the frame extension 1125 of the frame 1110 and the curved slot 1246 in the bracket extension 1245 of the bracket 1230.

The drive assembly 1350 of the recessed luminaire system 1099 can be configured to cause movement in the tilt angle 1075 between the frame 1110 and the bracket 1230. The drive assembly 1350 can be coupled to the frame 1110 and the bracket 1230. The drive assembly 1350 in this case includes a tilt arm 1355, an anchor 1359, a shaft 1358, and a drive mechanism 1351 coupled to the proximal end of the tilt arm 1355 using the shaft 1358 and the anchor 1359.

The tilt arm 1355 of the drive assembly 1350 is configured to force the frame 1110 to rotate relative to the bracket 1230 based on based on engagement of the drive mechanism 1351. The tilt arm 1355 of the drive assembly 1350 in this case is a substantially planar segment with a coupling feature 1357 (in this case, in the form of an aperture) at its proximal end and a coupling feature 1356 (in this case, in the form of an aperture) at its distal end. The shaft 1358 is coupled to a carrier 1354 that that travels along its length using the mating threads of the extension 1353 of the drive mechanism 1351 as the extension 1353 rotates. The shaft 1358 is also coupled to the coupling feature 1357 at the proximal end of the tilt arm 1355.

The drive mechanism 1351 of the drive assembly 1350 is configured to move (e.g., rotate) based on a force applied to it by a user (e.g., user 184) through a user device (e.g., user device 181). The drive mechanism 1351 can be configured to be accessible through the opening 1232 in the bracket base 1231 of the bracket 1230. In this way, when the recessed luminaire that includes the recessed luminaire assembly 1099 is installed with respect to a structure (e.g., structure 189), the user can access the drive mechanism 1351 without uninstalling the recessed luminaire from the structure.

In order to rotate the frame 1110 relative to the bracket 1230 in this case, the drive mechanism 1351 is rotated by a screwdriver (a form of user device 181), which causes the carrier to move along the threaded extension 1353, which forces the proximal end of the tilt arm 1355 to move through the shaft 1358 coupled to the carrier 1354 and the coupling feature 1357. As the tilt arm 1355 moves at the proximal end, the distal end of the tilt arm 1355 also moves, which in turn causes the frame 1110 to move via the coupling feature 1080-1 rotatably coupled to the coupling feature 1356 of the tilt arm 1355, rotatably coupled to the aperture 1122 of the frame extension 1120 of the frame 1110, and slidably coupled to the curved slot 1242 in the bracket extension 1240 of the bracket 1230. To help keep the frame 1110 in proper alignment, the opposite side of the frame 1110 also rotates at the same rate via the coupling feature 1080-3 slidably coupled to the curved slot 1248 of the bracket extension 1245 of the bracket 1230 and rotatably coupled to the aperture 1127 of the frame extension 1125 of the frame 1110.

In order to ensure that the center axis 1115 of the frame 1110 intersects the center point 1234 of the opening 1232 of the bracket base 1231 of the bracket 1230 throughout the entire range of motion (all of the angles 1075) between the frame 1110 and the bracket 1230, the coupling feature 1080-2 disposed in the curved slot 1241 in the bracket extension 1240 of the bracket 1230 and the aperture 1121 in the frame extension 1120 of the frame 1110 simultaneously work in concert with the coupling of the coupling feature 1080-4 disposed in the curved slot 1246 in the bracket extension 1245 of the bracket 1230 and the aperture 1126 in the frame extension 1125 of the frame 1110.

The anchor 1359 of the drive assembly 1350 is configured to provide a stable (e.g., fixed) mounting of the drive assembly 1350 to the bracket 1230. In this case, the anchor 1359 includes a U-shaped bracket, which can be substantially rigid. In certain example embodiments, the anchor 1359 includes one or more coupling features 1377 that are configured to directly or indirectly couple the anchor 1359 to the bracket base 1231 of the bracket 1230. In this case, there are two coupling features 1377 (coupling feature 1377-1 and coupling feature 1377-2), each in the form of an aperture that traverses the thickness of the anchor 1359. In this case, the coupling features 1377 are configured to indirectly couple to the coupling features 1239 in the bracket base 1231 of the bracket 1230 using the independent coupling features 1382 (discussed above). When the coupling feature 1382-1 is disposed in the coupling feature 1377-1 in the anchor 1359 and a complementary coupling feature 1239-1 in the bracket base 1231, and when the coupling feature 1382-2 is disposed in the coupling feature 1377-2 in the anchor 1359 and a complementary coupling feature 1239-2 in the bracket base 1231, the anchor 1359 is fixedly coupled to the bracket base 1231 of the bracket 1230.

Figure 14A:
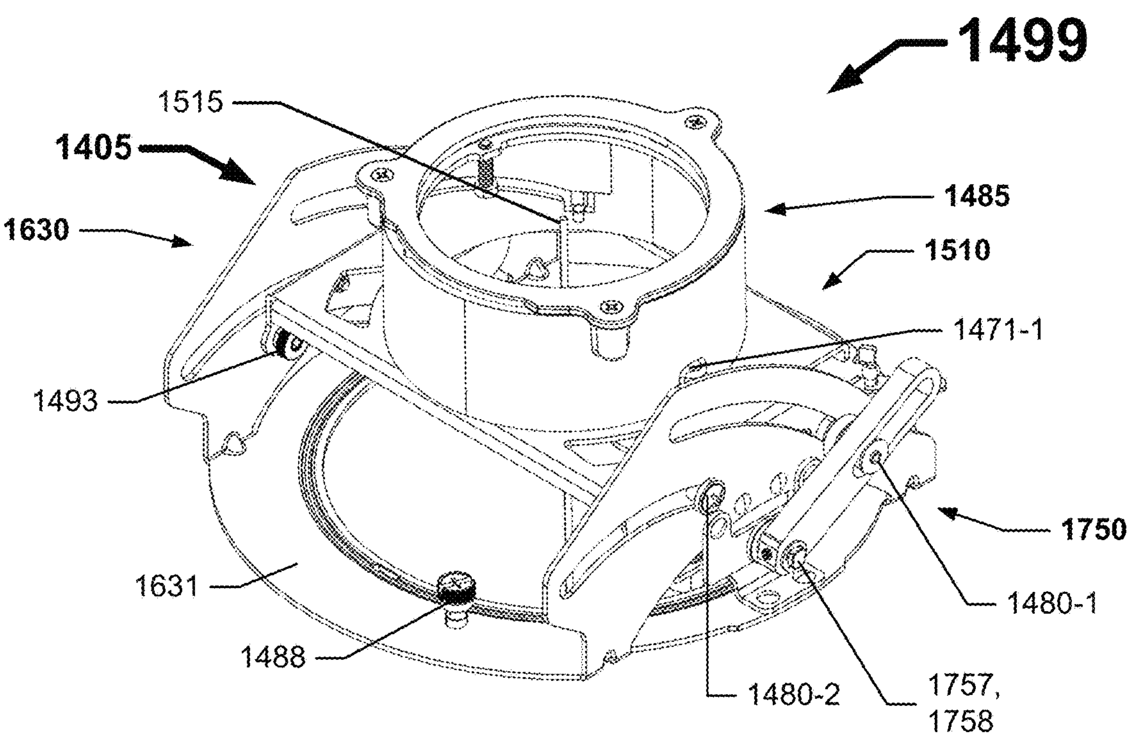
FIGS. 14A through 14F show yet another recessed luminaire system according to certain example embodiments.
Figure 14B:
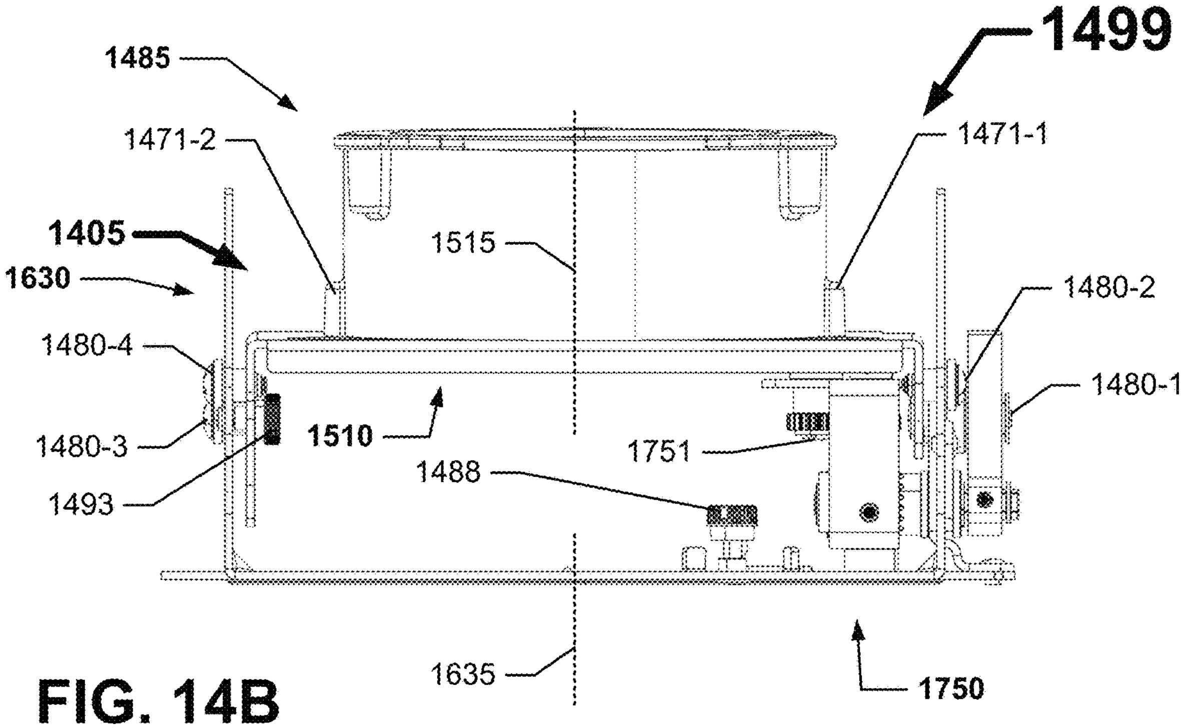
Figure 14C:
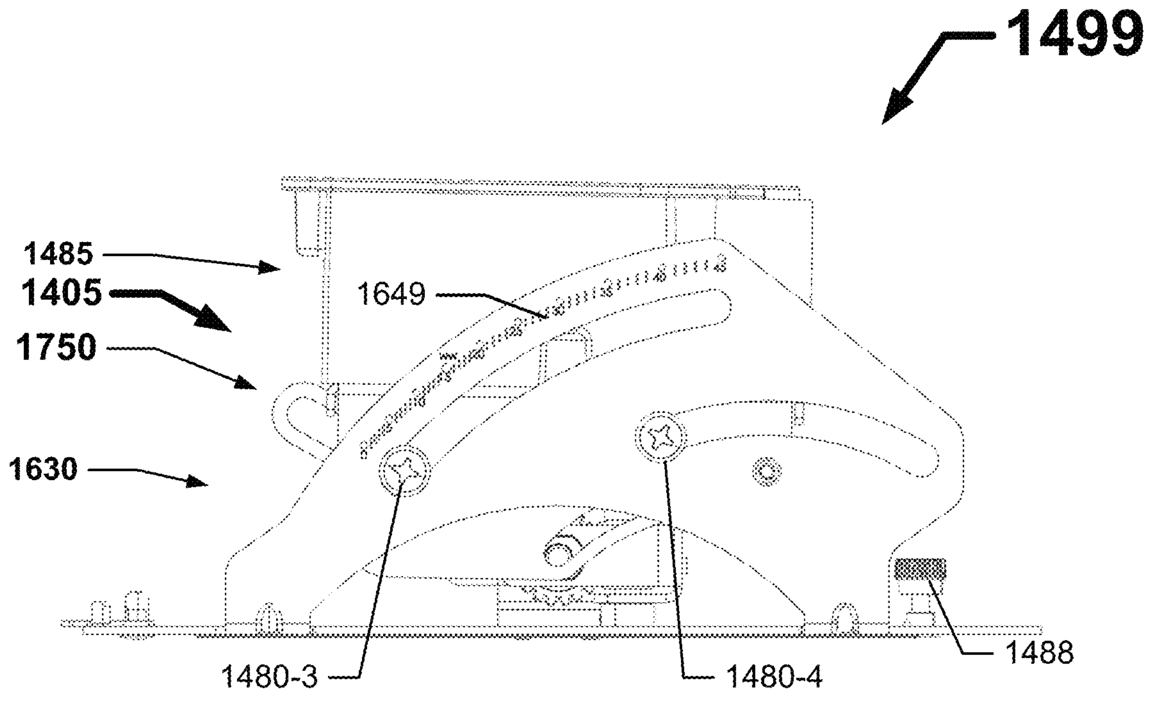
Figure 14D:
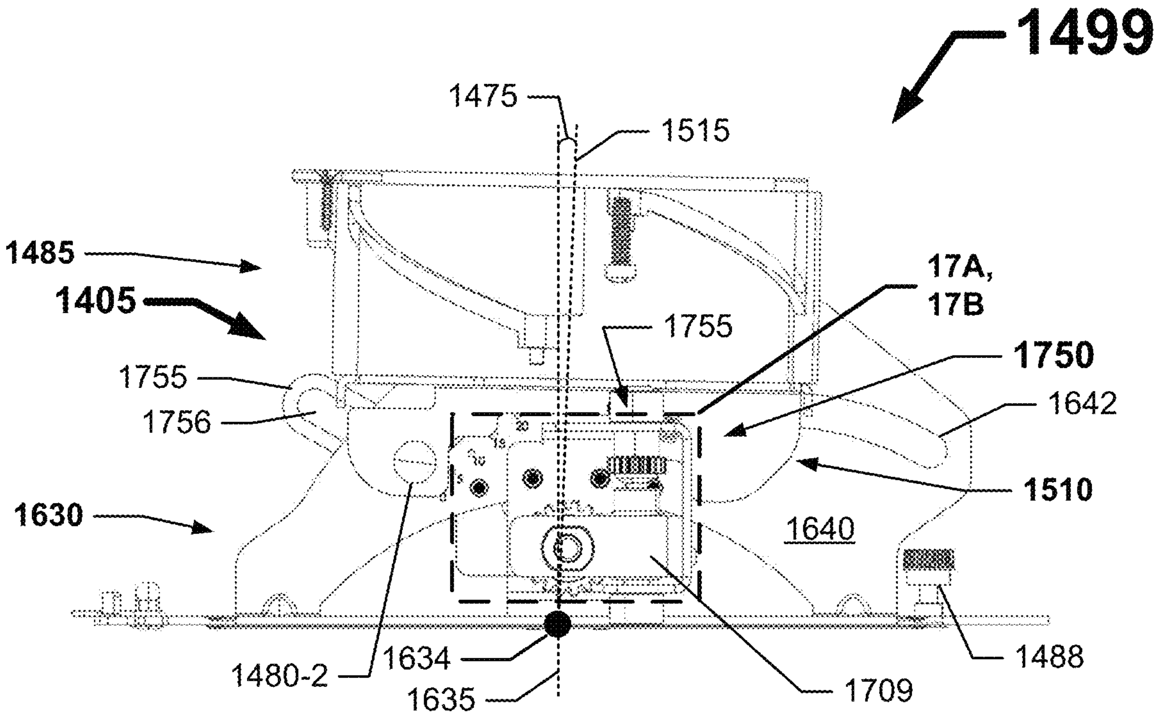
Figure 14E:
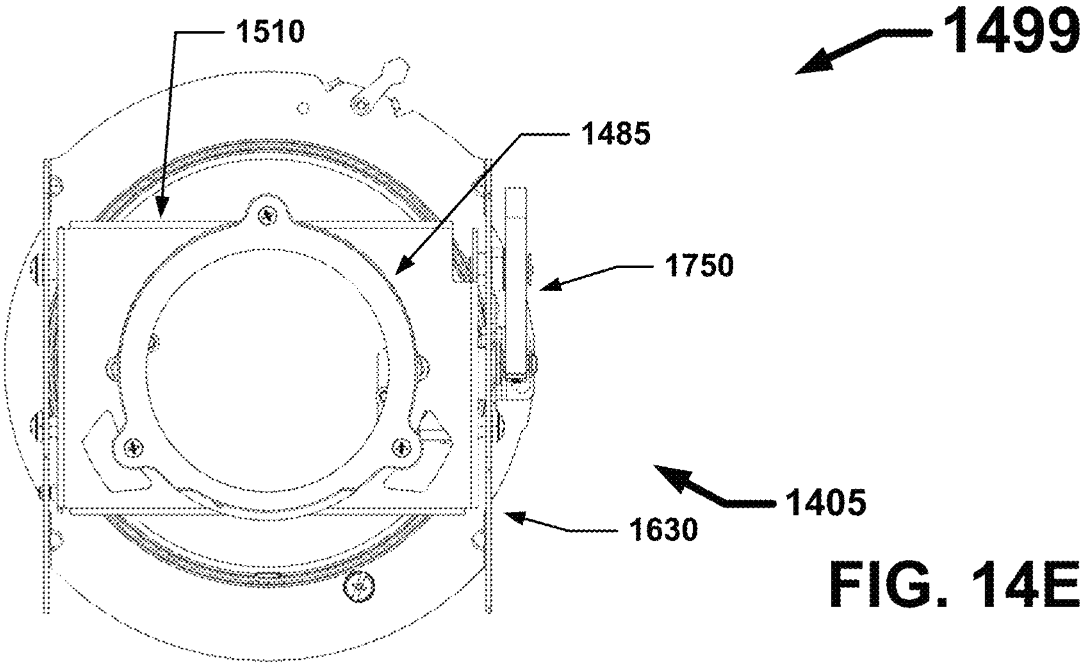
Figure 14F:
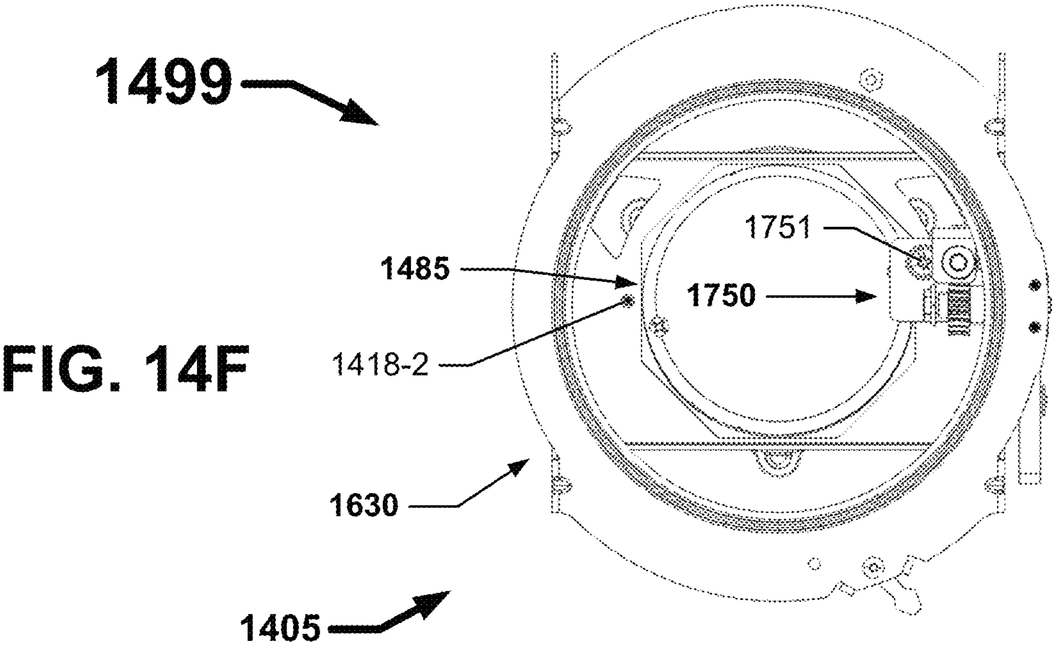

FIGS. 14A through 14F show yet another recessed luminaire system 1499 according to certain example embodiments. Specifically, FIG. 14A shows a top-side perspective view of the recessed luminaire system 1499. FIG. 14B shows a front view of the recessed luminaire system 1499. FIG. 14C shows a side view of the recessed luminaire system 1499. FIG. 14D shows a sectional side view of the recessed luminaire system 1499. FIG. 14E shows a top view of the recessed luminaire system 1499. FIG. 14F shows a bottom view of the recessed luminaire system 1499.

Figure 15:
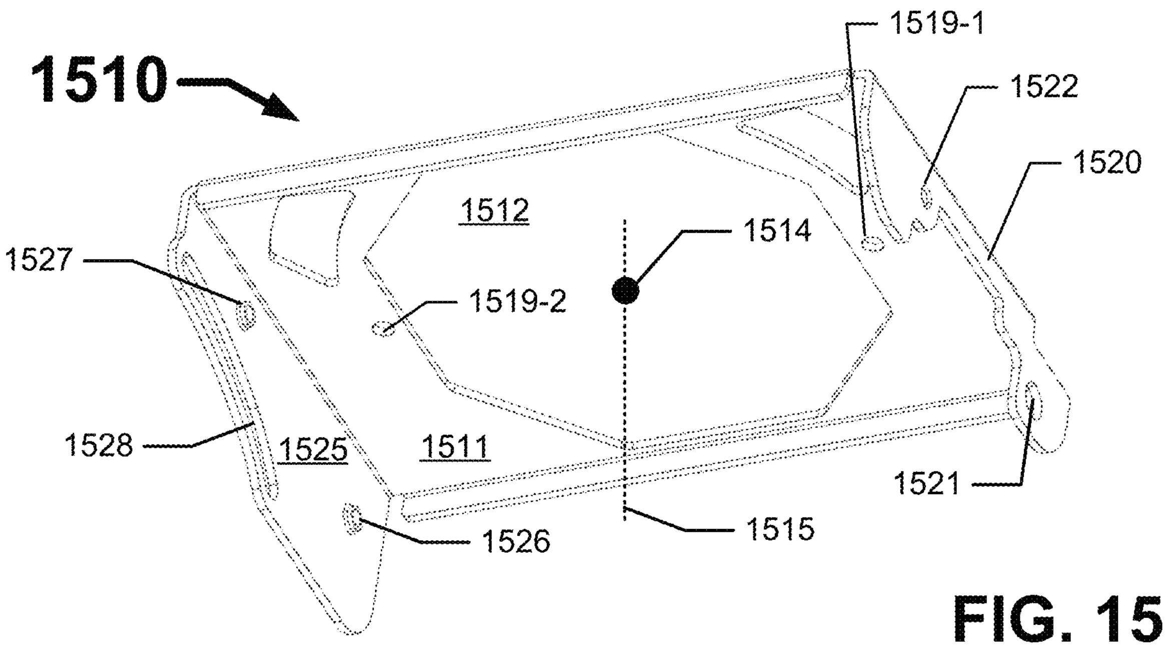
FIG. 15 shows the frame of the recessed luminaire system of FIGS. 14A through 14F according to certain example embodiments.
Figure 16:
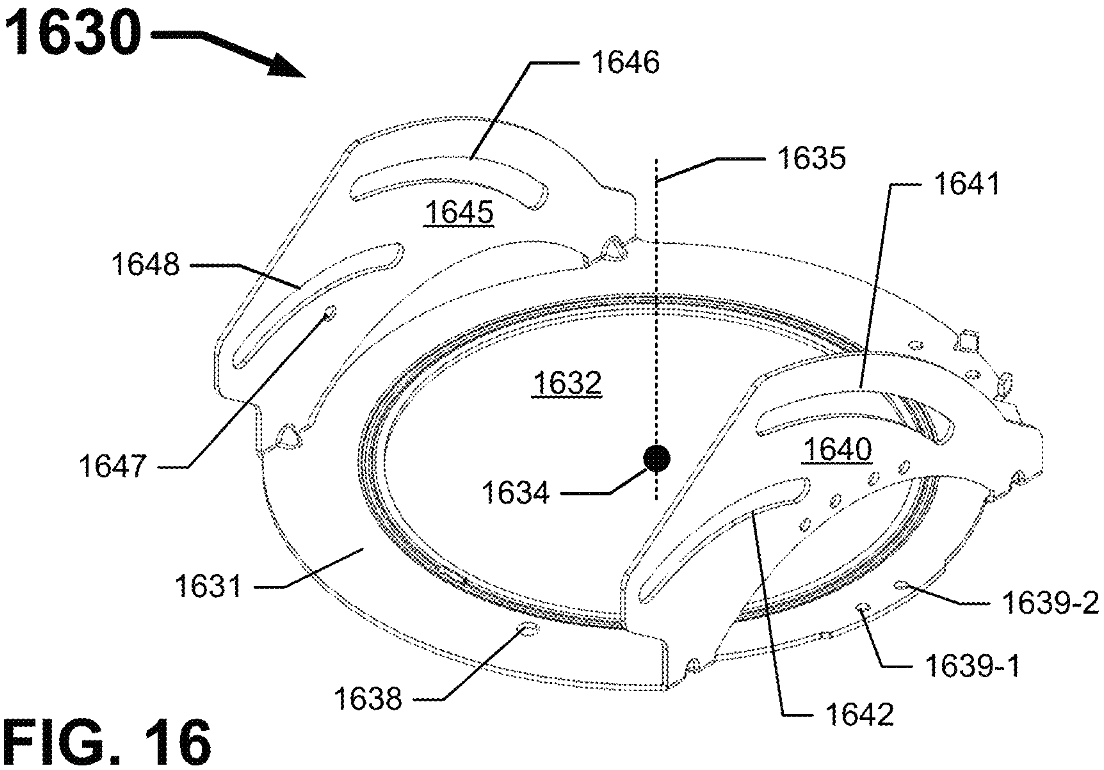
FIG. 16 shows the bracket of the recessed luminaire system of FIGS. 14A through 14F according to certain example embodiments.
Figure 17A:
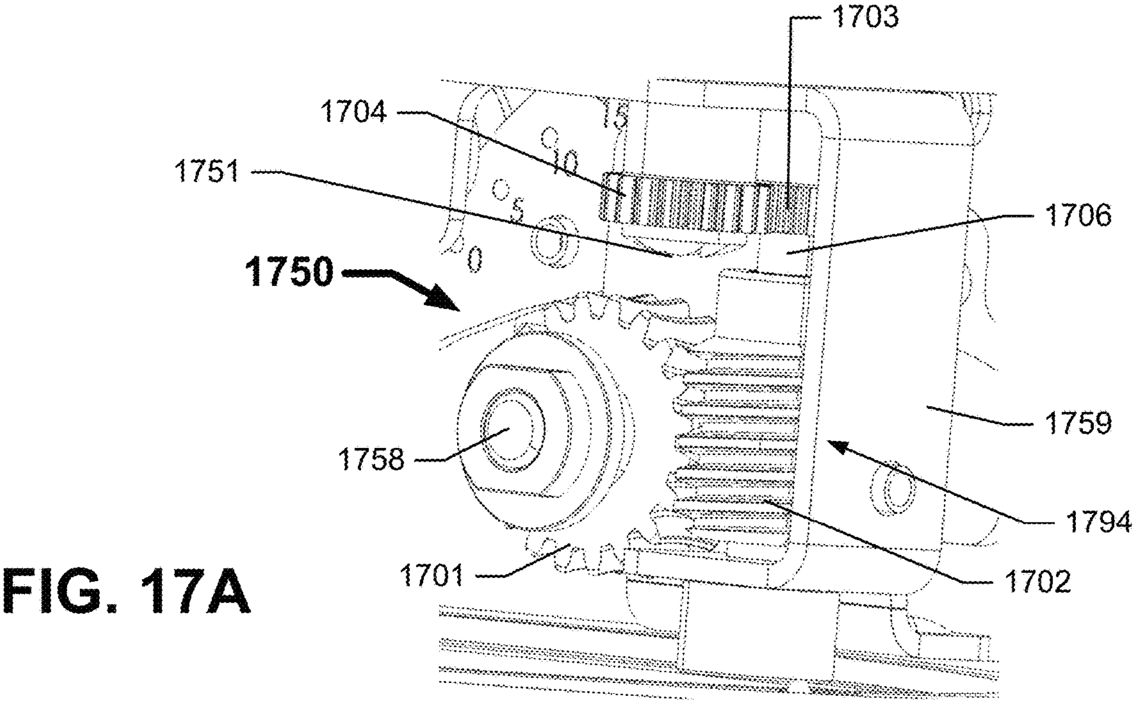
FIGS. 17A and 17B show the direct drive optic tilt mechanism of the recessed luminaire system of FIGS. 14A through 14F according to certain example embodiments.
Figure 17B:
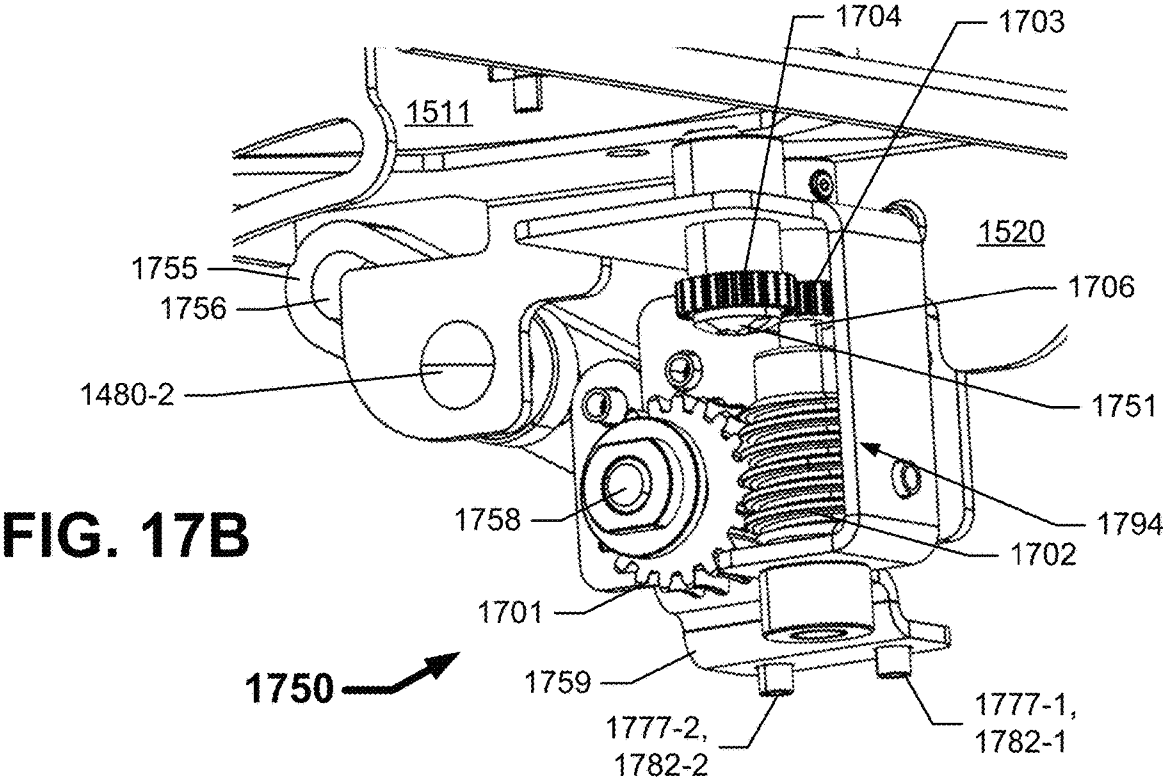

FIG. 15 shows the frame of the recessed luminaire system of FIGS. 14A through 14F according to certain example embodiments. FIG. 16 shows the bracket of the recessed luminaire system of FIGS. 14A through 14F according to certain example embodiments. FIGS. 17A and 17B show perspective views of the direct drive optic tilt mechanism of the recessed luminaire system of FIGS. 14A through 14F according to certain example embodiments.

Referring to FIGS. 1 through 17B, the recessed luminaire system 1499 of FIGS. 14A through 17B includes a housing 1485, a frame 1510, a bracket 1630, and a drive assembly 1750. The housing 1485, the frame 1510, the bracket 1630, and the drive assembly 1750 of the recessed luminaire assembly 1499 (including components and/or portions thereof) can be substantially the same as the housings, the frames, the brackets, and the drive assemblies (including corresponding components and/or portions thereof) discussed above with respect to FIGS. 1 through 13B, except as described below. For example, the housing 1485 in this case is generally cylindrical in shape. The housing 1485 has two coupling features 1471 in the form of threaded apertures within protrusions that extend from the outer perimeter of the housing 1485 toward the bottom of the housing 1485. Coupling feature 1471-1 and coupling feature 1471-2 are positioned substantially opposite each other along the outer perimeter of the housing 1485.

The frame 1510 of the direct drive optic tilt mechanism 1705 of the recessed luminaire system 1499 in this case includes a frame body 1511, a first frame extension 1520, and a second frame extension 1525. The frame body 1511 in this example is substantially planar and has a large opening 1512 that traverses the frame body 1511. The opening 1512 has a center point 1514 that is substantially coincident with the center of the frame body 1511. A center axis 1515 passes through the center point 1514 of the opening 1512 in the frame body 1511 substantially perpendicular to the frame body 1511. The opening 1512 can have any characteristics (e.g., shape, size) that allow the various components (e.g., light sources 186, lens) within the housing 1485 to function during operation of the recessed luminaire system 1499. In this case, the opening 1512 has an octagonal shape.

In certain example embodiments, the frame body 1511 also includes one or more coupling features 1519 that are configured to directly or indirectly couple to the housing 1485. In this case, there are two coupling features 1519 (coupling feature 1519-1 and coupling feature 1519-2) in the form of apertures that traverse the thickness of the frame body 1511 adjacent to opposite sides of the opening 1512. In this example, a coupling feature 1519 (e.g., coupling feature 1519-1, coupling feature 1519-2) is configured to indirectly couple to a coupling feature 1471 (e.g., coupling feature 1471-1, coupling feature 1471-2) of the housing 1485 using an independent coupling feature 1418 (e.g., coupling feature 1418-2) in the form of a screw. When a coupling feature 1418 is disposed in a coupling feature 1519 of the frame body 1511 and a coupling feature 1471 of the housing 1485, the frame 1510 and the housing 1485 become fixedly coupled to each other. In some cases, the frame 1510 and the housing 1485 can be decoupled from each other by removing the independent coupling features 1418 from the coupling features 1471 of the housing 1485.

The frame extension 1520 of the frame 1510 extends downward from one end or side of the frame body 1511. The frame extension 1520 extends substantially perpendicularly from the frame body 1511 in this case. The frame extension 1520 in this example includes aperture 1521 and aperture 1522, both of which traverse the thickness of the frame extension 1520 and both of which are forms of coupling features. In this case, the aperture 1521 of the frame extension 1520 is indirectly and movably coupled to the curved slot 1641 of the bracket 1630 and the tilt arm aperture 1756 in the tilt arm 1755 of the drive assembly 1750 using independent coupling feature 1480-1 in the form of, for example, a pin, a rivet, a bolt/nut combination, and/or a screw. The aperture 1522 of the frame extension 1520 in this case is indirectly and movably coupled to the curved slot 1642 of the bracket 1630 using independent coupling feature 1480-2 in the form of, for example, a pin, a rivet, a bolt/nut combination, and/or a screw.

The frame extension 1525 of the frame 1510 extends downward from an opposite end or side of the frame body 1511 relative to the frame extension 1520. The frame extension 1525 extends substantially perpendicularly from the frame body 1511 in this case. The frame extension 1525 in this case includes aperture 1526 and aperture 1527, both of which traverse the thickness of the frame extension 1525 and both of which are forms of coupling features. The aperture 1526 of the frame extension 1525 in this case is indirectly and movably coupled to the curved slot 1646 of the bracket 1630 using independent coupling feature 1480-3 in the form of, for example, a pin, a rivet, a bolt/nut combination, and/or a screw. The aperture 1527 of the frame extension 1525 in this case is indirectly and movably coupled to the curved slot 1648 of the bracket 1630 using independent coupling feature 1480-4 in the form of, for example, a pin, a rivet, a bolt/nut combination, and/or a screw. In this example, the frame extension 1525 is longer than the frame extension 1520.

The frame extension 1525 in this case also includes a curved stop slot 1528 (a type of coupling feature) that is configured to help fix the tilt angle 1475 between the frame 1510 and the bracket 1630. In this case, the curved stop slot 1528 is configured to be indirectly coupled to the stop aperture 1647 of the bracket extension 1645 using of a stop feature 1493, which is configured to be disposed in some or all of the curved stop slot 1528. In this way, the stop feature 1493 can fix a position of the frame 1510 relative to the bracket 1630 when the stop feature 1493 presses into the frame extension 1525 and when the stop feature 1493 is sufficiently engaged with the stop aperture 1647 in the bracket extension 1645 of the bracket 1630.

The bracket 1630 of the direct drive optic tilt mechanism 1405 of the recessed luminaire system 1499 in this case includes a bracket base 1631, a first bracket extension 1640, and a second bracket extension 1645. The bracket base 1631 in this example is substantially planar and has a large opening 1632 (also sometimes called a bracket base opening 1632 herein) that traverses the thickness of the bracket base 1631. The opening 1632 has a center point 1634 (also sometimes called the bracket base center point 1634 herein) that is substantially coincident with the center of the bracket base 1631.

A center axis 1635 passes through the center point 1634 of the opening 1632 in the bracket base 1631 substantially perpendicular to the bracket base 1631. In certain example embodiments, the center axis 1515 of the frame 1510 also passes through the center point 1634 of the opening 1632 in the bracket base 1631 to form the angle 1475 between the frame 1510 and the bracket 1630 through some or all of the range of motion of the frame 1510 relative to the bracket 1630. The opening 1632 can have any characteristics (e.g., shape, size) that allow the light emitted by the one or more light sources (e.g., light sources 186) and/or other components (e.g., a reflector, a trim) to be disposed therein during operation of the recessed luminaire system 1499. The opening 1632 in this case is substantially circular in shape.

In certain example embodiments, the bracket base 1631 also includes one or more coupling features 1638 that are configured to control some other orientation (e.g., rotation), aside from tilt, of the bracket 1630 and/or other components of the recessed luminaire system 1499. In this case, there is one coupling feature 1638 in the form of an aperture that traverses the thickness of the bracket base 1631 adjacent to the bracket extension 1640. The coupling feature 1638 is configured to indirectly couple to another component (e.g., a bracket swivel base 876) of the recessed luminaire using an independent coupling feature 1488 in the form of a screw. When the coupling feature 1488 is disposed in the coupling feature 1638 in the bracket base 1631 and contacts the bracket swivel base, the rotational orientation of the bracket 1630, the frame 1510, and the housing 1485 can be fixed relative to that component (e.g., the bracket swivel base 876). When the coupling feature 1488 does not contact the other component, the rotational orientation of the bracket 1630, the frame 1510, and the housing 1485 can be changed relative to the other component.

In certain example embodiments, the bracket base 1631 also includes one or more coupling features 1639 that are configured to directly or indirectly couple to the anchor 1759 of the drive assembly 1750. In this case, there are two coupling features 1639 (coupling feature 1639-1 and coupling feature 1639-2) in the form of apertures that traverse the thickness of the bracket base 1631 adjacent to the bracket extension 1640. In this case, the coupling features 1639 are configured to indirectly couple to the anchor 1759 using independent coupling features 1782 in the form of screws, bolts, rivets, pins, and the like. When the coupling feature 1782-1 is disposed in the coupling feature 1639-1 in the bracket base 1631 and a complementary coupling feature 1777-1 (e.g., an aperture) in the anchor 1759, and when coupling feature 1782-2 is disposed in the coupling feature 1639-2 in the bracket base 1631 and another complementary coupling feature 1777-2 (e.g., another aperture) in the anchor 1759, the anchor 1759 is fixedly coupled to the bracket base 1631 of the bracket 1630.

The bracket extension 1640 of the bracket 1630 extends upward from one end or side of the bracket base 1631. The bracket extension 1640 in this case extends substantially perpendicularly from the bracket body 1631. In this case, the bracket extension 1640 includes a curved slot 1641 and a curved slot 1642, both of which traverse the thickness of the bracket extension 1640 and both of which are forms of coupling features. The curved slot 1641 of the bracket extension 1640 of the bracket 1630 in this case is indirectly and movably coupled to the aperture 1521 of the frame extension 1520 and the tilt arm aperture 1756 in the tilt arm 1755 of the drive assembly 1750 using independent coupling feature 1480-1 in the form of, for example, a pin, a rivet, a bolt/nut combination, and/or a screw. The curved slot 1642 of the bracket extension 1640 of the bracket 1630 in this case is indirectly and movably coupled to the aperture 1522 of the frame extension 1520 using independent coupling feature 1480-2 in the form of, for example, a pin, a rivet, a bolt/nut combination, and/or a screw.

The bracket extension 1645 of the bracket 1630 extends upward from the opposite end or side of the bracket base 1631 relative to the bracket extension 1640. The bracket extension 1645 in this case extends substantially perpendicularly from the bracket body 1631. In this case, the bracket extension 1640 includes a curved slot 1646 and a curved slot 1648, both of which traverse the thickness of the bracket extension 1645 and both of which are forms of coupling features. The curved slot 1646 of the bracket extension 1645 of the bracket 1630 in this case is indirectly and movably coupled to the aperture 1527 of the frame extension 1525 using independent coupling feature 1480-4 in the form of, for example, a pin, a rivet, a bolt/nut combination, and/or a screw. The curved slot 1648 of the bracket extension 1645 of the bracket 1630 is indirectly and movably coupled to the aperture 1527 of the frame extension 1525 using independent coupling feature 1480-3 in the form of, for example, a pin, a rivet, a bolt/nut combination, and/or a screw.

The bracket extension 1645 of the bracket 1630 in this case includes a stop aperture 1647 that is configured to fix the angle 1475 of tilt between the bracket 1630 and the combination of the frame 1510 and the housing 1485 of the recessed luminaire system 1499. Specifically, the stop aperture 1647 (a form of a coupling feature) of the bracket extension 1645 of the bracket 1630 can have mating threads disposed along its inner surface and can be configured to directly couple to a stop feature 1493, which in this case is in the form of a screw with a head large enough allow a user (e.g., user 184) to rotate by hand (a form of a user device 181) or a short screwdriver (another form of a user device 181).

When the independent stop feature 1493 is engaged with (in this case, inserted into) the stop aperture 1647 of the bracket extension 1645, the stop feature 1493 is disposed within the curved stop slot 1528 in the frame extension 1525 of the frame 1510, which is positioned adjacent to the inner surface of the bracket extension 1645. The resulting friction between the stop feature 1493 and the frame extension 1525 prevents the frame 1510 from further moving relative to the bracket 1630, thereby fixing the angle 1475. In this case, the outer surface of the bracket extension 1645 of the bracket 1630 has a legend 1649 disposed thereon above the curved slot 1646.

In this case, there are four coupling features 1480 in the direct drive optic tilt mechanism 1405. Each coupling feature 1480 in this example is in the form of a bolt, a screw, a pin, a rivet, or some similar component that has an elongated shaft. The characteristics (e.g., length, thickness, type of coupling feature) of one coupling feature 1480 can be the same as, or different than, the corresponding characteristics of one or more of the other coupling features 1480 in the direct drive optic tilt mechanism 1405.

Coupling feature 1480-1 in this example is disposed in the aperture 1522 in the frame extension 1520 of the frame 1510, the curved slot 1642 in the bracket extension 1640 of the bracket 1630, and a tilt arm aperture 1756 in the tilt arm 1755 of the drive assembly 1750. Coupling feature 1480-2 in this example is disposed in the aperture 1521 in the frame extension 1520 of the frame 1510 and the curved slot 1641 in the bracket extension 1640 of the bracket 1630. Coupling feature 1480-3 in this example is disposed in the aperture 1527 in the frame extension 1525 of the frame 1510 and the curved slot 1648 in the bracket extension 1645 of the bracket 1630. Coupling feature 1480-4 in this example is disposed in the aperture 1526 in the frame extension 1525 of the frame 1510 and the curved slot 1646 in the bracket extension 1645 of the bracket 1630.

The drive assembly 1750 of the recessed luminaire system 1499 can be configured to cause movement in the tilt angle 1475 between the frame 1510 and the bracket 1630. The drive assembly 1750 can be coupled to the frame 1510 and the bracket 1630. The drive assembly 1750 in this case includes a tilt arm 1755, an anchor 1759, a shaft 1758, and a drive mechanism 1751 coupled to the proximal end of the tilt arm 1755 using the shaft 1758 and the anchor 1759.

The tilt arm 1755 of the drive assembly 1750 is configured to force the frame 1510 to rotate relative to the bracket 1630 based on based on engagement of the drive mechanism 1751. The tilt arm 1755 of the drive assembly 1750 in this case is a substantially planar segment with a coupling feature 1757 (in this case, in the form of an aperture) at its proximal end and a coupling feature 1756 (in this case, in the form of a slot) at its distal end. The tilt arm 1755 is positioned adjacent to an outer surface of the bracket extension 1640. The shaft 1758 is coupled to a gear assembly 1794 that operates when the drive mechanism 1751 is engaged and rotated. The gear assembly 1794 in this case includes gear 1701, gear 1702, gear 1703, gear 1704, and shaft 1706. The gear assembly 1794 is held together by the anchor 1759.

When the drive mechanism 1751 is rotated by a user device, the gear 1704 rotates, which is interlocked with and drives gear 1703. As gear 1703 rotates, a shaft 1706 connected to the gear 1703 at one end rotates, which rotates the gear 1702 at the other end of the shaft 1706. The gear 1702 is interlocked with and drives gear 1701 as the gear 1702 rotates. Some or all of the gear assembly 1794 can be covered by a cover 1709. The cover 1709 is removed in FIGS. 17A and 17B to show the gear assembly 1794 of the drive assembly 1750. The shaft 1758 is also coupled to the coupling feature 1757 at the proximal end of the tilt arm 1755.

The drive mechanism 1751 of the drive assembly 1750 is configured to move (e.g., rotate) based on a force applied to it by a user (e.g., user 184) through a user device (e.g., user device 181). The drive mechanism 1751 in this case is accessible through the opening 1632 in the bracket base 1631 of the bracket 1630. In this way, when the recessed luminaire that includes the recessed luminaire assembly 1499 is installed with respect to a structure (e.g., structure 189), the user can access the drive mechanism 1751 without uninstalling the recessed luminaire from the structure.

In order to rotate the frame 1510 relative to the bracket 1630 in this case, the drive mechanism 1751 is rotated by a screwdriver (a form of user device 181), which causes the gear assembly 1794 to operate, which forces the proximal end of the tilt arm 1755 to move through the shaft 1758 coupled to the coupling feature 1757 at the proximal end of the tilt arm 1755. As the tilt arm 1755 moves at the proximal end, the distal end of the tilt arm 1755 also moves, which in turn causes the frame 1510 to move via the coupling feature 1480-1 movably coupled to the coupling feature 1756 of the tilt arm 1755, the aperture 1521 of the frame extension 1520 of the frame 1510, and the curved slot 1641 in the bracket extension 1640 of the bracket 1630. To help keep the frame 1510 in proper alignment, the opposite side of the frame 1510 also rotates at the same rate via the coupling feature 1480-3 movably coupled to the curved slot 1646 of the bracket extension 1645 of the bracket 1630 and the aperture 1526 of the frame extension 1525 of the frame 1510.

In order to ensure that the center axis 1515 of the frame 1510 intersects the center point 1634 of the opening 1632 of the bracket base 1631 of the bracket 1630 throughout the entire range of motion (all of the angles 1475) between the frame 1510 and the bracket 1630, the coupling feature 1480-2 disposed in the curved slot 1642 in the bracket extension 1640 of the bracket 1630 and the aperture 1522 in the frame extension 1520 of the frame 1510 simultaneously work in concert with the coupling of the coupling feature 1480-4 disposed in the curved slot 1648 in the bracket extension 1645 of the bracket 1630 and the aperture 1527 in the frame extension 1525 of the frame 1510.

The anchor 1759 of the drive assembly 1750 is configured to provide a stable (e.g., fixed) mounting of the drive assembly 1750 to the bracket 1630 and to secure the gear assembly 1794. In certain example embodiments, the anchor 1759 includes one or more coupling features 1777 that are configured to directly or indirectly couple the anchor 1759 to the bracket base 1631 of the bracket 1630. In this case, there are two coupling features 1777 (coupling feature 1777-1 and coupling feature 1777-2), each in the form of an aperture that traverses the thickness of the anchor 1759. In this case, the coupling features 1777 are configured to indirectly couple to the coupling features 1639 in the bracket base 1631 of the bracket 1630 using the independent coupling features 1782 (discussed above). When the coupling feature 1782-1 is disposed in the coupling feature 1777-1 in the anchor 1759 and a complementary coupling feature 1639-1 in the bracket base 1631, and when the coupling feature 1782-2 is disposed in the coupling feature 1777-2 in the anchor 1759 and a complementary coupling feature 1639-2 in the bracket base 1631, the anchor 1759 is fixedly coupled to the bracket base 1631 of the bracket 1630.

Figure 18A:
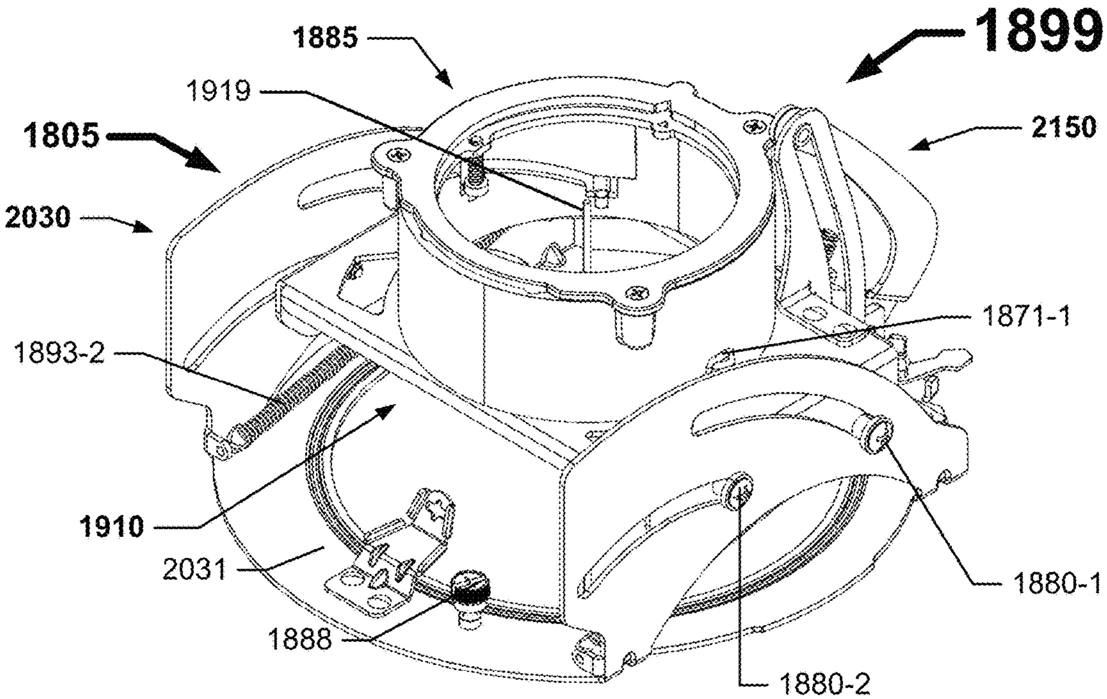
FIGS. 18A through 18F show yet another recessed luminaire system according to certain example embodiments.
Figure 18B:
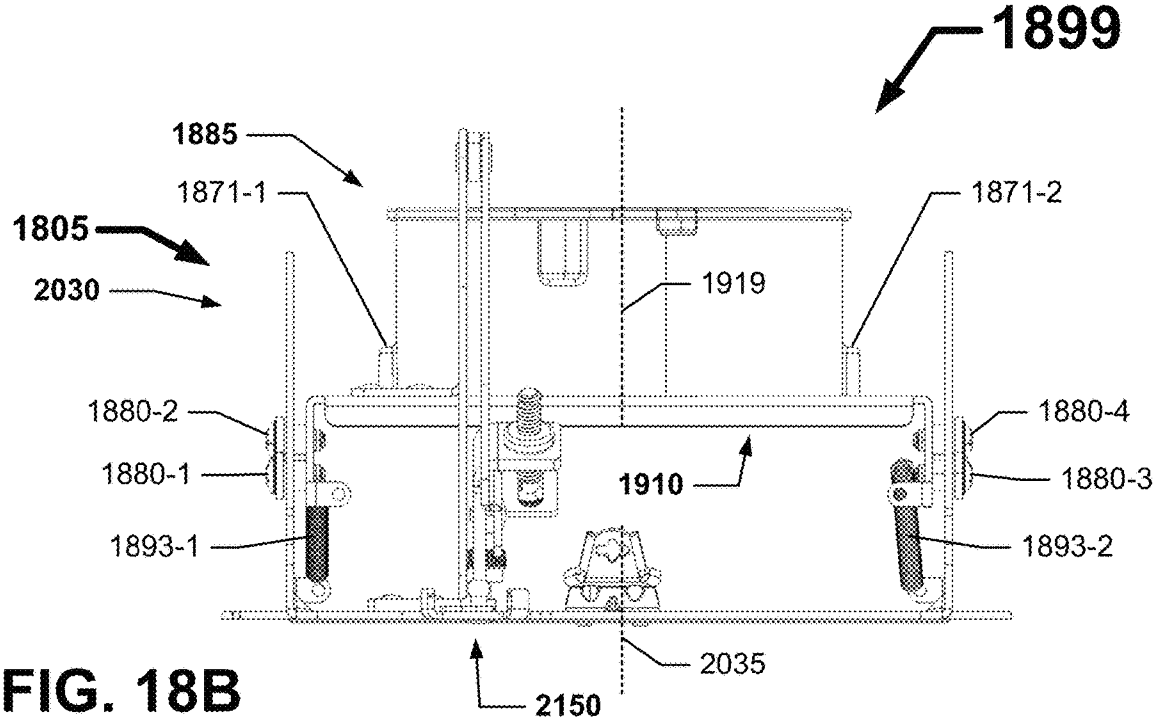
Figure 18C:
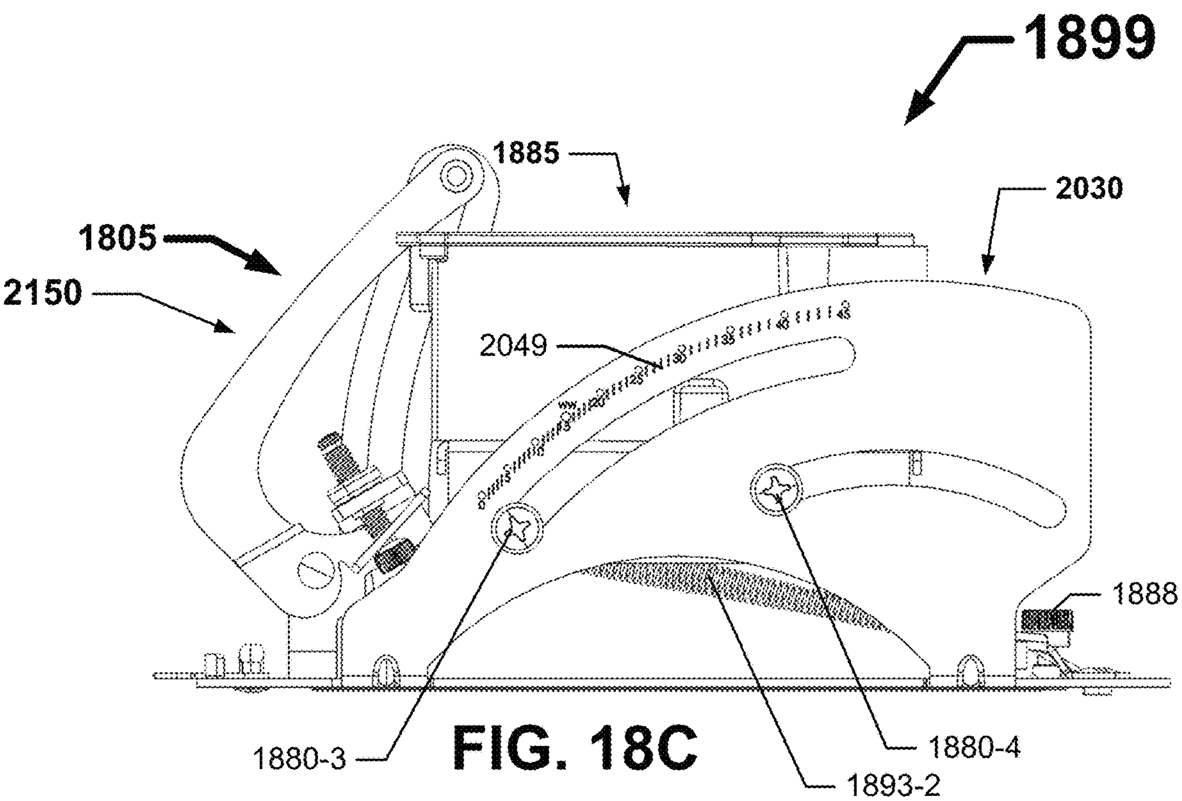
Figure 18D:
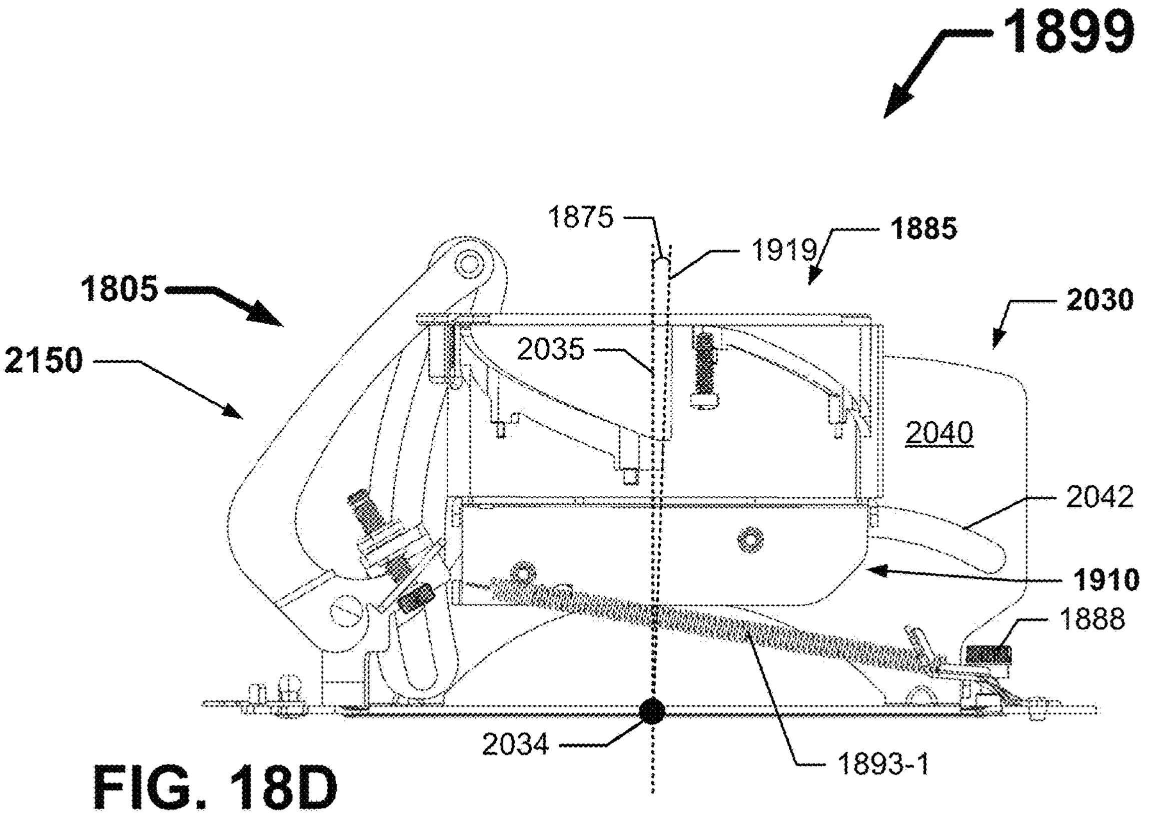
Figure 18E:
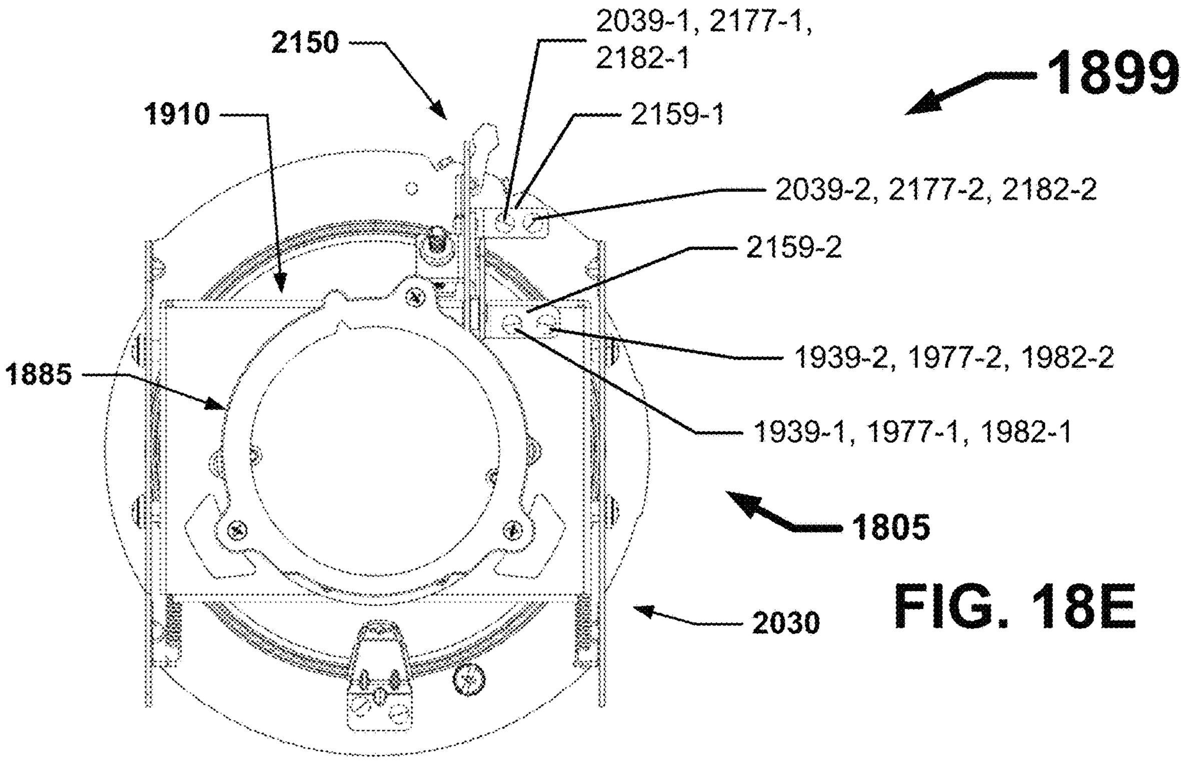
Figure 18F:
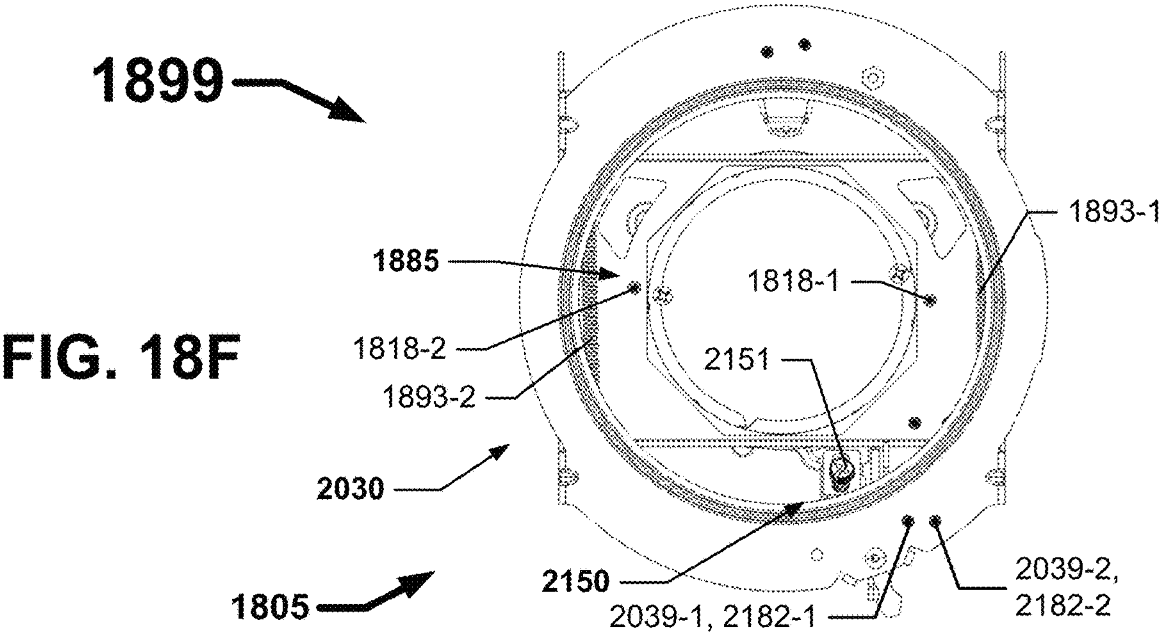

FIGS. 18A through 18F show yet another recessed luminaire system 1899 according to certain example embodiments. Specifically, FIG. 18A shows a top-side perspective view of the recessed luminaire system 1899. FIG. 18B shows a front view of the recessed luminaire system 1899. FIG. 18C shows a side view of the recessed luminaire system 1899. FIG. 18D shows a sectional side view of the recessed luminaire system 1899. FIG. 18E shows a top view of the recessed luminaire system 1899. FIG. 18F shows a bottom view of the recessed luminaire system 1899.

Figure 19:
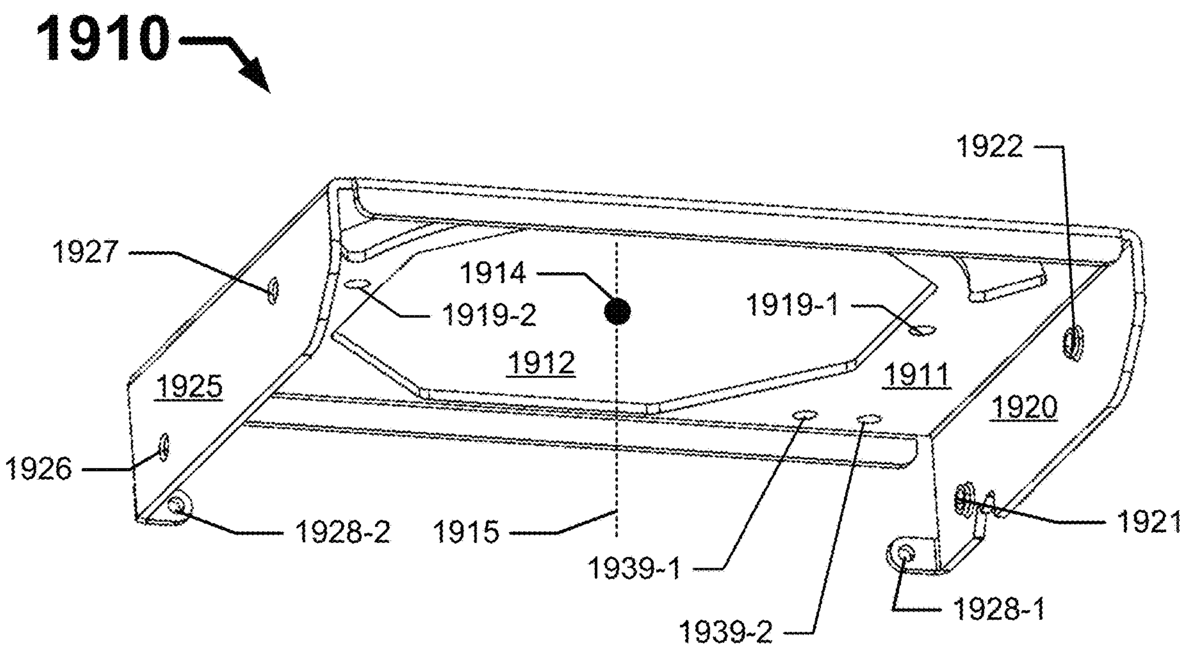
FIG. 19 shows the frame of the recessed luminaire system of FIGS. 18A through 18F according to certain example embodiments.
Figure 20:
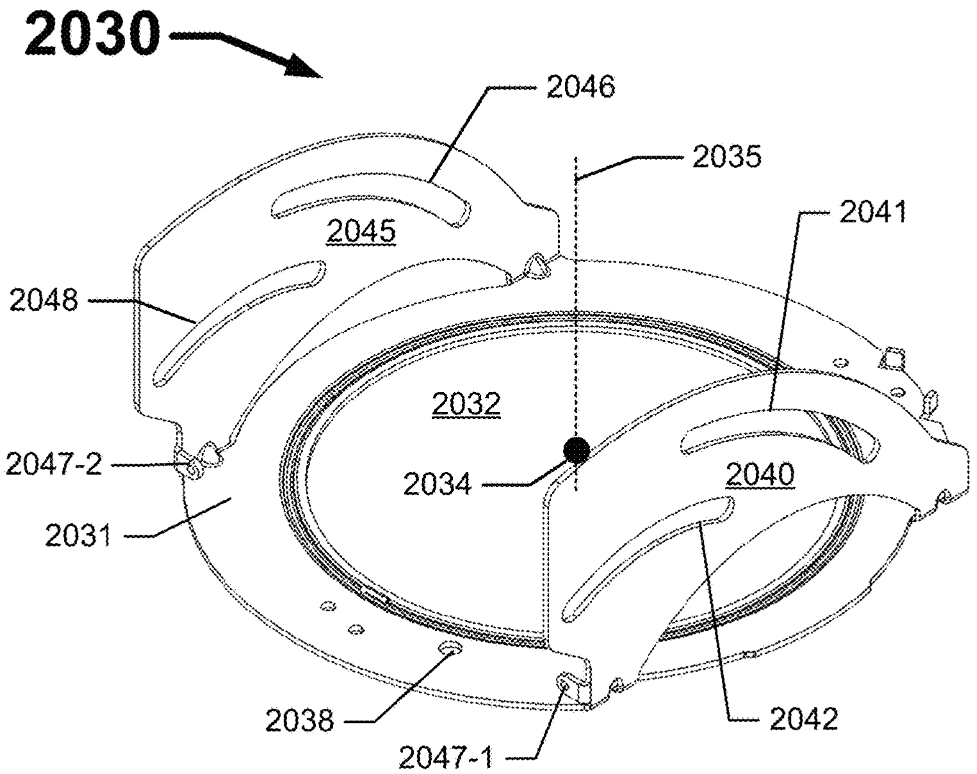
FIG. 20 shows the bracket of the recessed luminaire system of FIGS. 18A through 18F according to certain example embodiments.
Figure 21A:
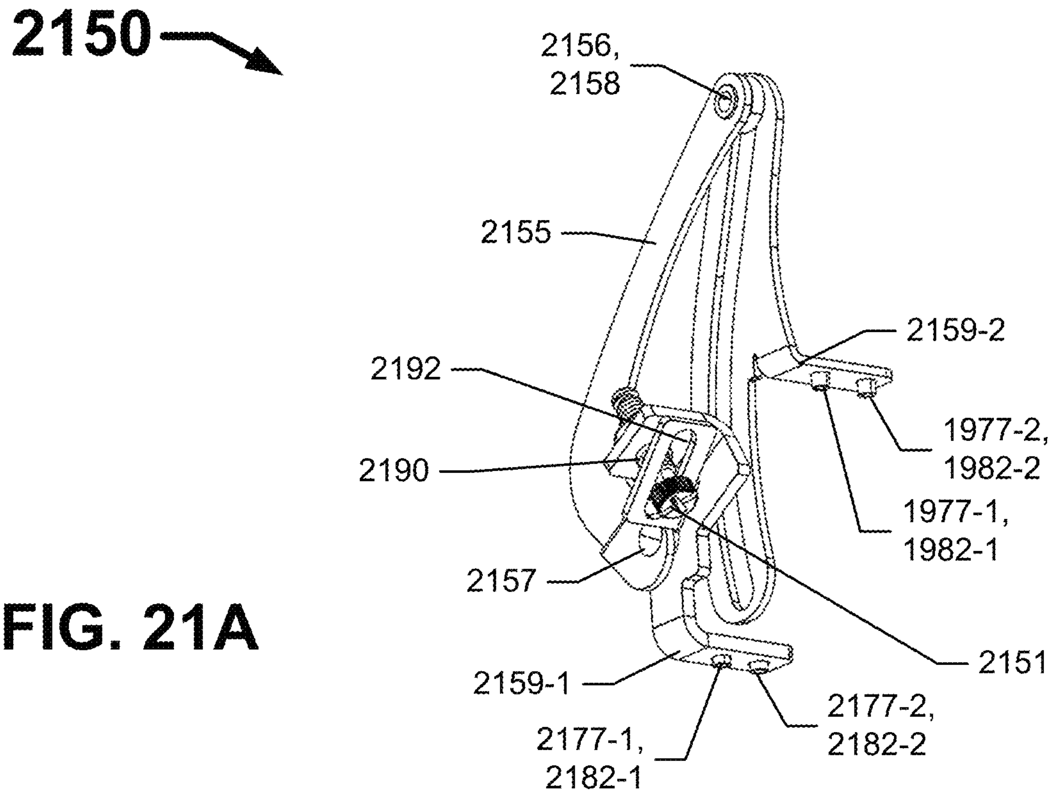
FIGS. 21A and 21B show the direct drive optic tilt mechanism of the recessed luminaire system of FIGS. 18A through 18F according to certain example embodiments.
Figure 21B:
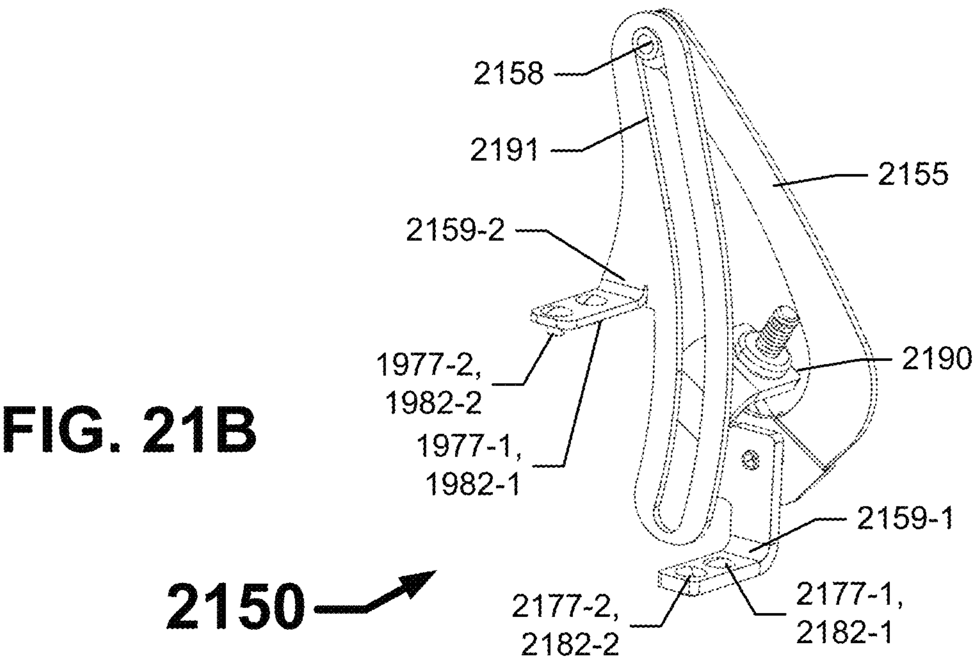

FIG. 19 shows the frame 1910 of the recessed luminaire system 1899 of FIGS. 18A through 18F according to certain example embodiments. FIG. 20 shows the bracket 2030 of the recessed luminaire system 1899 of FIGS. 18A through 18F according to certain example embodiments. FIGS. 21A and 21B show the direct drive optic tilt mechanism 2150 of the recessed luminaire system 1899 of FIGS. 18A through 18F according to certain example embodiments.

Referring to FIGS. 1 through 21B, the housing 1885, the frame 1910, the bracket 2030, and the drive assembly 2150 of the recessed luminaire assembly 1899 (including components and/or portions thereof) can be substantially the same as the housings, the frames, the brackets, and the drive assemblies (including corresponding components and/or portions thereof) discussed above with respect to FIGS. 1 through 17B, except as described below. For example, the housing 1885 in this case is generally cylindrical in shape. The housing 1885 has two coupling features 1871 in the form of threaded apertures within protrusions that extend from the outer perimeter of the housing 1885 toward the bottom of the housing 1885. Coupling feature 1871-1 and coupling feature 1871-2 are positioned substantially opposite each other along the outer perimeter of the housing 1885.

The frame 1910 of the direct drive optic tilt mechanism 2105 of the recessed luminaire system 1899 in this case includes a frame body 1911, a first frame extension 1920, and a second frame extension 1925. The frame body 1911 in this example is substantially planar and has a large opening 1912 that traverses the frame body 1911. The opening 1912 has a center point 1918 that is substantially coincident with the center of the frame body 1911. A center axis 1919 passes through the center point 1914 of the opening 1912 in the frame body 1911 substantially perpendicular to the frame body 1911. The opening 1912 can have any characteristics (e.g., shape, size) that allow the various components (e.g., light sources 186, lens) within the housing 1885 to function during operation of the recessed luminaire system 1899. In this case, the opening 1912 has an octagonal shape.

In certain example embodiments, the frame body 1911 also includes one or more coupling features 1919 that are configured to directly or indirectly couple to the housing 1885. In this case, there are two coupling features 1919 (coupling feature 1919-1 and coupling feature 1919-2) in the form of apertures that traverse the thickness of the frame body 1911 adjacent to opposite sides of the opening 1912. In this example, a coupling feature 1919 (e.g., coupling feature 1919-1, coupling feature 1919-2) is configured to indirectly couple to a coupling feature 1871 (e.g., coupling feature 1871-1, coupling feature 1871-2) of the housing 1885 using an independent coupling feature 1818 (e.g., coupling feature 1818-1, coupling feature 1818-2) in the form of a screw. When a coupling feature 1818 is disposed in a coupling feature 1919 of the frame body 1911 and a coupling feature 1871 of the housing 1885, the frame 1910 and the housing 1885 become fixedly coupled to each other. In some cases, the frame 1910 and the housing 1885 can be decoupled from each other by removing the independent coupling features 1818 from the coupling features 1871 of the housing 1885.

The frame extension 1920 of the frame 1910 extends downward from one end or side of the frame body 1911. The frame extension 1920 extends substantially perpendicularly from the frame body 1911 in this case. The frame extension 1920 in this example includes aperture 1921 and aperture 1922, both of which traverse the thickness of the frame extension 1920 and both of which are forms of coupling features. In this case, the aperture 1921 of the frame extension 1920 is indirectly and movably coupled to the curved slot 2041 of the bracket 2030 using independent coupling feature 1880-1 in the form of, for example, a pin, a rivet, a bolt/nut combination, and/or a screw. The aperture 1922 of the frame extension 1920 in this case is indirectly and movably coupled to the curved slot 2042 of the bracket 2030 using independent coupling feature 1880-2 in the form of, for example, a pin, a rivet, a bolt/nut combination, and/or a screw.

The frame extension 1925 of the frame 1910 extends downward from an opposite end or side of the frame body 1911 relative to the frame extension 1920. The frame extension 1925 extends substantially perpendicularly from the frame body 1911 in this case. The frame extension 1925 in this case includes aperture 1926 and aperture 1927, both of which traverse the thickness of the frame extension 1925 and both of which are forms of coupling features. The aperture 1926 of the frame extension 1925 in this case is indirectly and movably coupled to the curved slot 2046 of the bracket 2030 using independent coupling feature 1880-3 in the form of, for example, a pin, a rivet, a bolt/nut combination, and/or a screw. The aperture 1927 of the frame extension 1925 in this case is indirectly and movably coupled to the curved slot 2048 of the bracket 2030 using independent coupling feature 1880-4 in the form of, for example, a pin, a rivet, a bolt/nut combination, and/or a screw. In this example, the frame extension 1925 has substantially the same length as the frame extension 1920.

The frame extension 1925 in this case does not include a curved stop slot (e.g., curved stop slot 1528) for fixing the tilt angle 1875 between the frame 1910 and the bracket 2030. Instead, in this case, a pair of stop features 1893 in the form of springs 1893 are used to fix the tilt angle 1875. Specifically, the frame extension 1925 includes a protrusion with an aperture 1928-2 that traverses therethrough and in which one end of the spring 1893-2 is disposed, while the other end of the spring 1893-2 is disposed in an aperture 2047-2 in a protrusion of the bracket extension 2045 of the bracket 2030. Similarly, the frame extension 1920 includes a protrusion with an aperture 1928-1 that traverses therethrough and in which one end of the spring 1893-1 is disposed, while the other end of the spring 1893-1 is disposed in an aperture 2047-1 in a protrusion of the bracket extension 2040 of the bracket 2030. The force of the springs 1893 is opposed by the position of the drive mechanism 2151 of the drive assembly 2150.

In certain example embodiments, the frame body 1911 also includes one or more coupling features 1939 that are configured to directly or indirectly couple to the anchor 2159-2 of the drive assembly 2150. In this case, there are two coupling features 1939 (coupling feature 1939-1 and coupling feature 1939-2) in the form of apertures that traverse the thickness of the frame body 1911. In this case, the coupling features 1939 are configured to indirectly couple to the anchor 2159-2 using independent coupling features 1982 in the form of screws, bolts, rivets, pins, and the like. When the coupling feature 1982-1 is disposed in the coupling feature 1939-1 in the frame body 1911 and a complementary coupling feature 1977-1 (e.g., an aperture) in the anchor 2159-2, and when coupling feature 1982-2 is disposed in the coupling feature 1939-2 in the frame body 1911 and another complementary coupling feature 1977-2 (e.g., another aperture) in the anchor 2159-2, the anchor 2159-2 is fixedly coupled to the frame body 1911 of the frame 1910.

The bracket 2030 of the direct drive optic tilt mechanism 1805 of the recessed luminaire system 1899 in this case includes a bracket base 2031, the first bracket extension 2040, and the second bracket extension 2045. The bracket base 2031 in this example is substantially planar and has a large opening 2032 (also sometimes called a bracket base opening 2032 herein) that traverses the thickness of the bracket base 2031. The opening 2032 has a center point 2034 (also sometimes called the bracket base center point 2034 herein) that is substantially coincident with the center of the bracket base 2031.

A center axis 2035 passes through the center point 2034 of the opening 2032 in the bracket base 2031 substantially perpendicular to the bracket base 2031. In certain example embodiments, the center axis 1919 of the frame 1910 also passes through the center point 2034 of the opening 2032 in the bracket base 2031 to form the angle 1875 between the frame 1910 and the bracket 2030 through some or all of the range of motion of the frame 1910 relative to the bracket 2030. The opening 2032 can have any characteristics (e.g., shape, size) that allow the light emitted by the one or more light sources (e.g., light sources 186) and/or other components (e.g., a reflector, a trim) to be disposed therein during operation of the recessed luminaire system 1899. The opening 2032 in this case is substantially circular in shape.

In certain example embodiments, the bracket base 2031 also includes one or more coupling features 2038 that are configured to control some other orientation (e.g., rotation), aside from tilt, of the bracket 2030 and/or other components of the recessed luminaire system 1899. In this case, there is one coupling feature 2038 in the form of an aperture that traverses the thickness of the bracket base 2031 adjacent to the bracket extension 2040. The coupling feature 2038 is configured to indirectly couple to another component (e.g., a bracket swivel base 876) of the recessed luminaire using an independent coupling feature 1888 in the form of a screw. When the coupling feature 1888 is disposed in the coupling feature 2038 in the bracket base 2031 and contacts the bracket swivel base, the rotational orientation of the bracket 2030, the frame 1910, and the housing 1885 can be fixed relative to that component (e.g., the bracket swivel base 876). When the coupling feature 1888 does not contact the other component, the rotational orientation of the bracket 2030, the frame 1910, and the housing 1885 can be changed relative to the other component.

In certain example embodiments, the bracket base 2031 also includes one or more coupling features 2039 that are configured to directly or indirectly couple to the anchor 2159-1 of the drive assembly 2150. In this case, there are two coupling features 2039 (coupling feature 2039-1 and coupling feature 2039-2) in the form of apertures that traverse the thickness of the bracket base 2031 adjacent to the bracket extension 2040. In this case, the coupling features 2039 are configured to indirectly couple to the anchor 2159-1 using independent coupling features 2182 in the form of screws, bolts, rivets, pins, and the like. When the coupling feature 2182-1 is disposed in the coupling feature 2039-1 in the bracket base 2031 and a complementary coupling feature 2177-1 (e.g., an aperture) in the anchor 2159-1, and when coupling feature 2182-2 is disposed in the coupling feature 2039-2 in the bracket base 2031 and another complementary coupling feature 2177-2 (e.g., another aperture) in the anchor 2159-1, the anchor 2159-1 is fixedly coupled to the bracket base 2031 of the bracket 2030.

The bracket extension 2040 of the bracket 2030 extends upward from one end or side of the bracket base 2031. The bracket extension 2040 in this case extends substantially perpendicularly from the bracket body 2031. In this case, the bracket extension 2040 includes a curved slot 2041 and a curved slot 2042, both of which traverse the thickness of the bracket extension 2040 and both of which are forms of coupling features. The curved slot 2041 of the bracket extension 2040 of the bracket 2030 in this case is indirectly and movably coupled to the aperture 1921 of the frame extension 1920 using independent coupling feature 1880-1 in the form of, for example, a pin, a rivet, a bolt/nut combination, and/or a screw. The curved slot 2042 of the bracket extension 2040 of the bracket 2030 in this case is indirectly and movably coupled to the aperture 1922 of the frame extension 1920 using independent coupling feature 1880-2 in the form of, for example, a pin, a rivet, a bolt/nut combination, and/or a screw.

The bracket extension 2045 of the bracket 2030 extends upward from the opposite end or side of the bracket base 2031 relative to the bracket extension 2040. The bracket extension 2045 in this case extends substantially perpendicularly from the bracket body 2031. In this case, the bracket extension 2040 includes a curved slot 2046 and a curved slot 2048, both of which traverse the thickness of the bracket extension 2045 and both of which are forms of coupling features. The curved slot 2046 of the bracket extension 2045 of the bracket 2030 in this case is indirectly and movably coupled to the aperture 1927 of the frame extension 1925 using independent coupling feature 1880-4 in the form of, for example, a pin, a rivet, a bolt/nut combination, and/or a screw. The curved slot 2048 of the bracket extension 2045 of the bracket 2030 is indirectly and movably coupled to the aperture 1927 of the frame extension 1925 using independent coupling feature 1880-3 in the form of, for example, a pin, a rivet, a bolt/nut combination, and/or a screw.

The bracket extension 2045 in this case does not include a stop aperture (e.g., stop aperture 1647) for fixing the angle 1875 of tilt between the bracket 2030 and the combination of the frame 1910. Instead, as discussed above, a pair of stop features 1893 in the form of springs 1893 are used to fix the tilt angle 1875. Specifically, the bracket extension 2045 includes a protrusion with an aperture 2047-2 that traverses therethrough and in which one end of the spring 1893-2 is disposed, while the other end of the spring 1893-2 is disposed in an aperture 1928-2 in a protrusion of the frame extension 1925 of the frame 1910. Similarly, the bracket extension 2040 includes a protrusion with an aperture 2047-1 that traverses therethrough and in which one end of the spring 1893-1 is disposed, while the other end of the spring 1893-1 is disposed in an aperture 1928-1 in a protrusion of the frame extension 1920 of the frame 1910.

In this case, there are four coupling features 1880 in the direct drive optic tilt mechanism 1805. Each coupling feature 1880 in this example is in the form of a bolt, a screw, a pin, a rivet, or some similar component that has an elongated shaft. The characteristics (e.g., length, thickness, type of coupling feature) of one coupling feature 1880 can be the same as, or different than, the corresponding characteristics of one or more of the other coupling features 1880 in the direct drive optic tilt mechanism 1805.

Coupling feature 1880-1 in this example is disposed in the aperture 1922 in the frame extension 1920 of the frame 1910 and the curved slot 2042 in the bracket extension 2040 of the bracket 2030. Coupling feature 1880-2 in this example is disposed in the aperture 1921 in the frame extension 1920 of the frame 1910 and the curved slot 2041 in the bracket extension 2040 of the bracket 2030. Coupling feature 1880-3 in this example is disposed in the aperture 1927 in the frame extension 1925 of the frame 1910 and the curved slot 2048 in the bracket extension 2045 of the bracket 2030. Coupling feature 1880-4 in this example is disposed in the aperture 1926 in the frame extension 1925 of the frame 1910 and the curved slot 2046 in the bracket extension 2045 of the bracket 2030.

The drive assembly 2150 of the recessed luminaire system 1899 can be configured to cause movement in the tilt angle 1875 between the frame 1910 and the bracket 2030. The drive assembly 2150 in this case is coupled to the frame 1910 and the bracket 2030. The drive assembly 2150 in this case includes a tilt arm 2155, two anchors 2159 (anchor 2159-1 and anchor 2159-2), a shaft 2158, and a drive mechanism 2151 coupled to the proximal end of the tilt arm 2155.

The tilt arm 2155 of the drive assembly 2150 is configured to force the frame 1910 to rotate relative to the bracket 2030 based on based on engagement of the drive mechanism 2151. The tilt arm 2155 of the drive assembly 2150 in this case is a substantially planar segment with a coupling feature 2157 (in this case, in the form of an aperture) at its proximal end and a coupling feature 2156 (in this case, in the form of an aperture) at its distal end. The anchor 2159-1 is coupled to the proximal end of the tilt arm 2155. The tilt arm 2155 is positioned between the bracket extension 2040 and the bracket extension 2045 and includes a protrusion having a slot 2192 therein. The shaft 2158 is coupled to the coupling feature 2156 at the distal end of the tilt arm 2155 and a coupling feature 2191 in the form of a curved slot in the anchor 2159-2, which also includes a protrusion with a coupling feature 2190 in the form of a slot that traverses therethrough.

The drive mechanism 2151 engages the coupling feature 2191 of the tilt arm 2155 and the coupling feature 2192 of the anchor 2159-2. When the drive mechanism 2151 is rotated by a user device, the protrusion of the tilt arm 2155 with the coupling feature 2191 and the protrusion of the anchor 2159-2 with the coupling feature 2192 move relative to each other, which moves the distal end of the tilt arm 2155 along the coupling feature 2191 of the anchor 2159-2 using the shaft 2158.

The drive mechanism 2151 of the drive assembly 2150 is configured to move (e.g., rotate) based on a force applied to it by a user (e.g., user 184) through a user device (e.g., user device 181). The drive mechanism 2151 in this case is accessible through the opening 2032 in the bracket base 2031 of the bracket 2030. In this way, when the recessed luminaire that includes the recessed luminaire assembly 1899 is installed with respect to a structure (e.g., structure 189), the user can access the drive mechanism 2151 without uninstalling the recessed luminaire from the structure.

In order to rotate the frame 1910 relative to the bracket 2030 in this case, the drive mechanism 2151 is rotated by a screwdriver (a form of user device 181), which forces the tilt arm 2155 to move relative to the anchor 2159-2. To help keep the frame 1910 in proper alignment, both extensions (frame extension 1920 and frame extension 1925) of the frame 1910 rotate relative to the bracket extension 2040 and the bracket extension 2045 of the bracket 2030, respectively, using the coupling features 1880.

In order to ensure that the center axis 1919 of the frame 1910 intersects the center point 2034 of the opening 2032 of the bracket base 2031 of the bracket 2030 throughout the entire range of motion (all of the angles 1875) between the frame 1910 and the bracket 2030, the coupling feature 1880-2 disposed in the curved slot 2042 in the bracket extension 2040 of the bracket 2030 and the aperture 1922 in the frame extension 1920 of the frame 1910 simultaneously work in concert with the coupling of the coupling feature 1880-4 disposed in the curved slot 2048 in the bracket extension 2045 of the bracket 2030 and the aperture 1927 in the frame extension 1925 of the frame 1910.

The anchor 2159-1 of the drive assembly 2150 is configured to provide a stable (e.g., fixed) mounting of the drive assembly 2150 to the bracket 2030. In certain example embodiments, the anchor 2159-1 includes one or more coupling features 2177 that are configured to directly or indirectly couple the anchor 2159-1 to the bracket base 2031 of the bracket 2030. In this case, there are two coupling features 2177 (coupling feature 2177-1 and coupling feature 2177-2), each in the form of an aperture that traverses the thickness of the anchor 2159-1. In this case, the coupling features 2177 are configured to indirectly couple to the coupling features 2039 in the bracket base 2031 of the bracket 2030 using the independent coupling features 2182 (discussed above). When the coupling feature 2182-1 is disposed in the coupling feature 2177-1 in the anchor 2159-1 and a complementary coupling feature 2039-1 in the bracket base 2031, and when the coupling feature 2182-2 is disposed in the coupling feature 2177-2 in the anchor 2159-1 and a complementary coupling feature 2039-2 in the bracket base 2031, the anchor 2159-1 is fixedly coupled to the bracket base 2031 of the bracket 2030.

Similarly, the anchor 2159-2 of the drive assembly 2150 is configured to provide a stable (e.g., fixed) mounting of the drive assembly 2150 to the frame 1910. In certain example embodiments, the anchor 2159-2 includes one or more coupling features 1977 that are configured to directly or indirectly couple the anchor 2159-2 to the frame body 1911 of the frame 1910. In this case, there are two coupling features 1977 (coupling feature 1977-1 and coupling feature 1977-2), each in the form of an aperture that traverses the thickness of the anchor 2159-2. In this case, the coupling features 1977 are configured to indirectly couple to the coupling features 1939 in the frame body 1911 of the frame 1910 using the independent coupling features 1982 (discussed above). When the coupling feature 1982-1 is disposed in the coupling feature 1977-1 in the anchor 2159-2 and a complementary coupling feature 1939-1 in the frame body 1911, and when the coupling feature 1982-2 is disposed in the coupling feature 1977-2 in the anchor 2159-2 and a complementary coupling feature 1939-2 in the frame body 1911, the anchor 2159-2 is fixedly coupled to the frame body 1911 of the frame 1910.

Example embodiments can be used to allow a user to adjust and set the tilt angle of a recessed luminaire (or portion thereof) when the recessed luminaire is installed with respect to a structure (e.g., a ceiling). Using example direct drive optic tilt mechanisms (or portions thereof), a recessed luminaire can be adjusted with the use of a simple user device (e.g., a hand, a screwdriver) while the recessed luminaire remains installed (e.g., in a ceiling). Example embodiments can be used with recessed luminaires having any of a number of sizes and/or features. Example embodiments can be used in new installations of recessed luminaires as well as retrofitting existing luminaires. Example embodiments also provide a number of other benefits. Such other benefits can include, but are not limited to, increased ease of maintenance, greater ease of use, catering to user preferences, and compliance with industry standards that apply to luminaires.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A direct drive optic tilt mechanism for a recessed luminaire, the direct drive optic tilt mechanism comprising:

a frame comprising a frame body, a first frame extension, and a second frame extension, wherein the first frame extension and the second frame extension are located at opposite ends of the frame body, wherein the first frame extension includes a first aperture and a second aperture and the second frame extension includes a third aperture and a fourth aperture;

a bracket movably coupled to the frame, wherein the bracket comprises a bracket base, a first bracket extension, and a second bracket extension, wherein the bracket base has a bracket base opening that traverses therethrough, wherein the first bracket extension and the second bracket extension are located at opposite ends of the bracket base, wherein the first bracket extension comprises a first curved slot that is configured to be movably coupled to the first aperture in the first frame extension of the frame and a second curved slot that is configured to be movably coupled to the second aperture in the first frame extension of the frame, and wherein the second bracket extension comprises a third curved slot that is configured to be movably coupled to the third aperture in the second frame extension of the frame and a fourth curved slot that is configured to be movably coupled to the fourth aperture in the second frame extension of the frame; and a drive assembly, wherein the drive assembly comprises a tilt arm, a drive mechanism, and a stop feature with one end of the stop feature coupled to the first frame extension and another end of the stop feature coupled to the first bracket extension, wherein movement of the drive mechanism changes an angle between the bracket and the frame.

2. The direct drive optic tilt mechanism of claim 1, further comprising:

a first protrusion disposed in the first aperture, the first curved slot, and a tilt arm aperture in the tilt arm of the drive assembly;

a second protrusion disposed in the second aperture and the second curved slot;

a third protrusion disposed in the third aperture and the third curved slot; and a fourth protrusion disposed in the fourth aperture and the fourth curved slot.

3. The direct drive optic tilt mechanism of claim 1, wherein the bracket base opening of the bracket base has a bracket base center point, wherein the bracket base center point is intersected by a center axis along a frame body center point in a frame body opening in the frame body to form the angle.

4. The direct drive optic tilt mechanism of claim 3, wherein the bracket base center point is intersected by the center axis along the frame body center point in the frame body opening in the frame body through an entire range of motion of the frame relative to the bracket.

5. The direct drive optic tilt mechanism of claim 4, wherein the frame body opening is configured to have disposed therein a housing of the recessed luminaire.

6. The direct drive optic tilt mechanism of claim 1, wherein the tilt arm of the drive assembly includes a tilt arm aperture.

7. The direct drive optic tilt mechanism of claim 1, wherein the angle is adjustable between 0° and 45°.

8. The direct drive optic tilt mechanism of claim 1, wherein the drive mechanism is configured to be accessible through the bracket base opening, and wherein the drive mechanism is positioned between the bracket base and the frame body.

9. The direct drive optic tilt mechanism of claim 1, wherein the drive mechanism is operable using a tool.

10. The direct drive optic tilt mechanism of claim 1, wherein the first curved slot in the first bracket extension of the bracket is configured to be positioned closer to the frame body than the second curved slot in the first bracket extension of the bracket.

11. The direct drive optic tilt mechanism of claim 1, wherein the drive assembly further comprises a gear assembly to rotate the tilt arm.

12. The direct drive optic tilt mechanism of claim 1, wherein the drive assembly further comprises a U-shaped drive bracket, a rotatable extension of the drive mechanism that is disposed in at least one distal end of the U-shaped drive bracket, and a carrier, wherein the carrier moves along the extension as the extension rotates, wherein the carrier is coupled to a proximal end of the tilt arm of the drive assembly, and wherein the tilt arm rotates as the carrier moves along the extension as the extension rotates.

13. The direct drive optic tilt mechanism of claim 12, wherein the U-shaped drive bracket of the drive assembly is rigid and coupled to the bracket base.

14. The direct drive optic tilt mechanism of claim 1, wherein the tilt arm of the drive assembly is positioned adjacent to an outer surface of the first bracket extension.

15. The direct drive optic tilt mechanism of claim 1, wherein a force of the stop feature is opposed by a position of the drive mechanism.

16. The direct drive optic tilt mechanism of claim 1, wherein the stop feature is a spring.

* * * * *